United States Patent
Yeh et al.

(10) Patent No.: US 10,948,695 B2
(45) Date of Patent: Mar. 16, 2021

(54) PHOTOGRAPHING OPTICAL LENS ASSEMBLY, IMAGING APPARATUS AND ELECTRONIC DEVICE

(71) Applicant: LARGAN PRECISION CO., LTD., Taichung (TW)

(72) Inventors: Kuan-Ting Yeh, Taichung (TW); Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 135 days.

(21) Appl. No.: 16/214,283

(22) Filed: Dec. 10, 2018

(65) Prior Publication Data

US 2019/0353874 A1 Nov. 21, 2019

(30) Foreign Application Priority Data

May 21, 2018 (TW) .............................. 107117270 A

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC .. G02B 9/64; G02B 13/0045; G02B 13/0055; G02B 13/02; G02B 13/18; G02B 27/0025
USPC .......................................... 359/708, 754–755
See application file for complete search history.

(56) References Cited

U.S. PATENT DOCUMENTS

| | | | |
|---|---|---|---|
| 4,037,934 A | 7/1977 | Matsubara | |
| 4,523,817 A | 6/1985 | Kikuchi | |
| 5,543,970 A | 8/1996 | Hata et al. | |
| 10,228,541 B1 * | 3/2019 | Shi | G02B 13/0045 |
| 10,247,917 B1 * | 4/2019 | Shi | G02B 9/64 |
| 2014/0204480 A1 * | 7/2014 | Jo | G02B 27/0025 359/764 |
| 2015/0277083 A1 | 10/2015 | Chae | |
| 2018/0188482 A1 | 7/2018 | Jhang | |
| 2018/0188493 A1 | 7/2018 | Huang | |
| 2019/0107690 A1 * | 4/2019 | Wenren | G02B 13/00 |

FOREIGN PATENT DOCUMENTS

| | | |
|---|---|---|
| CN | 106842512 A | 6/2017 |
| CN | 106896478 A | 6/2017 |
| CN | 107817583 A | 3/2018 |
| CN | 107817584 A | 3/2018 |
| JP | 2016-126254 A | 7/2016 |
| TW | I614517 B | 2/2018 |
| WO | 2018-192126 A1 | 10/2018 |

* cited by examiner

*Primary Examiner* — Jordan M Schwartz
(74) *Attorney, Agent, or Firm* — McClure, Qualey & Rodack, LLP

(57) ABSTRACT

A photographing optical lens assembly includes seven lens elements, the seven lens elements being, in order from an object side to an image side, a first lens element, a second lens element, a third lens element, a fourth lens element, a fifth lens element, a sixth lens element and a seventh lens element. Each of the seven lens elements includes an object-side surface facing towards the object side and an image-side surface facing towards the image side. The image-side surface of the seventh lens element is concave in a paraxial region thereof and includes at least one inflection point in an off-axis region thereof.

29 Claims, 28 Drawing Sheets

PHOTOGRAPHING OPTICAL LENS ASSEMBLY, IMAGING APPARATUS AND ELECTRONIC DEVICE

RELATED APPLICATIONS

This application claims priority to Taiwan Application Serial Number 107117270, filed May 21, 2018, which is herein incorporated by reference.

BACKGROUND

Technical Field

The present disclosure relates to a photographing optical lens assembly and an imaging apparatus. More particularly, the present disclosure relates to a photographing optical lens assembly and an imaging apparatus with a compact size applicable to electronic devices.

Description of Related Art

With the advanced semiconductor manufacturing technologies, the performances of image sensors are enhanced, and the pixel size is minified. Therefore, photographing optical lens assemblies with high image quality become indispensable.

Moreover, with the rapid scientific and technological progress, the application scope of electronic devices equipped with photographing optical lens assemblies becomes wider, and the requirements for photographing optical lens assemblies are more diverse. However, it is hard for balancing the requirements, such as image quality, sensitivity, aperture size, volume and field of view, in conventional photographing optical lens assemblies. Therefore, a photographing optical lens assembly is provided by the present disclosure to satisfy the desired requirement.

SUMMARY

According to one aspect of the present disclosure, a photographing optical lens assembly includes seven lens elements, the seven lens elements being, in order from an object side to an image side, a first lens element, a second lens element, a third lens element, a fourth lens element, a fifth lens element, a sixth lens element and a seventh lens element. Each of the seven lens elements includes an object-side surface facing towards the object side and an image-side surface facing towards the image side. The image-side surface of the seventh lens element is concave in a paraxial region thereof and includes at least one inflection point in an off-axis region thereof. When a focal length of the photographing optical lens assembly is f, a focal length of the fourth lens element is f4, a focal length of the fifth lens element is f5, a focal length of the sixth lens element is f6, an Abbe number of the fourth lens element is V4, an Abbe number of the fifth lens element is V5, an Abbe number of the sixth lens element is V6, a minimum among Abbe numbers of all lens elements of the photographing optical lens assembly is Vmin, a curvature radius of the object-side surface of the second lens element is R3, and a curvature radius of the image-side surface of the second lens element is R4, the following conditions are satisfied:

$|f/f4|+|f/f5|+|f/f6|<0.80;$ $30.0<V4+V5+V6<90.0;$ $10.0<Vmin<22.0;$ and $-3.50<(R3-R4)/(R3+R4).$ According to another aspect of the present disclosure, an imaging apparatus includes the photographing optical lens assembly of the aforementioned aspect and an image sensor, wherein the image sensor is disposed on an image surface of the photographing optical lens assembly.

According to another aspect of the present disclosure, an electronic device includes at least two imaging apparatuses, which are a first imaging apparatus and a second imaging apparatus. The first imaging apparatus is the imaging apparatus of the aforementioned aspect. The second imaging apparatus includes an optical lens unit and an image sensor. The first imaging apparatus and the second imaging apparatus are facing the same side of the electronic device, and there is a difference of at least 20 degrees between a maximum field of view of the first imaging apparatus and a maximum field of view of the second imaging apparatus.

According to another aspect of the present disclosure, a photographing optical lens assembly includes seven lens elements, the seven lens elements being, in order from an object side to an image side, a first lens element, a second lens element, a third lens element, a fourth lens element, a fifth lens element, a sixth lens element and a seventh lens element. Each of the seven lens elements includes an object-side surface facing towards the object side and an image-side surface facing towards the image side. The image-side surface of the seventh lens element is concave in a paraxial region thereof and includes at least one inflection point in an off-axis region thereof. When a focal length of the photographing optical lens assembly is f, a focal length of the fourth lens element is f4, a focal length of the fifth lens element is f5, a focal length of the sixth lens element is f6, an Abbe number of the fourth lens element is V4, an Abbe number of the fifth lens element is V5, an Abbe number of the sixth lens element is V6, a curvature radius of the object-side surface of the third lens element is R5, a curvature radius of the image-side surface of the third lens element is R6, and a curvature radius of the object-side surface of the fifth lens element is R9, the following conditions are satisfied:

$|f/f4|+|f/f5|+|f/f6|<1.0;$ $30.0<V4+V5+V6<85.0;$ $(R5+R6)/(R5-R6)<0.80;$ and $-1.50<f/R9<1.20.$ According to another aspect of the present disclosure, a photographing optical lens assembly includes seven lens elements, the seven lens elements being, in order from an object side to an image side, a first lens element, a second lens element, a third lens element, a fourth lens element, a fifth lens element, a sixth lens element and a seventh lens element. Each of the seven lens elements includes an object-side surface facing towards the object side and an image-side surface facing towards the image side. The object-side surface of the seventh lens element is convex in a paraxial region thereof, and the image-side surface of the seventh lens element is concave in a paraxial region thereof and includes at least one inflection point in an off-axis region thereof. When a focal length of the photographing optical lens assembly is f, a focal length of the third lens element is f3, a focal length of the fourth lens element is f4, a focal length of the fifth lens element is f5, a focal length of the sixth lens element is f6, an Abbe number of the fourth lens element is V4, an Abbe number of the fifth lens element is V5, and an Abbe number of the sixth lens element is V6, the following conditions are satisfied:

$$|f/f4|+|f/f5|+|f/f6|<0.80;$$

$$30.0<V4+V5+V6<90.0;\text{ and}$$

$$-0.60<f/f3<2.50.$$

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
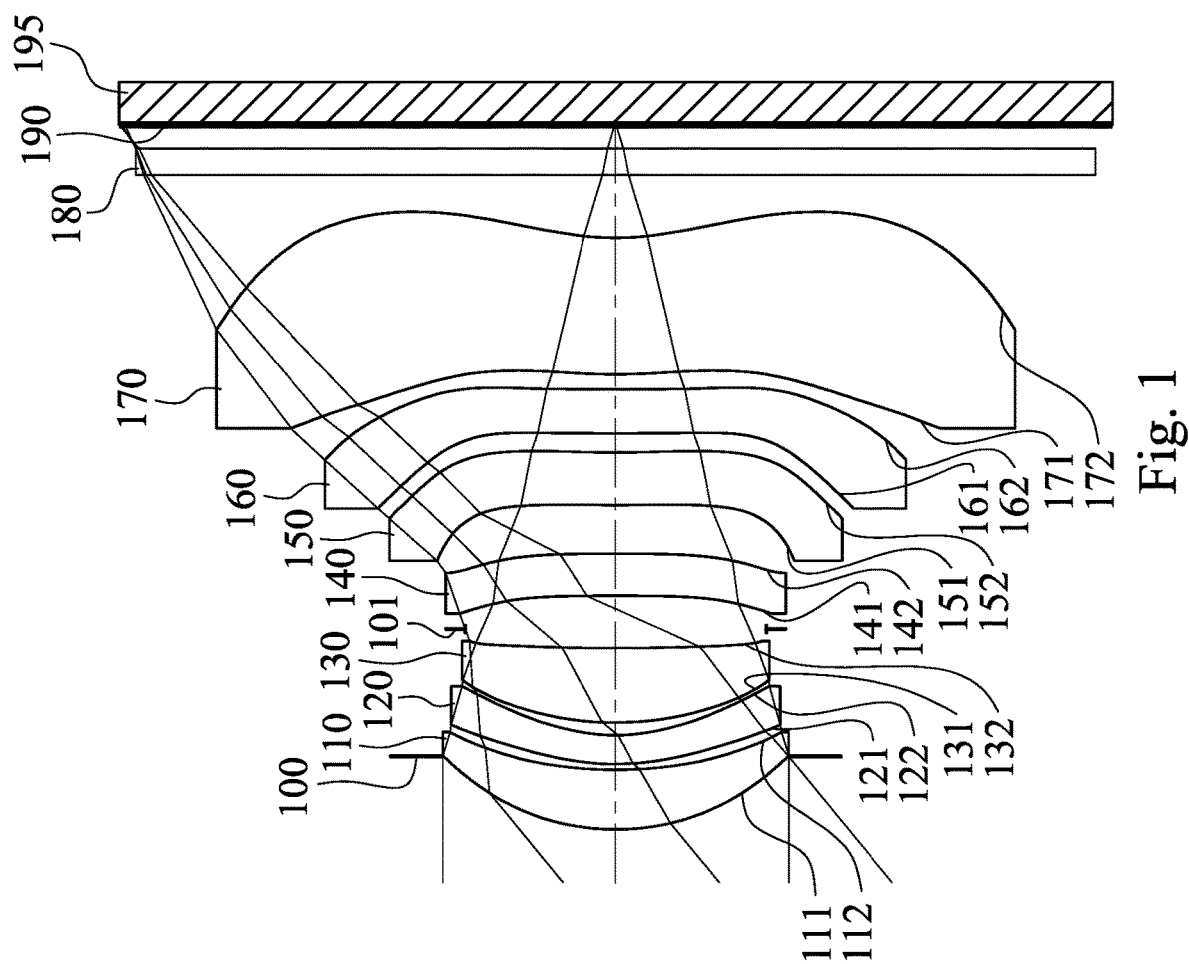
FIG. 1 is a schematic view of an imaging apparatus according to the 1st embodiment of the present disclosure.

A photographing optical lens assembly includes seven lens elements, the seven lens elements being, in order from an object side to an image side, a first lens element, a second lens element, a third lens element, a fourth lens element, a fifth lens element, a sixth lens element and a seventh lens element. Each of the seven lens elements includes an object-side surface facing towards the object side and an image-side surface facing towards the image side.

According to the photographing optical lens assembly of the present disclosure, there can be an air gap between each of adjacent lens elements of the first lens element, the second lens element, the third lens element, the fourth lens element, the fifth lens element, the sixth lens element and the seventh lens element, that is, each of the first through seventh lens elements of the photographing optical lens assembly is a single and non-cemented lens element. As a manufacturing process of the cemented lenses is more complex than one of the non-cemented lenses, in particular, cemented surfaces of lens elements need to have accurate curvature to ensure two lens elements will be highly cemented. However, during the cementing process, those two lens elements might not be highly cemented due to displacements and it is thereby not favorable for the image quality of the photographing optical lens assembly. Therefore, there can be an air gap between each of adjacent lens elements of the seven lens elements in the present disclosure for avoiding the problem associated with the cemented lens elements.

The object-side surface of the first lens element can be convex in a paraxial region thereof, and the image-side surface of the first lens element can be concave in a paraxial region thereof. Therefore, it is favorable for balancing the light path in the tangential direction and the light path in the sagittal direction so as to correct astigmatism of the photographing optical lens assembly.

The second lens element can have negative refractive power. Therefore, it is favorable for correcting aberrations generated by the first lens element so as to correct chromatic aberration and astigmatism. The object-side surface of the second lens element can be convex in a paraxial region thereof. Therefore, the object side of the photographing optical lens assembly is favorable for receiving light so as to satisfy the illuminance requirements of a photographing optical lens assembly with a large aperture.

The third lens element can have positive refractive power. Therefore, it is favorable for providing sufficient light converging ability for the photographing optical lens assembly so as to effectively miniaturize the photographing optical lens assembly and achieve the compact size.

The image-side surface of the sixth lens element can be concave in a paraxial region thereof and can include at least one inflection point in an off-axis region thereof. Therefore, it is favorable for positioning an image surface of the photographing optical lens assembly, so as to avoid the photographing optical lens assembly being overly large, correct peripheral aberrations and enhance the image quality.

The seventh lens element may have negative refractive power. Therefore, it is favorable for reducing the back focal length of the photographing optical lens assembly so as to achieve compactness. The object-side surface of the seventh lens element may be convex in a paraxial region thereof. Therefore, it is favorable for controlling the refractive power strength of the seventh lens element so as to enhance the image quality. The image-side surface of the seventh lens element is concave in a paraxial region thereof and includes at least one inflection point in an off-axis region thereof. Therefore, it is favorable for reducing the back focal length of the photographing optical lens assembly, so as to achieve compactness and further flatten a Petzval surface of the photographing optical lens assembly.

Each of at least five lens elements of the photographing optical lens assembly can have the object-side surface being convex in a paraxial region thereof and the image-side surface being concave in a paraxial region thereof. Therefore, it is favorable for reducing astigmatism, effectively controlling the back focal length of the photographing optical lens assembly, and achieving compactness.

When a focal length of the photographing optical lens assembly is f, a focal length of the fourth lens element is f4, a focal length of the fifth lens element is f5, and a focal length of the sixth lens element is f6, the following condition is satisfied: $|f/f4|+|f/f5|+|f/f6|<1.0$. Therefore, it is favorable for improving the aberration correction ability of the fourth lens element, the fifth lens element and the sixth lens element so as to enhance the image quality of the photographing optical lens assembly. Preferably, the following condition can be satisfied: $|f/f4|+|f/f5|+|f/f6|<0.80$. More preferably, the following condition can be satisfied: $|f/f4|+|f/f5|+|f/f6|<0.70$. Further preferably, the following condition can be satisfied: $|f/f4|+|f/f5|+|f/f6|\le 0.60$.

When an Abbe number of the fourth lens element is V4, an Abbe number of the fifth lens element is V5, and an Abbe number of the sixth lens element is V6, the following condition is satisfied: $30.0<V4+V5+V6<90.0$. Therefore, it is favorable for increasing the density differences between air and the lens materials of the fourth lens element, the fifth lens element and the sixth lens element so as to better control the light path in limited space. Preferably, the following condition can be satisfied: $30.0<V4+V5+V6<85.0$. More preferably, the following condition can be satisfied: $35.0<V4+V5+V6<80.0$. Further preferably, the following condition can be satisfied: $40.0<V4+V5+V6<70.0$. Still further preferably, the following condition can be satisfied: $45.0<V4+V5+V6<60.0$.

When a minimum among Abbe numbers of all lens elements of the photographing optical lens assembly is Vmin, the following condition is satisfied: $10.0<Vmin<22.0$. Therefore, it is favorable for balancing the light converging ability among different wavelengths of the photographing optical lens assembly so as to correct chromatic aberration.

When a curvature radius of the object-side surface of the second lens element is R3, and a curvature radius of the image-side surface of the second lens element is R4, the following condition is satisfied: $-3.50<(R3-R4)/(R3+R4)$. Therefore, it is favorable for maintaining the proper surface shape of the second lens element so as to balance the aberration correction of the photographing optical lens assembly. Preferably, the following condition can be satisfied: $-3.0<(R3-R4)/(R3+R4)<10.0$. More preferably, the following condition can be satisfied: $-2.5<(R3-R4)/(R3+R4)<5.0$. Further preferably, the following condition can be satisfied: $-2.0<(R3-R4)/(R3+R4)<3.0$.

When a curvature radius of the object-side surface of the third lens element is R5, and a curvature radius of the image-side surface of the third lens element is R6, the following condition is satisfied: $(R5+R6)/(R5-R6)<0.80$. Therefore, it is favorable for providing the proper surface shape of the third lens element, so as to simultaneously strengthen the light refraction ability of the object-side surface of the third lens element and correct aberrations by the image-side surface of the third lens element. Preferably, the following condition can be satisfied: $-2.50<(R5+R6)/(R5-R6)<0.50$. More preferably, the following condition can be satisfied: $-2.50<(R5+R6)/(R5-R6)<-1.0$.

When a focal length of the photographing optical lens assembly is f, and a curvature radius of the object-side surface of the fifth lens element is R9, the following condition is satisfied: $-1.50<f/R9<1.20$. Therefore, it is favorable for providing the curvature of the object-side surface of the fifth lens element without being overly large, so as to receive light and to avoid excessive aberrations. Preferably, the following condition can be satisfied: $-1.20<f/R9<0.55$.

When the focal length of the photographing optical lens assembly is f, and a focal length of the third lens element is f3, the following condition is satisfied: $-0.60<f/f3<2.50$. Therefore, it is favorable for balancing the refractive power distribution of the third lens element while avoiding insufficient light convergence, so as to obtain higher image quality of the photographing optical lens assembly. Preferably, the following condition can be satisfied: $-1.0<f/f3<1.50$.

When the focal length of the photographing optical lens assembly is f, a focal length of the first lens element is f1, a focal length of the second lens element is f2, the focal length of the third lens element is f3, the focal length of the fourth lens element is f4, the focal length of the fifth lens element is f5, the focal length of the sixth lens element is f6, a focal length of the seventh lens element is f7, and a minimum value among $|f/f1|$, $|f/f2|$, $|f/f3|$, $|f/f4|$, $|f/f5|$, $|f/f6|$ and $|f/f7|$ is $|f/fi|min$, the following condition is satisfied: $|f/fi|min<0.10$. Therefore, it provides at least one lens element of the photographing optical lens assembly for balancing the aberrations disposed between the object side and the image side of the said at least one lens element. Preferably, the following condition can be satisfied: $|f/fi|min<0.05$.

When a central thickness of the first lens element is CT1, and a central thickness of the seventh lens element is CT7, the following condition is satisfied: $0.50<CT7/CT1<2.50$. Therefore, it is favorable for the lens molding and maintaining a proper size of the photographing optical lens assembly by balancing the lens thicknesses arranged between the object side and the image side of the photographing optical lens assembly.

When a curvature radius of the object-side surface of the fourth lens element is R7, and a curvature radius of the image-side surface of the fourth lens element is R8, the following condition is satisfied: −0.20<(R7−R8)/(R7+R8) <2.50. Therefore, it is favorable for controlling the surface shape of the fourth lens element so as to correct astigmatism and coma.

When the focal length of the photographing optical lens assembly is f, a curvature radius of an object-side surface of a lens element of the photographing optical lens assembly is Rf, and a curvature radius of an image-side surface of the lens element of the photographing optical lens assembly is Rr, at least one lens element of the photographing optical lens assembly satisfies the following condition: |f/Rf|+|f/Rr|<1.0. Therefore, it is favorable for providing the photographing optical lens assembly with at least one correction lens element so as to correct aberrations. Preferably, at least one lens element of the photographing optical lens assembly satisfies the following condition: |f/Rf|+|f/Rr|<0.50.

When the focal length of the photographing optical lens assembly is f, and an entrance pupil diameter of the photographing optical lens assembly is EPD, the following condition is satisfied: 1.0<f/EPD<1.90. Therefore, it is favorable for effectively moderating the aperture size for the quantity of incoming light in the photographing optical lens assembly so as to increase the image brightness.

When an axial distance between the image-side surface of the seventh lens element and the image surface is BL, and an axial distance between the object-side surface of the first lens element and the image-side surface of the seventh lens element is TD, the following condition is satisfied: 0.05<BL/TD<0.30. Therefore, it is favorable for controlling the back focal length of the photographing optical lens assembly, so as to reduce the volume of the photographing optical lens assembly and achieve compactness.

When an axial distance between the object-side surface of the first lens element and the image surface is TL, and a maximum image height of the photographing optical lens assembly is ImgH, the following condition is satisfied: 1.20<TL/ImgH<1.75. Therefore, it is favorable for providing a sizeable area for receiving light of the photographing optical lens assembly so as to obtain sufficient image brightness and compactness.

When an Abbe number of the second lens element is V2, the following condition is satisfied: 10.0<V2<40.0. Therefore, it is for favorable for correcting chromatic aberration of the second lens element so as to avoid dispersion of imaging light from different light bands.

When the Abbe number of the fourth lens element is V4, the following condition is satisfied: 10.0<V4<30.0. Therefore, it is favorable for increasing the density differences between air and the material of the fourth lens element so as to better control the light path in limited space.

When the Abbe number of the sixth lens element is V6, the following condition is satisfied: 10.0<V6<40.0. Therefore, it is favorable for increasing the density differences between air and the material of the sixth lens element so as to obtain better light path control in limited space.

When the axial distance between the object-side surface of the first lens element and the image surface is TL, and the focal length of the photographing optical lens assembly is f, the following condition is satisfied: 0.90<TL/f<1.35. Therefore, it is favorable for balancing the total track length and the field of view of the photographing optical lens assembly.

When the curvature radius of the object-side surface of the third lens element is R5, and a central thickness of the third lens element is CT3, the following condition is satisfied: −50.0<R5/CT3<5.0. Therefore, it is favorable for balancing a curvature of the object-side surface of the third lens element and the thickness thereof so as to better control the light path on the object-side surface of the third lens element. Preferably, the following condition can be satisfied: 0<R5/CT3<5.0.

When the focal length of the photographing optical lens assembly is f, the focal length of the first lens element is f1, the focal length of the second lens element is f2, the focal length of the third lens element is f3, the focal length of the fourth lens element is f4, the focal length of the fifth lens element is f5, the focal length of the sixth lens element is f6, the focal length of the seventh lens element is f7, and a maximum value among |f/f1|, |f/f2|, |f/f3|, |f/f4|, |f/f5|, |f/f6| and |f/f7| is |f/fi|max, the following condition is satisfied: 0.50<|f/fi|max<1.25. Therefore, it can balance the refractive power distribution of the lens elements of the photographing optical lens assembly so as to avoid excessive aberrations resulted from overly large refractive power.

When an axial distance between the fifth lens element and the sixth lens element is T56, and an axial distance between the sixth lens element and the seventh lens element is T67, the following condition is satisfied: 0.10<T56/T67<1.50. Therefore, it is favorable for balanced spacing among the fifth lens element, the sixth lens element and the seventh lens element so as to reduce the photosensitivity in assembling the photographing optical lens assembly.

When the focal length of the first lens element is f1, and the focal length of the second lens element is f2, the following condition is satisfied: |f1/f2|<1.50. Therefore, it is favorable for the first lens element having sufficient refractive power to control light path of the photographing optical lens assembly, and for balancing aberration corrections between the first lens element and the second lens element.

Abbe numbers of at least two of the seven lens elements of the photographing optical lens assembly are greater than 10.0 and smaller than 22.0. Therefore, it can provide the proper materials of the lens elements of the photographing optical lens assembly with sufficient light control so as to balance focusing positions of different bands and avoid image overlaps.

The photographing optical lens assembly further includes an aperture stop. When an axial distance between the aperture stop and the image-side surface of the seventh lens element is SD, and the axial distance between the object-side surface of the first lens element and the image-side surface of the seventh lens element is TD, the following condition is satisfied: 0.77<SD/TD<0.95. Therefore, it is favorable for positioning of the aperture stop so as to control the volume of the photographing optical lens assembly.

When the maximum image height of the photographing optical lens assembly is ImgH, and the focal length of the photographing optical lens assembly is f, the following condition is satisfied: 0.70<ImgH/f<1.0. Therefore, it is favorable for moderating the field of view of the photographing optical lens assembly so as to be applicable to various fields.

Each of the aforementioned features of the photographing optical lens assembly can be utilized in numerous combinations, so as to achieve the corresponding functionality.

According to the photographing optical lens assembly of the present disclosure, the lens elements of the photographing optical lens assembly can be made of either glass or plastic material. When the lens elements are made of glass material, the refractive power distribution of the photographing optical lens assembly may be more flexible. The glass lens element can either be made by grinding or molding. When the lens elements are made of plastic material, the manufacturing cost can be effectively reduced. Furthermore, surfaces of each lens element can be arranged to be aspheric (ASP), which allows for more controllable variables for eliminating the aberration thereof, the required number of the lens elements can be decreased, and the total track length of the photographing optical lens assembly can be effectively reduced. The aspheric surfaces may be formed by plastic injection molding or glass molding.

According to the photographing optical lens assembly of the present disclosure, one or more of the lens material may optionally include an additive which alters the lens transmittance in a specific range of wavelength for reducing unwanted stray light or color deviation. For example, the additive may optionally filter out light in the wavelength range of 600 nm~800 nm for reducing excessive red light and/or near infra-red light, or may optionally filter out light in the wavelength range of 350 nm~450 nm to reduce excessive blue light and/or near ultra-violet light from interfering the final image. The additive may be homogenously mixed with a plastic material to be used in manufacturing a mixed-material lens element by injection molding.

According to the photographing optical lens assembly of the present disclosure, when a surface of a lens element is aspheric, it indicates that the complete optical effective area or a partial of the optical effective area of the surface of the lens element can be aspheric.

According to the photographing optical lens assembly of the present disclosure, each of an object-side surface and an image-side surface of a lens element has a paraxial region and an off-axis region. The paraxial region refers to the region of the surface where light rays travel close to the optical axis, and the off-axis region refers to the region of the surface away from the paraxial region. Particularly unless otherwise specified, when the lens element has a convex surface, it indicates that the surface can be convex in the paraxial region thereof; when the lens element has a concave surface, it indicates that the surface can be concave in the paraxial region thereof. According to the photographing optical lens assembly of the present disclosure, the refractive power of a lens element being positive or negative, or the focal length of the lens element may refer to the refractive power or the focal length in the paraxial region of the lens element.

According to the photographing optical lens assembly of the present disclosure, an inflection point is defined as a point where center of curvature is shifted from the object side to the image side (or from the image side to the object side) of a curve on a lens surface from a paraxial region thereof to an off-axis region thereof.

According to the photographing optical lens assembly of the present disclosure, the image surface, depending on the corresponding image sensor, can be a planar surface or a curved surface, particularly a curved surface being concave toward the object side. According to the photographing optical lens assembly of the present disclosure, at least one image correcting element (such as a field flattener) can be selectively disposed between a lens element closest to the image surface and the image surface so as to correct image aberrations (such as the field curvature). Properties of the image correcting element, such as curvature, thickness, refractive index, position, surface shape (convex/concave, spherical/aspheric/diffractive/Fresnel etc.) can be adjusted according to the requirements of the imaging apparatus. In general, the image correcting element is preferably a thin plano-concave element having a concave surface facing toward the object side and is disposed close to the image surface.

According to the photographing optical lens assembly of the present disclosure, the photographing optical lens assembly can include at least one stop. The stop can be a glare stop, a field stop, etc. Therefore, the stray light can be eliminated, and the image quality can be improved.

According to the photographing optical lens assembly of the present disclosure, an aperture stop can be configured as a front stop or a middle stop. A front stop is disposed between an imaged object and the first lens element, and a middle stop is disposed between the first lens element and the image surface. The front stop can provide a longer distance between an exit pupil of the photographing optical lens assembly and the image surface to enable a telecentric effect, and thereby can improve the image-sensing efficiency of an image sensor. The middle stop is favorable for enlarging the field of view of the photographing optical lens assembly and thereby provides a wider field of view for the same.

According to the photographing optical lens assembly of the present disclosure, a variable aperture element can be properly configured. The variable aperture element can be a mechanical part or a light control part, and the dimension and the shape of the variable aperture element can be electrically controlled. The mechanical part can include a moveable component such a blade group or a shielding plate. The light control part can include a screen component such as a light filter, an electrochromic material, a liquid crystal layer or the like. The amount of incoming light or the exposure time of the image can be controlled by the variable aperture element to enhance the image moderation ability. In addition, the variable aperture element can be the aperture stop of the photographing optical lens assembly according to the present disclosure, so as to moderate the image properties by changing f-number to control the depth of field or the exposure speed.

According to the photographing optical lens assembly of the present disclosure, the photographing optical lens assembly can be applied to 3D (three-dimensional) image capturing applications, in products such as digital cameras, mobile devices, digital tablets, smart TVs, network monitoring devices, motion sensing input devices, driving recorders, rear view camera systems, wearable devices, unmanned aerial vehicles, and other electronic imaging products.

According to the present disclosure, an imaging apparatus is provided. The imaging apparatus includes the aforementioned photographing optical lens assembly according to the present disclosure and an image sensor, wherein the image sensor is disposed on or near the image surface of the aforementioned photographing optical lens assembly. When specific conditions of the fourth lens element, the fifth lens element and the sixth lens element are satisfied, it is favorable for correcting aberrations of the fourth lens element, the fifth lens element and the sixth lens element so as to enhance the image quality of the photographing optical lens assembly. It is also favorable for increasing the density differences between air and the materials of the fourth lens element, the fifth lens element and the sixth lens element so as to better control the light path in limited space. Preferably, the imaging apparatus can further include a barrel member, a holder member or a combination thereof.

According to the present disclosure, an electronic device is provided, wherein the electronic device includes at least two imaging apparatuses, which can be the first imaging apparatus and the second imaging apparatus. The first imaging apparatus is the aforementioned imaging apparatus. The second imaging apparatus includes an optical lens unit and an image sensor, wherein the optical lens unit may be the aforementioned photographing optical lens assembly according to the present disclosure but not limited to. The first imaging apparatus and the second imaging apparatus are facing the same side of the electronic device, and there is a difference of at least 20 degrees between a maximum field of view of the first imaging apparatus and a maximum field of view of the second imaging apparatus. Therefore, it is favorable for enhancing the image quality and taking pictures of wide field of view. Preferably, the electronic device can further include, but not limited to, a control unit, a display, a storage unit, a random access memory unit (RAM) or a combination thereof.

According to the above description of the present disclosure, the following 1st-15th specific embodiments are provided for further explanation.

1st Embodiment

Figure 2:
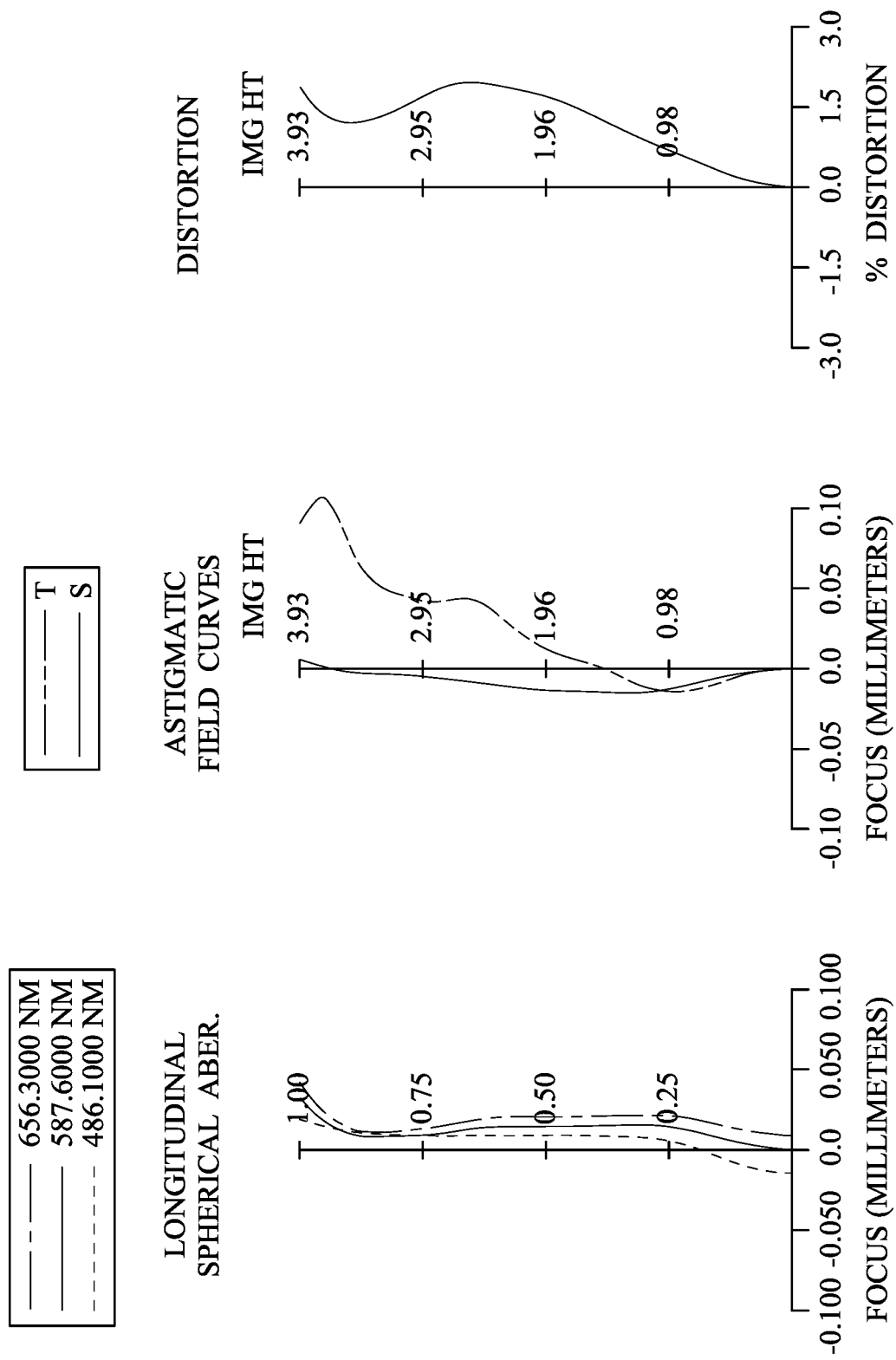
FIG. 2 shows spherical aberration curves, astigmatic field curves and a distortion curve of the imaging apparatus according to the 1st embodiment.

FIG. 1 is a schematic view of an imaging apparatus according to the 1st embodiment of the present disclosure. FIG. 2 shows spherical aberration curves, astigmatic field curves and a distortion curve of the imaging apparatus according to the 1st embodiment. In FIG. 1, the imaging apparatus includes a photographing optical lens assembly (its reference numeral is omitted) and an image sensor 195. The photographing optical lens assembly includes, in order from an object side to an image side, an aperture stop 100, a first lens element 110, a second lens element 120, a third lens element 130, a stop 101, a fourth lens element 140, a fifth lens element 150, a sixth lens element 160, a seventh lens element 170, a filter 180 and an image surface 190. The image sensor 195 is disposed on the image surface 190 of the photographing optical lens assembly. The photographing optical lens assembly includes seven lens elements (110, 120, 130, 140, 150, 160 and 170) without additional one or more lens elements inserted between the first lens element 110 and the seventh lens element 170, and there is an air gap in a paraxial region between each of adjacent lens elements of the seven lens elements.

The first lens element 110 with positive refractive power has an object-side surface 111 being convex in a paraxial region thereof and an image-side surface 112 being concave in a paraxial region thereof. The first lens element 110 is made of a plastic material, and has the object-side surface 111 and the image-side surface 112 being both aspheric.

The second lens element 120 with negative refractive power has an object-side surface 121 being convex in a paraxial region thereof and an image-side surface 122 being concave in a paraxial region thereof. The second lens element 120 is made of a plastic material, and has the object-side surface 121 and the image-side surface 122 being both aspheric.

The third lens element 130 with positive refractive power has an object-side surface 131 being convex in a paraxial region thereof and an image-side surface 132 being concave in a paraxial region thereof. The third lens element 130 is made of a plastic material, and has the object-side surface 131 and the image-side surface 132 being both aspheric.

The fourth lens element 140 with positive refractive power has an object-side surface 141 being concave in a paraxial region thereof and an image-side surface 142 being convex in a paraxial region thereof. The fourth lens element 140 is made of a plastic material, and has the object-side surface 141 and the image-side surface 142 being both aspheric.

The fifth lens element 150 with negative refractive power has an object-side surface 151 being convex in a paraxial region thereof and an image-side surface 152 being concave in a paraxial region thereof. The fifth lens element 150 is made of a plastic material, and has the object-side surface 151 and the image-side surface 152 being both aspheric.

The sixth lens element 160 with positive refractive power has an object-side surface 161 being convex in a paraxial region thereof and an image-side surface 162 being convex in a paraxial region thereof. The sixth lens element 160 is made of a plastic material, and has the object-side surface 161 and the image-side surface 162 being both aspheric. Furthermore, the image-side surface 162 of the sixth lens element 160 includes at least one inflection point in an off-axis region thereof.

The seventh lens element 170 with negative refractive power has an object-side surface 171 being convex in a paraxial region thereof and an image-side surface 172 being concave in a paraxial region thereof. The seventh lens element 170 is made of a plastic material, and has the object-side surface 171 and the image-side surface 172 being both aspheric. Furthermore, the image-side surface 172 of the seventh lens element 170 includes at least one inflection point in an off-axis region thereof.

The filter 180 is made of a glass material and located between the seventh lens element 170 and the image surface 190, and will not affect the focal length of the photographing optical lens assembly.

Five lens elements (110, 120, 130, 150 and 170) of the photographing optical lens assembly in the 1st embodiment have the object-side surfaces (111, 120, 131, 151 and 171) being convex in the paraxial regions thereof and the image-side surfaces (112, 122, 132, 152 and 172) being concave in the paraxial regions thereof.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the photographing optical lens assembly according to the 1st embodiment, when a focal length of the photographing optical lens assembly is f, an f-number of the photographing optical lens assembly is Fno, and a half of a maximum field of view of the photographing optical lens assembly is HFOV, these parameters have the following values: f=4.67 mm; Fno=1.70; and HFOV=39.5 degrees.

In the photographing optical lens assembly according to the 1st embodiment, when an Abbe number of the first lens element 110 is V1, an Abbe number of the second lens element 120 is V2, an Abbe number of the third lens element 130 is V3, an Abbe number of the fourth lens element 140 is V4, an Abbe number of the fifth lens element 150 is V5, an Abbe number of the sixth lens element 160 is V6, an Abbe number of the seventh lens element 170 is V7, and a minimum among Abbe numbers of all lens elements of the photographing optical lens assembly is Vmin (i.e. a minimum among V1, V2, V3, V4, V5, V6 and V7, and Vmin=V2=V4=V5=V6 in the 1st embodiment), the following conditions are satisfied: V2=19.5; V4=19.5; V6=19.5; Vmin=19.5; and V4+V5+V6=58.5. Furthermore, in the 1st embodiment, Abbe numbers (V2, V4, V5, and V6) of four lens elements (the second lens element 120, the fourth lens element 140, the fifth lens element 150 and the sixth lens element 160) respectively are greater than 10.0 and smaller than 22.0.

In the photographing optical lens assembly according to the 1st embodiment, when an axial distance between the fifth lens element 150 and the sixth lens element 160 is T56, and an axial distance between the sixth lens element 160 and the seventh lens element 170 is T67, the following condition is satisfied: T56/T67=1.28.

In the photographing optical lens assembly according to the 1st embodiment, when a central thickness of the first lens element 110 is CT1, and a central thickness of the seventh lens element 170 is CT7, the following condition is satisfied: CT7/CT1=2.30.

In the photographing optical lens assembly according to the 1st embodiment, when a curvature radius of the object-side surface 131 of the third lens element 130 is R5, and a central thickness of the third lens element 130 is CT3, the following condition is satisfied: R5/CT3=4.17.

In the photographing optical lens assembly according to the 1st embodiment, when the focal length of the photographing optical lens assembly is f, and a curvature radius of the object-side surface 151 of the fifth lens element 150 is R9, the following condition is satisfied: f1/R9=0.28.

In the photographing optical lens assembly according to the 1st embodiment, when a curvature radius of the object-side surface 121 of the second lens element 120 is R3, a curvature radius of the image-side surface 122 of the second lens element 120 is R4, the curvature radius of the object-side surface 131 of the third lens element 130 is R5, a curvature radius of the image-side surface 132 of the third lens element 130 is R6, a curvature radius of the object-side surface 141 of the fourth lens element 140 is R7, and a curvature radius of the image-side surface 142 of the fourth lens element 140 is R8, the following conditions are satisfied: (R3−R4)/(R3+R4)=0.12; (R5+R6)/(R5−R6)=−1.40; and (R7−R8)/(R7+R8)=0.10.

In the photographing optical lens assembly according to the 1st embodiment, when the focal length of the photographing optical lens assembly is f, a focal length of the first lens element 110 is f1, a focal length of the second lens element 120 is f2, a focal length of the third lens element 130 is f3, a focal length of the fourth lens element 140 is f4, a focal length of the fifth lens element 150 is f5, a focal length of the sixth lens element 160 is f6, a focal length of the seventh lens element 170 is f7, a minimum value among |f/f1|, |f/f2|, |f/f3|, |f/f4|, |f/f5|, |f/f6| and |f/f7| is |f/fi|min (|f/fi|min=|f/f4| in the 1st embodiment), and a maximum value among |f/f1|, |f/f2|, |f/f3|, |f/f4|, |f/f5|, |f/f6| and |f/f7| is |f/fi|max (|f/fi|max=|f/f3| in the 1st embodiment), the following conditions are satisfied: f/f3=0.88; (f1/f2|=0.60; |f/fi|min=0.019; |f/fi|max=0.88; and |f/f4|+|f/f5|+|f/f6|=0.28.

In the photographing optical lens assembly according to the 1st embodiment, when the focal length of the photographing optical lens assembly is f, an entrance pupil diameter of the photographing optical lens assembly is EPD, an axial distance between the object-side surface 111 of the first lens element 110 and the image surface 190 is TL, an axial distance between the aperture stop 100 and the image-side surface 172 of the seventh lens element 170 is SD, an axial distance between the object-side surface 111 of the first lens element 110 and the image-side surface 172 of the seventh lens element 170 is TD, a maximum image height of the photographing optical lens assembly is ImgH, and an axial distance between the image-side surface 172 of the seventh lens element 170 and the image surface 190 is BL, the following conditions are satisfied: f/EPD=1.70; TL/f=1.20; SD/TD=0.88; TL/ImgH=1.43; BL/TD=0.19; and ImgH/f=0.84.

In the photographing optical lens assembly according to the 1st embodiment, when the focal length of the photographing optical lens assembly is f, a curvature radius of the object-side surface 111 of the first lens element 110 is R1, a curvature radius of the image-side surface 112 of the first lens element 110 is R2, the curvature radius of the object-side surface 121 of the second lens element 120 is R3, the curvature radius of the image-side surface 122 of the second lens element 120 is R4, the curvature radius of the object-side surface 131 of the third lens element 130 is R5, the curvature radius of the image-side surface 132 of the third lens element 130 is R6, the curvature radius of the object-side surface 141 of the fourth lens element 140 is R7, the curvature radius of the image-side surface 142 of the fourth lens element 140 is R8, the curvature radius of the object-side surface 151 of the fifth lens element 150 is R9, a curvature radius of the image-side surface 152 of the fifth lens element 150 is R10, a curvature radius of the object-side surface 161 of the sixth lens element 160 is R11, a curvature radius of the image-side surface 162 of the sixth lens element 160 is R12, a curvature radius of the object-side surface 171 of the seventh lens element 170 is R13, and a curvature radius of the image-side surface 172 of the seventh lens element 170 is R14, the following conditions are satisfied: |f/R1|+|f/R2|=3.93; |f/R3|+|f/R4|=5.49; |f/R5|+|f/R6|=2.20; |f/R7|+|f/R8|=0.27; |f/R9|+|f/R10|=0.88; |f/R11|+|f/R12|=0.07; and |f/R13|+|f/R14|=3.21. In other words, a curvature radius of an object-side surface of a lens element of the photographing optical lens assembly is Rf, a curvature radius of an image-side surface of the lens element is Rr, and the following condition is satisfied by three lens elements (the fourth lens element 140, the fifth lens element 150 and the sixth lens element 160) of the photographing optical lens assembly in the 1st embodiment: |f/Rf|+|f/Rr|<1.0.

The detailed optical data of the 1st embodiment are shown in TABLE 1 and the aspheric surface data are shown in TABLE 2 below.

TABLE 1

1st Embodiment
f = 4.67 mm, Fno = 1.70, HFOV = 39.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.580 | | | | |
| 2 | Lens 1 | 1.910 | ASP | 0.473 | Plastic | 1.545 | 56.1 | 7.84 |
| 3 | | 3.154 | ASP | 0.047 | | | | |
| 4 | Lens 2 | 1.943 | ASP | 0.229 | Plastic | 1.669 | 19.5 | −12.95 |
| 5 | | 1.512 | ASP | 0.100 | | | | |
| 6 | Lens 3 | 2.482 | ASP | 0.595 | Plastic | 1.555 | 60.3 | 5.28 |
| 7 | | 14.756 | ASP | 0.153 | | | | |
| 8 | Stop | Plano | | 0.263 | | | | |
| 9 | Lens 4 | −39.172 | ASP | 0.334 | Plastic | 1.669 | 19.5 | 246.84 |
| 10 | | −31.768 | ASP | 0.387 | | | | |
| 11 | Lens 5 | 16.903 | ASP | 0.417 | Plastic | 1.669 | 19.5 | −21.76 |
| 12 | | 7.743 | ASP | 0.151 | | | | |
| 13 | Lens 6 | 76.779 | ASP | 0.351 | Plastic | 1.669 | 19.5 | 94.10 |
| 14 | | −348.432 | ASP | 0.118 | | | | |
| 15 | Lens 7 | 4.322 | ASP | 1.088 | Plastic | 1.534 | 55.9 | −10.18 |
| 16 | | 2.197 | ASP | 0.500 | | | | |
| 17 | Filter | Plano | | 0.210 | Glass | 1.517 | 64.2 | — |
| 18 | | Plano | | 0.188 | | | | |
| 19 | Image | Plano | | — | | | | |

Reference wavelength is 587.6 nm (d-line).
Effective radius of Surface 8 is 1.196 mm.

TABLE 2

Aspheric Coefficients

| Surface # | 2 | 3 | 4 | 5 | 6 | 7 | 9 |
|---|---|---|---|---|---|---|---|
| k = | 1.3625E−01 | 2.2612E+00 | −3.1773E−02 | −1.6611E−01 | 1.0402E+00 | 5.2883E+01 | −9.0000E+01 |
| A4 = | 4.1655E−04 | −7.6148E−02 | −1.8853E−01 | −1.7043E−01 | −3.8647E−02 | −1.6359E−02 | −3.7020E−02 |
| A6 = | 5.6857E−03 | 1.8124E−01 | 2.8800E−01 | 1.9166E−01 | 5.2566E−02 | 4.6647E−02 | −7.7482E−02 |
| A8 = | −5.5485E−03 | −1.9283E−01 | −3.1164E−01 | −1.8158E−01 | −3.5278E−02 | −1.4502E−01 | 1.6087E−01 |
| A10 = | 5.4235E−04 | 9.4729E−02 | 1.7572E−01 | 7.6380E−02 | 4.1718E−03 | 2.1702E−01 | −1.9837E−01 |
| A12 = | 9.1908E−04 | −1.9654E−02 | −4.7656E−02 | −6.6649E−03 | 3.2014E−03 | −1.5261E−01 | 1.2133E−01 |
| A14 = | −4.6688E−04 | 9.5058E−04 | 4.8027E−03 | −2.9692E−03 | 6.5281E−04 | 4.3430E−02 | −2.7139E−02 |

| Surface # | 10 | 11 | 12 | 13 | 14 | 15 | 16 |
|---|---|---|---|---|---|---|---|
| k = | 1.6561E+00 | −7.6395E+01 | −7.5638E+01 | 9.0000E+01 | −9.0000E+01 | −4.7442E−01 | −9.1830E−01 |
| A4 = | −5.4332E−02 | −9.6023E−02 | −1.2054E−01 | 2.0864E−02 | 5.1134E−02 | −1.4257E−01 | −1.1405E−01 |
| A6 = | 1.5656E−02 | 8.6534E−02 | 1.5906E−01 | −2.1481E−02 | −3.0556E−02 | 7.3973E−02 | 4.2970E−02 |
| A8 = | −5.4411E−02 | −8.8992E−02 | −1.7020E−01 | −2.8472E−02 | −2.0319E−02 | −3.4526E−02 | −1.4096E−02 |
| A10 = | 7.5042E−02 | 3.1339E−02 | 9.9774E−02 | 1.4246E−02 | 2.0095E−02 | 1.1636E−02 | 3.2865E−03 |
| A12 = | −5.9268E−02 | −4.1678E−03 | −3.6218E−02 | −4.8582E−03 | −6.9751E−03 | −2.4268E−03 | −5.0691E−04 |
| A14 = | 2.6715E−02 | −8.0389E−04 | 7.5708E−03 | −7.7506E−04 | 1.2612E−03 | 2.9451E−04 | 4.8242E−05 |
| A16 = | −4.5963E−03 | | −6.7089E−04 | 1.5051E−04 | −1.2031E−04 | −1.9097E−05 | −2.5476E−06 |
| A18 = | | | | −8.3141E−06 | 4.8230E−06 | 5.1296E−07 | 5.6903E−08 |

In TABLE 1, the curvature radius, the thickness and the focal length are shown in millimeters (mm). Surface numbers 0-19 represent the surfaces sequentially arranged from the object-side to the image-side along the optical axis. In TABLE 2, k represents the conic coefficient of the equation of the aspheric surface profiles. A4-A18 represent the aspheric coefficients ranging from the 4th order to the 18th order. The tables presented below for each embodiment are the corresponding schematic parameter and aberration curves, and the definitions of the tables are the same as TABLE 1 and TABLE 2 of the 1st embodiment. Therefore, an explanation in this regard will not be provided again.

2nd Embodiment

Figure 3:
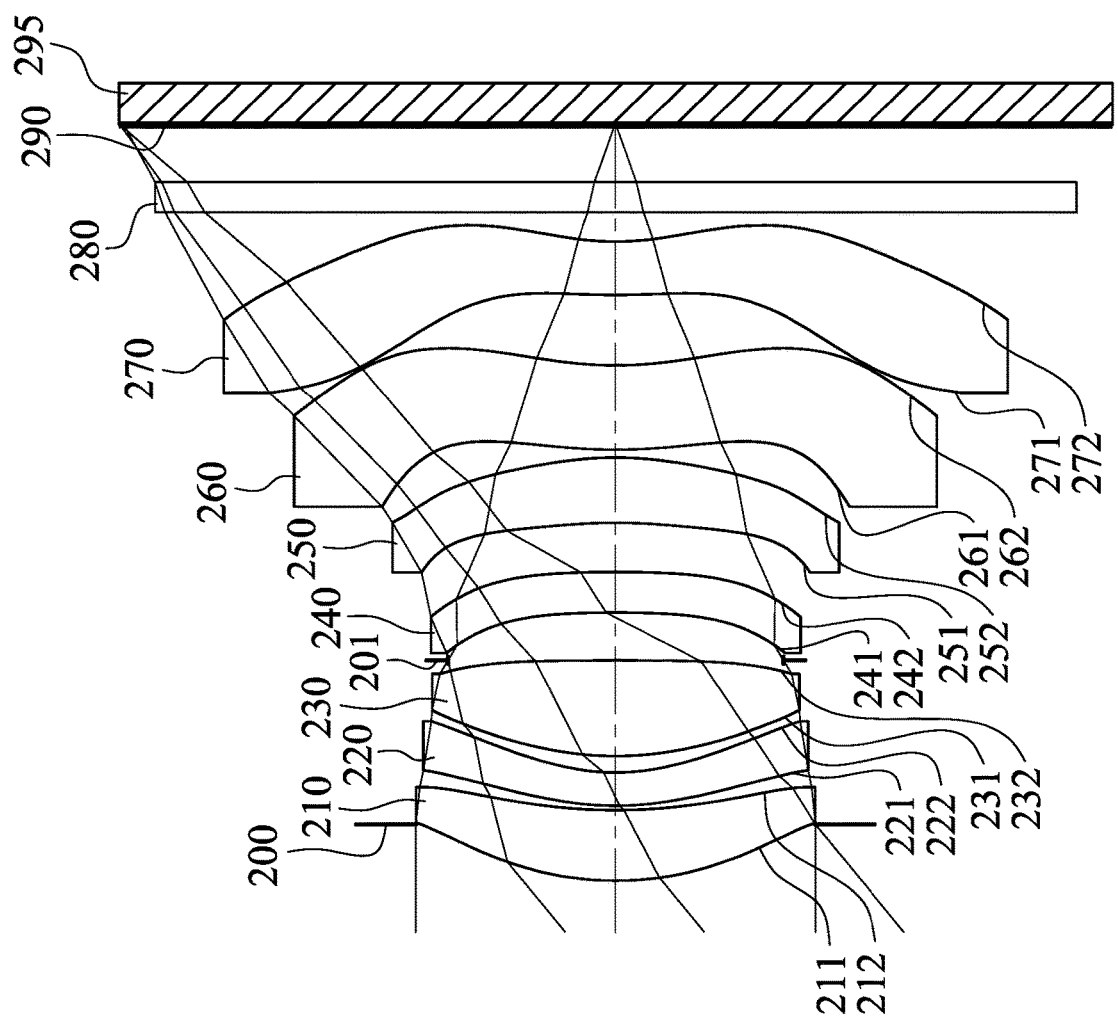
FIG. 3 is a schematic view of an imaging apparatus according to the 2nd embodiment of the present disclosure.
Figure 4:
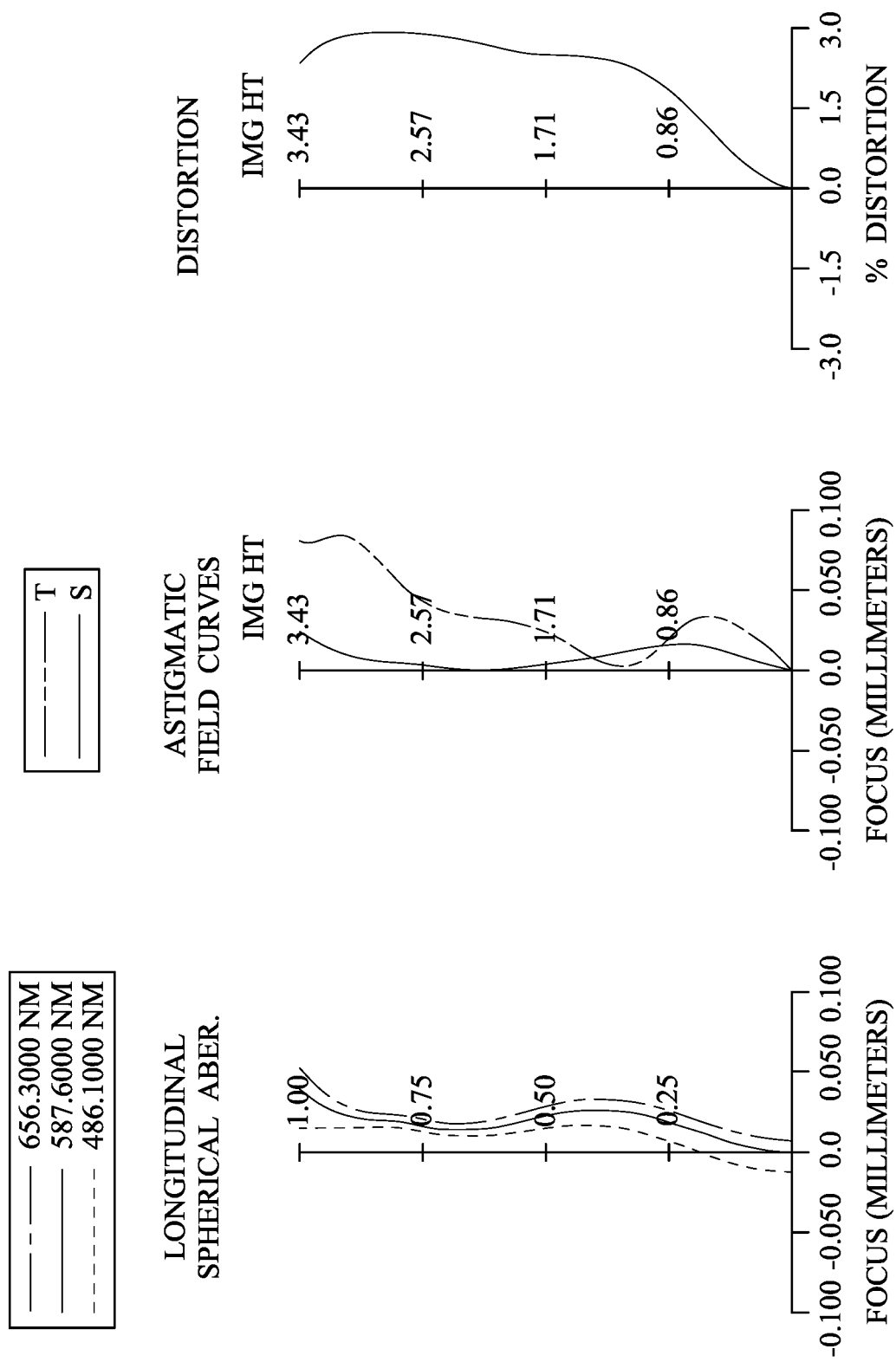
FIG. 4 shows spherical aberration curves, astigmatic field curves and a distortion curve of the imaging apparatus according to the 2nd embodiment.

FIG. 3 is a schematic view of an imaging apparatus according to the 2nd embodiment of the present disclosure. FIG. 4 shows spherical aberration curves, astigmatic field curves and a distortion curve of the imaging apparatus according to the 2nd embodiment. In FIG. 3, the imaging apparatus includes a photographing optical lens assembly (its reference numeral is omitted) and an image sensor 295. The photographing optical lens assembly includes, in order from an object side to an image side, an aperture stop 200, a first lens element 210, a second lens element 220, a third lens element 230, a stop 201, a fourth lens element 240, a fifth lens element 250, a sixth lens element 260, a seventh lens element 270, a filter 280 and an image surface 290. The image sensor 295 is disposed on the image surface 290 of the photographing optical lens assembly. The photographing optical lens assembly includes seven lens elements (210, 220, 230, 240, 250, 260 and 270) without additional one or more lens elements inserted between the first lens element 210 and the seventh lens element 270, and there is an air gap in a paraxial region between each of adjacent lens elements of the seven lens elements.

The first lens element 210 with positive refractive power has an object-side surface 211 being convex in a paraxial region thereof and an image-side surface 212 being concave in a paraxial region thereof. The first lens element 210 is made of a plastic material, and has the object-side surface 211 and the image-side surface 212 being both aspheric.

The second lens element 220 with negative refractive power has an object-side surface 221 being convex in a paraxial region thereof and an image-side surface 222 being concave in a paraxial region thereof. The second lens element 220 is made of a plastic material, and has the object-side surface 221 and the image-side surface 222 being both aspheric.

The third lens element 230 with positive refractive power has an object-side surface 231 being convex in a paraxial region thereof and an image-side surface 232 being convex in a paraxial region thereof. The third lens element 230 is made of a plastic material, and has the object-side surface 231 and the image-side surface 232 being both aspheric.

The fourth lens element 240 with negative refractive power has an object-side surface 241 being concave in a paraxial region thereof and an image-side surface 242 being convex in a paraxial region thereof. The fourth lens element 240 is made of a plastic material, and has the object-side surface 241 and the image-side surface 242 being both aspheric.

The fifth lens element 250 with positive refractive power has an object-side surface 251 being concave in a paraxial region thereof and an image-side surface 252 being convex in a paraxial region thereof. The fifth lens element 250 is made of a plastic material, and has the object-side surface 251 and the image-side surface 252 being both aspheric.

The sixth lens element 260 with negative refractive power has an object-side surface 261 being convex in a paraxial region thereof and an image-side surface 262 being concave in a paraxial region thereof. The sixth lens element 260 is made of a plastic material, and has the object-side surface 261 and the image-side surface 262 being both aspheric. Furthermore, the image-side surface 262 of the sixth lens element 260 includes at least one inflection point in an off-axis region thereof.

The seventh lens element 270 with negative refractive power has an object-side surface 271 being convex in a paraxial region thereof and an image-side surface 272 being concave in a paraxial region thereof. The seventh lens element 270 is made of a plastic material, and has the object-side surface 271 and the image-side surface 272 being both aspheric. Furthermore, the image-side surface 272 of the seventh lens element 270 includes at least one inflection point in an off-axis region thereof.

The filter 280 is made of a glass material and located between the seventh lens element 270 and the image surface 290, and will not affect the focal length of the photographing optical lens assembly.

The detailed optical data of the 2nd embodiment are shown in TABLE 3 and the aspheric surface data are shown in TABLE 4 below.

TABLE 3

2nd Embodiment f = 4.05 mm, Fno = 1.45, HFOV = 39.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.390 | | | | |
| 2 | Lens 1 | 2.208 | ASP | 0.488 | Plastic | 1.545 | 56.0 | 8.22 |
| 3 | | 4.016 | ASP | 0.030 | | | | |
| 4 | Lens 2 | 2.103 | ASP | 0.230 | Plastic | 1.660 | 20.4 | −9.66 |
| 5 | | 1.512 | ASP | 0.115 | | | | |
| 6 | Lens 3 | 2.355 | ASP | 0.665 | Plastic | 1.544 | 55.9 | 4.14 |
| 7 | | −47.070 | ASP | 0.000 | | | | |
| 8 | Stop | Plano | | 0.330 | | | | |
| 9 | Lens 4 | −9.651 | ASP | 0.280 | Plastic | 1.660 | 20.4 | −145.21 |
| 10 | | −10.856 | ASP | 0.341 | | | | |
| 11 | Lens 5 | −3.756 | ASP | 0.451 | Plastic | 1.566 | 37.4 | 9.97 |
| 12 | | −2.353 | ASP | 0.053 | | | | |
| 13 | Lens 6 | 3.677 | ASP | 0.589 | Plastic | 1.688 | 18.7 | −19.00 |
| 14 | | 2.682 | ASP | 0.485 | | | | |
| 15 | Lens 7 | 5.177 | ASP | 0.370 | Plastic | 1.544 | 55.9 | −5.67 |
| 16 | | 1.884 | ASP | 0.200 | | | | |
| 17 | Filter | Plano | | 0.210 | Glass | 1.517 | 64.2 | — |
| 18 | | Plano | | 0.396 | | | | |
| 19 | Image | Plano | | — | | | | |

Reference wavelength is 587.6 nm (d-line).

Effective radius of Surface 8 is 1.160 mm.

TABLE 4

Aspheric Coefficients

| Surface # | 2 | 3 | 4 | 5 | 6 | 7 | 9 |
|---|---|---|---|---|---|---|---|
| k = | 1.7456E−01 | −3.4621E+01 | −1.2104E+00 | −8.2875E−01 | −1.3549E+01 | −8.3489E+01 | −2.9584E+01 |
| A4 = | −5.1106E−04 | 7.3150E−02 | −8.8802E−02 | −1.3810E−01 | 8.8817E−02 | −3.0360E−02 | −1.2030E−01 |
| A6 = | −9.4003E−03 | −7.9343E−02 | 4.9736E−02 | 1.0880E−01 | −7.7278E−02 | −3.8535E−03 | 2.8337E−02 |
| A8 = | 1.6369E−03 | 4.6589E−02 | −4.7243E−02 | −8.7711E−02 | 8.4530E−02 | 2.2067E−04 | −9.5762E−02 |
| A10 = | −2.1212E−03 | −1.6629E−02 | 3.8832E−02 | 4.2081E−02 | −7.9332E−02 | −5.8776E−05 | 1.3262E−01 |
| A12 = | 3.0256E−05 | 1.9837E−03 | −1.6662E−02 | −1.0770E−02 | 3.9663E−02 | −1.8758E−04 | −8.3328E−02 |
| A14 = |  |  | 2.5021E−03 | 9.9730E−04 | −7.4806E−03 | 1.0607E−04 | 2.3937E−02 |
| A16 = |  |  |  |  |  |  | −2.3326E−03 |

| Surface # | 10 | 11 | 12 | 13 | 14 | 15 | 16 |
|---|---|---|---|---|---|---|---|
| k = | −4.0395E+01 | −4.1515E+01 | −9.8656E+00 | −4.6095E+01 | −7.7981E+00 | −9.0000E+01 | −4.0532E+00 |
| A4 = | −9.4815E−02 | −4.2891E−02 | 1.0382E−02 | 5.5167E−02 | −3.1916E−02 | −1.4162E−01 | −1.6126E−01 |
| A6 = | 4.9041E−02 | 3.8433E−01 | 6.8445E−02 | −1.8739E−01 | −3.3584E−02 | −2.0917E−02 | 7.1269E−02 |
| A8 = | −1.3130E−01 | −1.0995E+00 | −2.3876E−01 | 1.6406E−01 | 3.2596E−02 | 4.6379E−02 | −3.0054E−02 |
| A10 = | 1.4107E−01 | 1.6970E+00 | 3.2635E−01 | −9.5214E−02 | −1.7009E−02 | −1.8932E−02 | 1.0542E−02 |
| A12 = | −6.8158E−02 | −1.6601E+00 | −2.5975E−01 | 3.7093E−02 | 5.3169E−03 | 4.1463E−03 | −2.4818E−03 |
| A14 = | 1.0638E−02 | 1.0190E+00 | 1.1990E−01 | −1.1990E−02 | −1.0078E−03 | −5.5558E−04 | 3.6526E−04 |
| A16 = | 2.1380E−03 | −3.7678E−01 | −3.0798E−02 | 3.1889E−03 | 1.1459E−04 | 4.5577E−05 | −3.2245E−05 |
| A18 = | −6.3511E−04 | 7.5603E−02 | 4.0405E−03 | −5.1298E−04 | −7.2536E−06 | −2.0978E−06 | 1.5595E−06 |
| A20 = |  | −6.2369E−03 | −2.0967E−04 | 3.3536E−05 | 1.9727E−07 | 4.1274E−08 | −3.1694E−08 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from TABLE 3 and TABLE 4 as the following values and satisfy the following conditions:

| 2nd Embodiment | | | |
|---|---|---|---|
| f [mm] | 4.05 | $|f/f|$min | 0.028 |
| Fno | 1.45 | $|f/f|$max | 0.98 |
| HFOV [deg.] | 39.5 | $|f/f4| + |f/f5| + |f/f6|$ | 0.65 |
| V2 | 20.4 | f/EPD | 1.45 |
| V4 | 20.4 | TL/f | 1.29 |
| V6 | 18.7 | SD/TD | 0.91 |
| Vmin | 18.7 | TL/ImgH | 1.53 |
| V4 + V5 + V6 | 76.5 | BL/TD | 0.18 |
| T56/T67 | 0.11 | ImgH/f | 0.85 |
| CT7/CT1 | 0.76 | $|f/R1| + |f/R2|$ | 2.84 |
| R5/CT3 | 3.54 | $|f/R3| + |f/R4|$ | 4.60 |
| f/R9 | −1.08 | $|f/R5| + |f/R6|$ | 1.81 |
| (R3 − R4)/(R3 + R4) | 0.16 | $|f/R7| + |f/R8|$ | 0.79 |
| (R5 + R6)/(R5 − R6) | −0.90 | $|f/R9| + |f/R10|$ | 2.80 |
| (R7 − R8)/(R7 + R8) | −0.06 | $|f/R11| + |f/R12|$ | 2.61 |
| f/f3 | 0.98 | $|f/R13| + |f/R14|$ | 2.93 |
| $|f1/f2|$ | 0.85 | | |

In the 2nd embodiment, Abbe numbers of three lens elements (220, 240 and 260) of the photographing optical lens assembly are greater than 10.0 and smaller than 22.0. Furthermore, the following condition is satisfied by one lens element (240) of the photographing optical lens assembly: $|f/Rf|+|f/Rr|<1.0$.

3rd Embodiment

Figure 5:
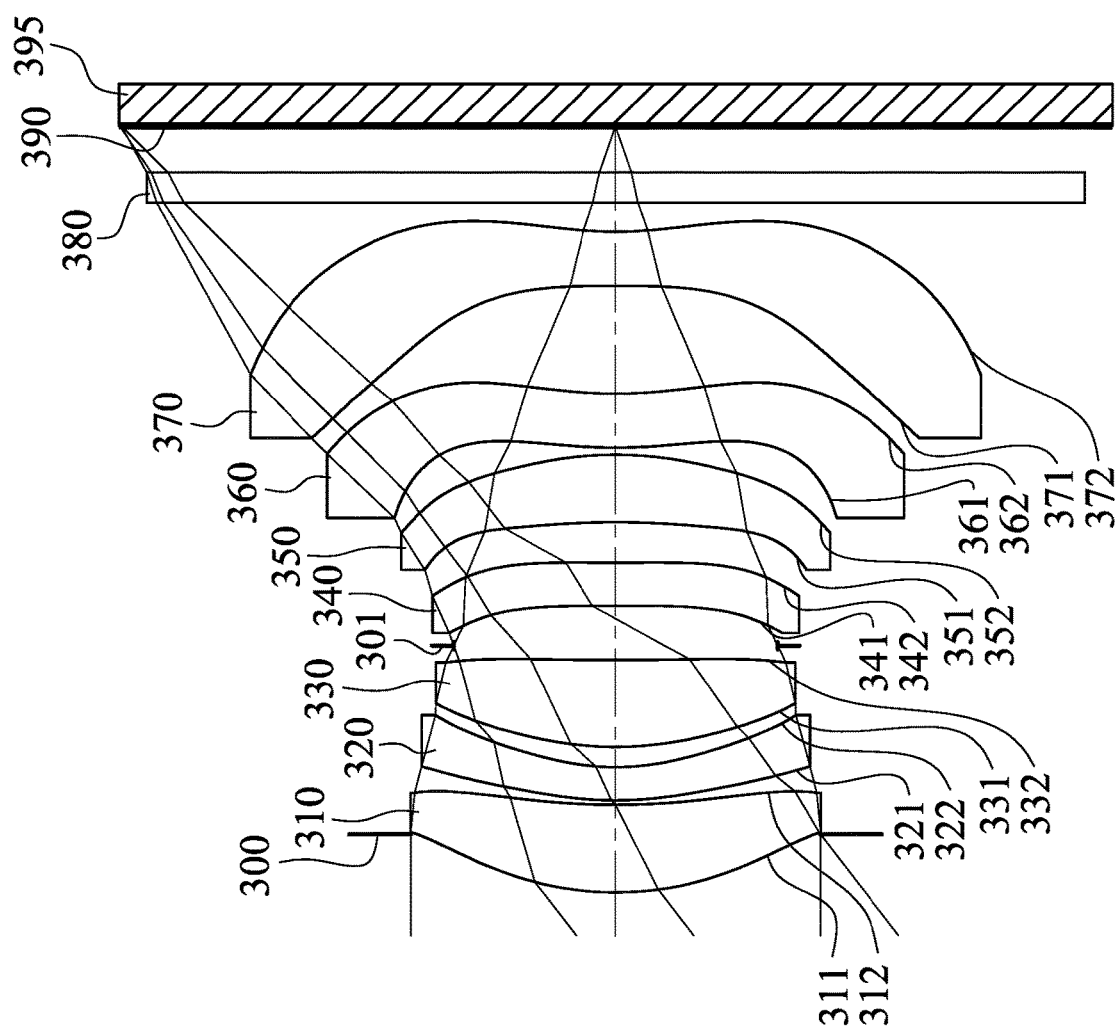
FIG. 5 is a schematic view of an imaging apparatus according to the 3rd embodiment of the present disclosure.
Figure 6:
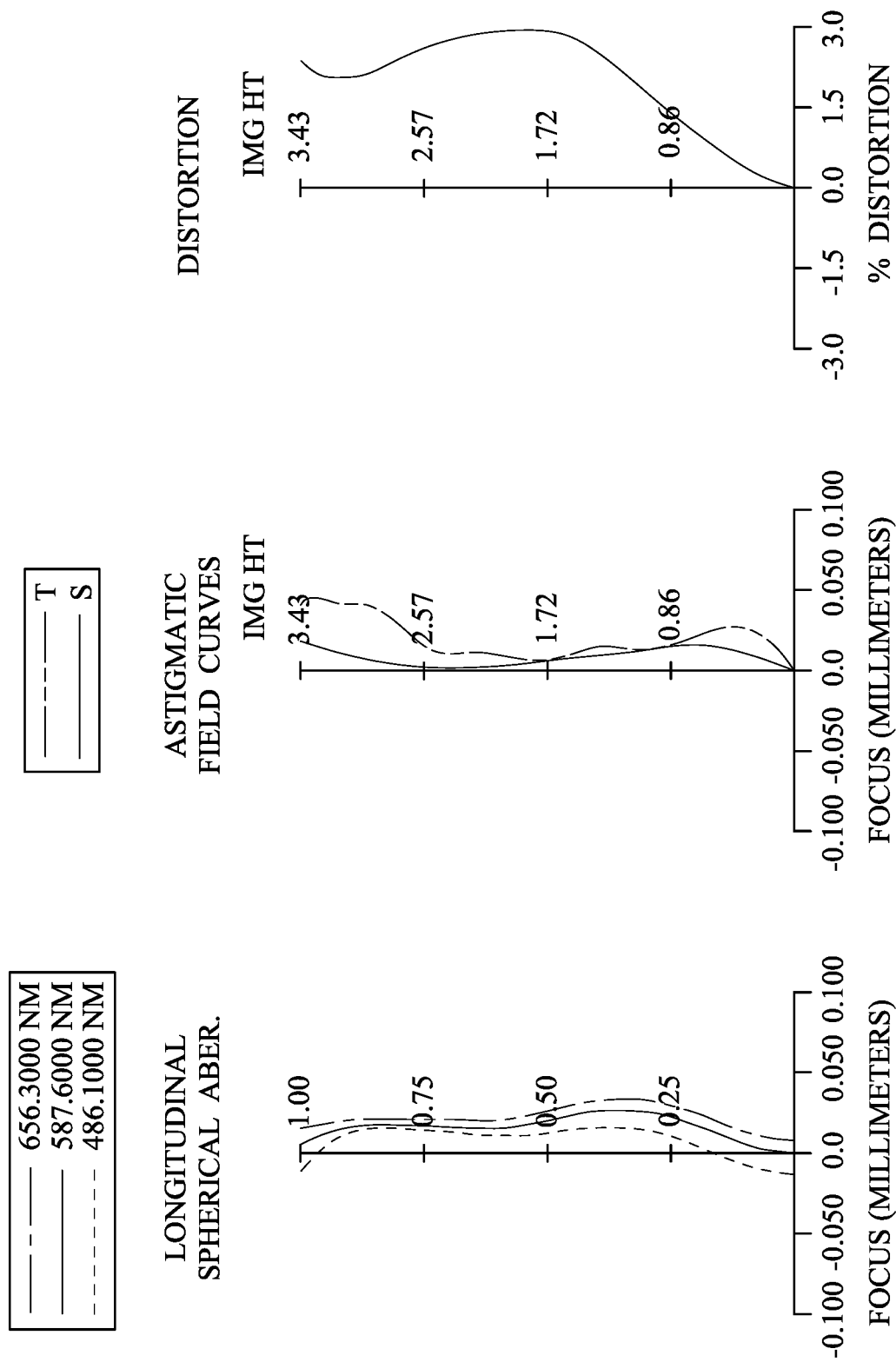
FIG. 6 shows spherical aberration curves, astigmatic field curves and a distortion curve of the imaging apparatus according to the 3rd embodiment.

FIG. 5 is a schematic view of an imaging apparatus according to the 3rd embodiment of the present disclosure. FIG. 6 shows spherical aberration curves, astigmatic field curves and a distortion curve of the imaging apparatus according to the 3rd embodiment. In FIG. 5, the imaging apparatus includes a photographing optical lens assembly (its reference numeral is omitted) and an image sensor 395. The photographing optical lens assembly includes, in order from an object side to an image side, an aperture stop 300, a first lens element 310, a second lens element 320, a third lens element 330, a stop 301, a fourth lens element 340, a fifth lens element 350, a sixth lens element 360, a seventh lens element 370, a filter 380 and an image surface 390. The image sensor 395 is disposed on the image surface 390 of the photographing optical lens assembly. The photographing optical lens assembly includes seven lens elements (310, 320, 330, 340, 350, 360 and 370) without additional one or more lens elements inserted between the first lens element 310 and the seventh lens element 370, and there is an air gap in a paraxial region between each of adjacent lens elements of the seven lens elements.

The first lens element 310 with positive refractive power has an object-side surface 311 being convex in a paraxial region thereof and an image-side surface 312 being concave in a paraxial region thereof. The first lens element 310 is made of a plastic material, and has the object-side surface 311 and the image-side surface 312 being both aspheric.

The second lens element 320 with negative refractive power has an object-side surface 321 being convex in a paraxial region thereof and an image-side surface 322 being concave in a paraxial region thereof. The second lens element 320 is made of a plastic material, and has the object-side surface 321 and the image-side surface 322 being both aspheric.

The third lens element 330 with positive refractive power has an object-side surface 331 being convex in a paraxial region thereof and an image-side surface 332 being concave in a paraxial region thereof. The third lens element 330 is made of a plastic material, and has the object-side surface 331 and the image-side surface 332 being both aspheric.

The fourth lens element 340 with negative refractive power has an object-side surface 341 being concave in a paraxial region thereof and an image-side surface 342 being concave in a paraxial region thereof. The fourth lens element 340 is made of a plastic material, and has the object-side surface 341 and the image-side surface 342 being both aspheric.

The fifth lens element 350 with positive refractive power has an object-side surface 351 being concave in a paraxial region thereof and an image-side surface 352 being convex in a paraxial region thereof. The fifth lens element 350 is made of a plastic material, and has the object-side surface 351 and the image-side surface 352 being both aspheric.

The sixth lens element 360 with positive refractive power has an object-side surface 361 being convex in a paraxial region thereof and an image-side surface 362 being concave in a paraxial region thereof. The sixth lens element 360 is made of a plastic material, and has the object-side surface 361 and the image-side surface 362 being both aspheric. Furthermore, the image-side surface 362 of the sixth lens element 360 includes at least one inflection point in an off axis region thereof.

The seventh lens element 370 with negative refractive power has an object-side surface 371 being concave in a paraxial region thereof and an image-side surface 372 being concave in a paraxial region thereof. The seventh lens element 370 is made of a plastic material, and has the object-side surface 371 and the image-side surface 372 being both aspheric. Furthermore, the image-side surface 372 of the seventh lens element 370 includes at least one inflection point in an off-axis region thereof.

The filter 380 is made of a glass material and located between the seventh lens element 370 and the image surface 390, and will not affect the focal length of the photographing optical lens assembly.

The detailed optical data of the 3rd embodiment are shown in TABLE 5 and the aspheric surface data are shown in TABLE 6 below.

TABLE 5

3rd Embodiment
f = 4.30 mm, Fno = 1.45, HFOV = 37.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.400 | | | | |
| 2 | Lens 1 | 2.185 | ASP | 0.607 | Plastic | 1.545 | 56.0 | 6.37 |
| 3 | | 5.317 | ASP | 0.030 | | | | |
| 4 | Lens 2 | 2.543 | ASP | 0.230 | Plastic | 1.660 | 20.4 | −8.41 |
| 5 | | 1.682 | ASP | 0.140 | | | | |
| 6 | Lens 3 | 2.408 | ASP | 0.602 | Plastic | 1.544 | 55.9 | 5.02 |
| 7 | | 18.517 | ASP | 0.100 | | | | |
| 8 | Stop | Plano | | 0.277 | | | | |
| 9 | Lens 4 | −131.778 | ASP | 0.298 | Plastic | 1.660 | 20.4 | −42.66 |
| 10 | | 35.830 | ASP | 0.280 | | | | |
| 11 | Lens 5 | −5.247 | ASP | 0.464 | Plastic | 1.566 | 37.4 | 10.17 |
| 12 | | −2.833 | ASP | 0.050 | | | | |
| 13 | Lens 6 | 2.907 | ASP | 0.376 | Plastic | 1.660 | 20.4 | 124.64 |
| 14 | | 2.858 | ASP | 0.747 | | | | |
| 15 | Lens 7 | −19.354 | ASP | 0.374 | Plastic | 1.544 | 55.9 | −4.09 |
| 16 | | 2.531 | ASP | 0.200 | | | | |
| 17 | Filter | Plano | | 0.210 | Glass | 1.517 | 64.2 | — |
| 18 | | Plano | | 0.320 | | | | |
| 19 | Image | Plano | | — | | | | |

Reference wavelength is 587.6 nm (d-line).
Effective radius of Surface 8 is 1.120 mm.

TABLE 6

Aspheric Coefficients

| Surface # | 2 | 3 | 4 | 5 | 6 | 7 | 9 |
|---|---|---|---|---|---|---|---|
| k = | 4.0929E−02 | −5.4796E+01 | −5.4204E−01 | −6.8771E−01 | −1.3589E+01 | −1.0000E+00 | −1.0000E+00 |
| A4 = | −9.3955E−04 | 5.5360E−02 | −8.4173E−02 | −1.3661E−01 | 7.5828E−02 | −2.4508E−02 | −1.1973E−01 |
| A6 = | −9.2901E−03 | −8.1068E−02 | 4.9640E−02 | 1.1556E−01 | −8.0399E−02 | 3.4127E−04 | 3.5707E−02 |
| A8 = | 1.5815E−03 | 4.8725E−02 | −4.7879E−02 | −8.6585E−02 | 9.3166E−02 | −2.8048E−03 | −9.8634E−02 |
| A10 = | −1.7775E−03 | −1.6274E−02 | 4.0657E−02 | 4.4811E−02 | −7.9941E−02 | 5.9263E−04 | 1.3436E−01 |
| A12 = | 3.0256E−05 | 1.9837E−03 | −1.6662E−02 | −1.0770E−02 | 3.9663E−02 | −1.8758E−04 | −8.3328E−02 |
| A14 = | | | 2.5021E−03 | 9.9730E−04 | −7.4806E−03 | 1.0607E−04 | 2.3937E−02 |
| A16 = | | | | | | | −2.3326E−03 |

| Surface # | 10 | 11 | 12 | 13 | 14 | 15 | 16 |
|---|---|---|---|---|---|---|---|
| k = | −9.0000E+01 | −8.9322E+01 | −6.3825E+00 | −5.5051E+01 | −1.5387E+01 | −1.7122E+01 | −1.1891E+01 |
| A4 = | −9.8340E−02 | −2.8710E−02 | −2.0814E−01 | −8.6352E−02 | −6.2695E−02 | −2.0165E−01 | −1.3442E−01 |
| A6 = | 3.7512E−02 | 1.6525E−01 | 8.0193E−01 | 2.6129E−01 | 5.9448E−02 | 1.0916E−01 | 9.9348E−02 |
| A8 = | −1.2500E−01 | −3.9014E−01 | −1.6612E+00 | −7.0352E−01 | −1.2014E−01 | −1.3026E−02 | −5.9722E−02 |
| A10 = | 1.4065E−01 | 4.3859E−01 | 2.1291E+00 | 9.6985E−01 | 1.1594E−01 | −5.4953E−02 | 2.2989E−02 |
| A12 = | −6.8158E−02 | −3.3881E−01 | −1.7975E+00 | −8.5174E−01 | −6.5205E−02 | 4.9991E−02 | −5.7146E−03 |

TABLE 6-continued

Aspheric Coefficients

| A14 = | 1.0638E−02 | 1.7529E−01 | 9.8922E−01 | 4.9612E−01 | 2.2838E−02 | −1.9801E−02 | 9.3299E−04 |
|---|---|---|---|---|---|---|---|
| A16 = | 2.1380E−03 | −5.3746E−02 | −3.4094E−01 | −1.8744E−01 | −4.8977E−03 | 4.1225E−03 | −9.8265E−05 |
| A18 = | −6.3511E−04 | 6.2394E−03 | 6.6654E−02 | 4.1586E−02 | 5.8578E−04 | −4.4121E−04 | 6.0824E−06 |
| A20 = | | 4.0121E−04 | −5.6102E−03 | −4.1072E−03 | −2.9785E−05 | 1.9195E−05 | −1.6795E−07 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from TABLE 5 and TABLE 6 as the following values and satisfy the following conditions:

| 3rd Embodiment | | | |
|---|---|---|---|
| f [mm] | 4.30 | |f/fi|min | 0.035 |
| Fno | 1.45 | |f/fi|max | 1.05 |
| HFOV [deg.] | 37.8 | |f/f4| + |f/f5| + |f/f6| | 0.56 |
| V2 | 20.4 | f/EPD | 1.45 |
| V4 | 20.4 | TL/f | 1.23 |
| V6 | 20.4 | SD/TD | 0.91 |
| Vmin | 20.4 | TL/ImgH | 1.55 |
| V4 + V5 + V6 | 78.2 | BL/TD | 0.16 |
| T56/T67 | 0.07 | ImgH/f | 0.80 |
| CT7/CT1 | 0.62 | |f/R1| + |f/R2| | 2.78 |
| R5/CT3 | 4.00 | |f/R3| + |f/R4| | 4.25 |
| f/R9 | −0.82 | |f/R5| + |f/R6| | 2.02 |
| (R3 − R4)/(R3 + R4) | 0.20 | |f/R7| + |f/R8| | 0.15 |
| (R5 + R6)/(R5 − R6) | −1.30 | |f/R9| + |f/R10| | 2.34 |
| (R7 − R8)/(R7 + R8) | 1.75 | |f/R11| + |f/R12| | 2.99 |
| f/f3 | 0.86 | |f/R13| + |f/R14| | 1.92 |
| |f1/f2| | 0.76 | | |

In the 3rd embodiment, Abbe numbers of three lens elements (320, 340 and 360) of the photographing optical lens assembly are greater than 10.0 and smaller than 22.0. Furthermore, the following condition is satisfied by one lens element (340) of the photographing optical lens assembly: |f/Rf|+|f/Rr|<1.0.

4th Embodiment

Figure 7:
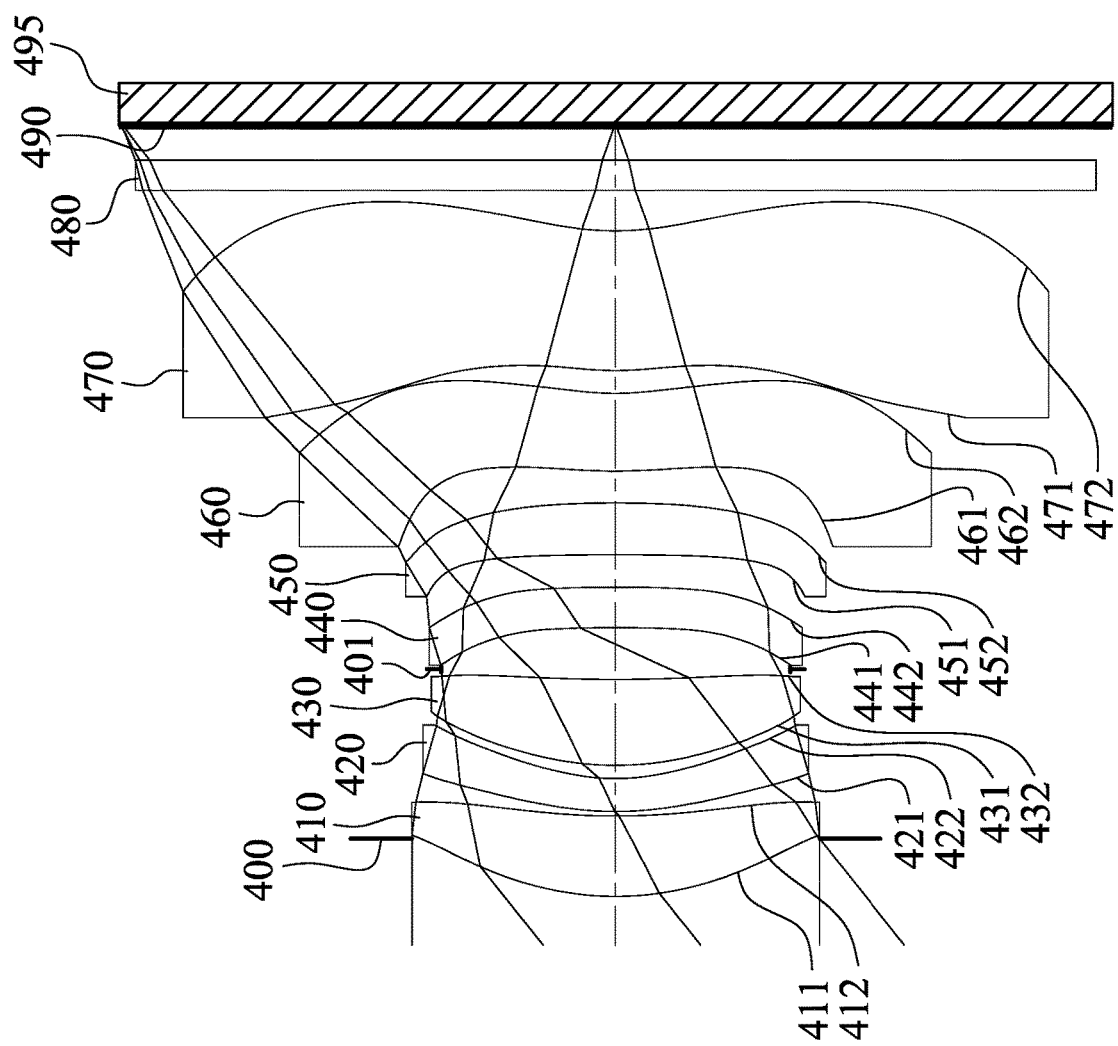
FIG. 7 is a schematic view of an imaging apparatus according to the 4th embodiment of the present disclosure.
Figure 8:
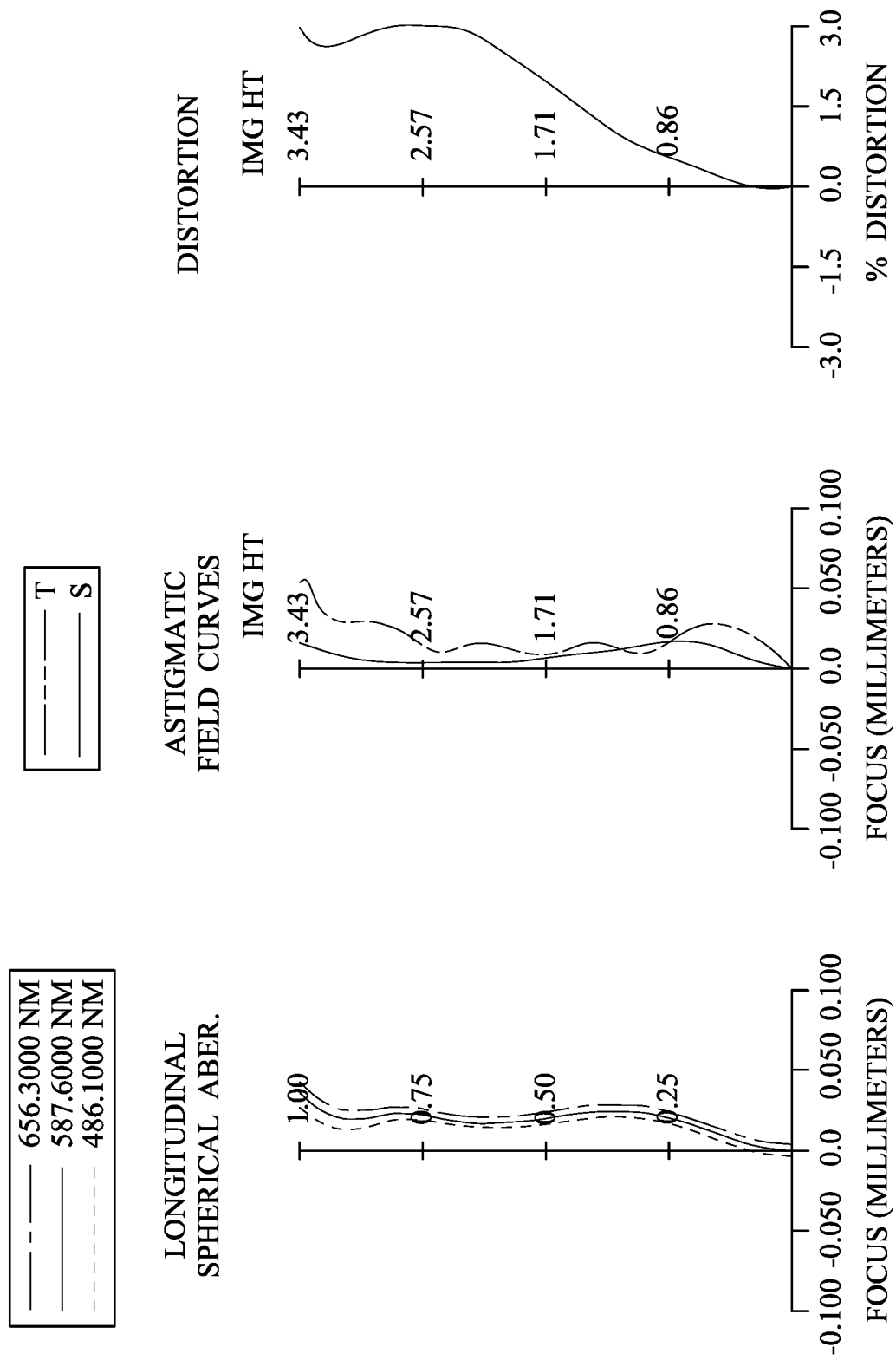
FIG. 8 shows spherical aberration curves, astigmatic field curves and a distortion curve of the imaging apparatus according to the 4th embodiment.

FIG. 7 is a schematic view of an imaging apparatus according to the 4th embodiment of the present disclosure. FIG. 8 shows spherical aberration curves, astigmatic field curves and a distortion curve of the imaging apparatus according to the 4th embodiment. In FIG. 7, the imaging apparatus includes a photographing optical lens assembly (its reference numeral is omitted) and an image sensor 495. The photographing optical lens assembly includes, in order from an object side to an image side, an aperture stop 400, a first lens element 410, a second lens element 420, a third lens element 430, a stop 401, a fourth lens element 440, a fifth lens element 450, a sixth lens element 460, a seventh lens element 470, a filter 480 and an image surface 490. The image sensor 495 is disposed on the image surface 490 of the photographing optical lens assembly. The photographing optical lens assembly includes seven lens elements (410, 420, 430, 440, 450, 460 and 470) without additional one or more lens elements inserted between the first lens element 410 and the seventh lens element 470, and there is an air gap in a paraxial region between each of adjacent lens elements of the seven lens elements. Furthermore, the seven lens elements drawn with the thinner lines in FIG. 7 are for showing the air gaps thereof with higher clarity.

The first lens element 410 with positive refractive power has an object-side surface 411 being convex in a paraxial region thereof and an image-side surface 412 being concave in a paraxial region thereof. The first lens element 410 is made of a plastic material, and has the object-side surface 411 and the image-side surface 412 being both aspheric.

The second lens element 420 with negative refractive power has an object-side surface 421 being convex in a paraxial region thereof and an image-side surface 422 being concave in a paraxial region thereof. The second lens element 420 is made of a plastic material, and has the object-side surface 421 and the image-side surface 422 being both aspheric.

The third lens element 430 with positive refractive power has an object-side surface 431 being convex in a paraxial region thereof and an image-side surface 432 being concave in a paraxial region thereof. The third lens element 430 is made of a plastic material, and has the object-side surface 431 and the image-side surface 432 being both aspheric.

The fourth lens element 440 with negative refractive power has an object-side surface 441 being concave in a paraxial region thereof and an image-side surface 442 being convex in a paraxial region thereof. The fourth lens element 440 is made of a plastic material, and has the object-side surface 441 and the image-side surface 442 being both aspheric.

The fifth lens element 450 with positive refractive power has an object-side surface 451 being concave in a paraxial region thereof and an image-side surface 452 being convex in a paraxial region thereof. The fifth lens element 450 is made of a plastic material, and has the object-side surface 451 and the image-side surface 452 being both aspheric.

The sixth lens element 460 with negative refractive power has an object-side surface 461 being convex in a paraxial region thereof and an image-side surface 462 being concave in a paraxial region thereof. The sixth lens element 460 is made of a plastic material, and has the object-side surface 461 and the image-side surface 462 being both aspheric. Furthermore, the image-side surface 462 of the sixth lens element 460 includes at least one inflection point in an off-axis region thereof.

The seventh lens element 470 with positive refractive power has an object-side surface 471 being convex in a paraxial region thereof and an image-side surface 472 being concave in a paraxial region thereof. The seventh lens element 470 is made of a plastic material, and has the object-side surface 471 and the image-side surface 472 being both aspheric. Furthermore, the image-side surface 472 of the seventh lens element 470 includes at least one inflection point in an off-axis region thereof.

The filter 480 is made of a glass material and located between the seventh lens element 470 and the image surface 490, and will not affect the focal length of the photographing optical lens assembly.

Five lens elements (410, 420, 430, 460 and 470) of the photographing optical lens assembly in the 4th embodiment have the object-side surfaces (411, 421, 431, 461 and 471) being convex in the paraxial regions thereof and the image-side surfaces (412, 422, 432, 462 and 472) being concave in the paraxial regions thereof.

The detailed optical data of the 4th embodiment are shown in TABLE 7 and the aspheric surface data are shown in TABLE 8 below.

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

TABLE 7

4th Embodiment
f = 4.15 mm, Fno = 1.47, HFOV = 38.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.400 | | | | |
| 2 | Lens 1 | 2.200 | ASP | 0.561 | Plastic | 1.545 | 56.0 | 6.66 |
| 3 | | 5.094 | ASP | 0.030 | | | | |
| 4 | Lens 2 | 2.286 | ASP | 0.230 | Plastic | 1.660 | 20.4 | −8.80 |
| 5 | | 1.575 | ASP | 0.091 | | | | |
| 6 | Lens 3 | 2.141 | ASP | 0.595 | Plastic | 1.544 | 55.9 | 4.86 |
| 7 | | 10.187 | ASP | 0.070 | | | | |
| 8 | Stop | Plano | | 0.288 | | | | |
| 9 | Lens 4 | −14.065 | ASP | 0.280 | Plastic | 1.660 | 20.4 | −117.07 |
| 10 | | −17.332 | ASP | 0.224 | | | | |
| 11 | Lens 5 | −24.046 | ASP | 0.364 | Plastic | 1.566 | 37.4 | 59.03 |
| 12 | | −14.060 | ASP | 0.219 | | | | |
| 13 | Lens 6 | 2.972 | ASP | 0.539 | Plastic | 1.660 | 20.4 | −7.16 |
| 14 | | 1.693 | ASP | 0.159 | | | | |
| 15 | Lens 7 | 1.999 | ASP | 0.972 | Plastic | 1.544 | 55.9 | 30.41 |
| 16 | | 1.884 | ASP | 0.280 | | | | |
| 17 | Filter | Plano | | 0.210 | Glass | 1.517 | 64.2 | — |
| 18 | | Plano | | 0.239 | | | | |
| 19 | Image | Plano | | — | | | | |

Reference wavelength is 587.6 nm (d-line).
Effective radius of Surface 8 is 1.210 mm.

TABLE 8

Aspheric Coefficients

| Surface # | 2 | 3 | 4 | 5 | 6 | 7 | 9 |
|---|---|---|---|---|---|---|---|
| k = | 7.4368E−02 | −5.9199E+01 | −6.6313E−01 | −7.6070E−01 | −1.1064E+01 | 1.0000E+01 | −9.0000E+01 |
| A4 = | −2.8604E−04 | 5.4321E−02 | −8.5996E−02 | −1.3821E−01 | 8.3038E−02 | −1.7705E−02 | −9.2137E−02 |
| A6 = | −8.2516E−03 | −8.0310E−02 | 4.7893E−02 | 1.1244E−01 | −7.9534E−02 | −1.1050E−03 | −3.8364E−02 |
| A8 = | 1.2596E−03 | 4.9774E−02 | −4.8709E−02 | −8.8171E−02 | 9.2011E−02 | −2.8181E−03 | 3.0670E−02 |
| A10 = | −1.5862E−03 | −1.6363E−02 | 4.1434E−02 | 4.5016E−02 | −7.9459E−02 | 1.3790E−04 | −9.0237E−04 |
| A12 = | 3.0256E−05 | 1.9837E−03 | −1.6662E−02 | −1.0770E−02 | 3.9663E−02 | −1.8758E−04 | −6.6236E−03 |
| A14 = | | | 2.5021E−03 | 9.9730E−04 | −7.4806E−03 | 1.0607E−04 | 2.8086E−03 |
| A16 = | | | | | | | −1.8893E−04 |

| Surface # | 10 | 11 | 12 | 13 | 14 | 15 | 16 |
|---|---|---|---|---|---|---|---|
| k = | −8.9403E+01 | 1.0000E+01 | 1.0000E+01 | −9.0000E+01 | −3.3315E+01 | −2.8720E+01 | −8.2090E+00 |
| A4 = | −7.7388E−02 | −4.9257E−02 | −2.6038E−01 | −1.3415E−01 | −1.3566E−01 | −2.9869E−01 | −7.5486E−02 |
| A6 = | −1.8092E−02 | 2.8183E−01 | 7.6836E−01 | 3.2118E−01 | 2.5254E−01 | 3.5138E−01 | 4.8821E−02 |
| A8 = | −8.4475E−02 | −9.8497E−01 | −1.5951E+00 | −7.0492E−01 | −2.9058E−01 | −2.7242E−01 | −2.5030E−02 |
| A10 = | 2.3088E−01 | 1.8089E+00 | 2.0779E+00 | 9.1832E−01 | 1.9464E−01 | 1.3321E−01 | 8.7300E−03 |
| A12 = | −2.4670E−01 | −2.0649E+00 | −1.7189E+00 | −8.0675E−01 | −8.2238E−02 | −4.0882E−02 | −2.0224E−03 |
| A14 = | 1.4109E−01 | 1.4997E+00 | 8.9167E−01 | 4.7892E−01 | 2.2298E−02 | 7.8953E−03 | 3.0345E−04 |
| A16 = | −4.2745E−02 | −6.7644E−01 | −2.7621E−01 | −1.8235E−01 | −3.7657E−03 | −9.3526E−04 | −2.8169E−05 |
| A18 = | 5.4305E−03 | 1.7169E−01 | 4.4412E−02 | 3.9342E−02 | 3.6046E−04 | 6.2295E−05 | 1.4635E−06 |
| A20 = | | −1.8884E−02 | −2.4697E−03 | −3.6121E−03 | −1.4925E−05 | −1.7925E−06 | −3.2448E−08 |

Moreover, these parameters can be calculated from TABLE 7 and TABLE 8 as the following values and satisfy the following conditions:

| 4th Embodiment | | | |
|---|---|---|---|
| f [mm] | 4.15 | \|f/fi\|min | 0.035 |
| Fno | 1.47 | \|f/fi\|max | 0.85 |
| HFOV [deg.] | 38.6 | \|f/f4\| + \|f/f5\| + \|f/f6\| | 0.69 |
| V2 | 20.4 | f/EPD | 1.47 |
| V4 | 20.4 | TL/f | 1.29 |
| V6 | 20.4 | SD/TD | 0.91 |
| Vmin | 20.4 | TL/ImgH | 1.56 |
| V4 + V5 + V6 | 78.2 | BL/TD | 0.16 |
| T56/T67 | 1.37 | ImgH/f | 0.83 |
| CT7/CT1 | 1.73 | \|f/R1\| + \|f/R2\| | 2.70 |
| R5/CT3 | 3.60 | \|f/R3\| + \|f/R4\| | 4.45 |
| f/R9 | −0.17 | \|f/R5\| + \|f/R6\| | 2.35 |
| (R3 − R4)/(R3 + R4) | 0.18 | \|f/R7\| + \|f/R8\| | 0.53 |
| (R5 + R6)/(R5 − R6) | −1.53 | \|f/R9\| + \|f/R10\| | 0.47 |
| (R7 − R8)/(R7 + R8) | −0.10 | \|f/R11\| + \|f/R12\| | 3.85 |
| f/f3 | 0.85 | \|f/R13\| + \|f/R14\| | 4.28 |
| \|f1/f2\| | 0.76 | | |

In the 4th embodiment, Abbe numbers of three lens elements (420, 440 and 460) of the photographing optical lens assembly are greater than 10.0 and smaller than 22.0. Furthermore, the following condition is satisfied by two lens elements (440 and 450) of the photographing optical lens assembly: |f/Rf|+|f/Rr|<1.0.

5th Embodiment

Figure 9:
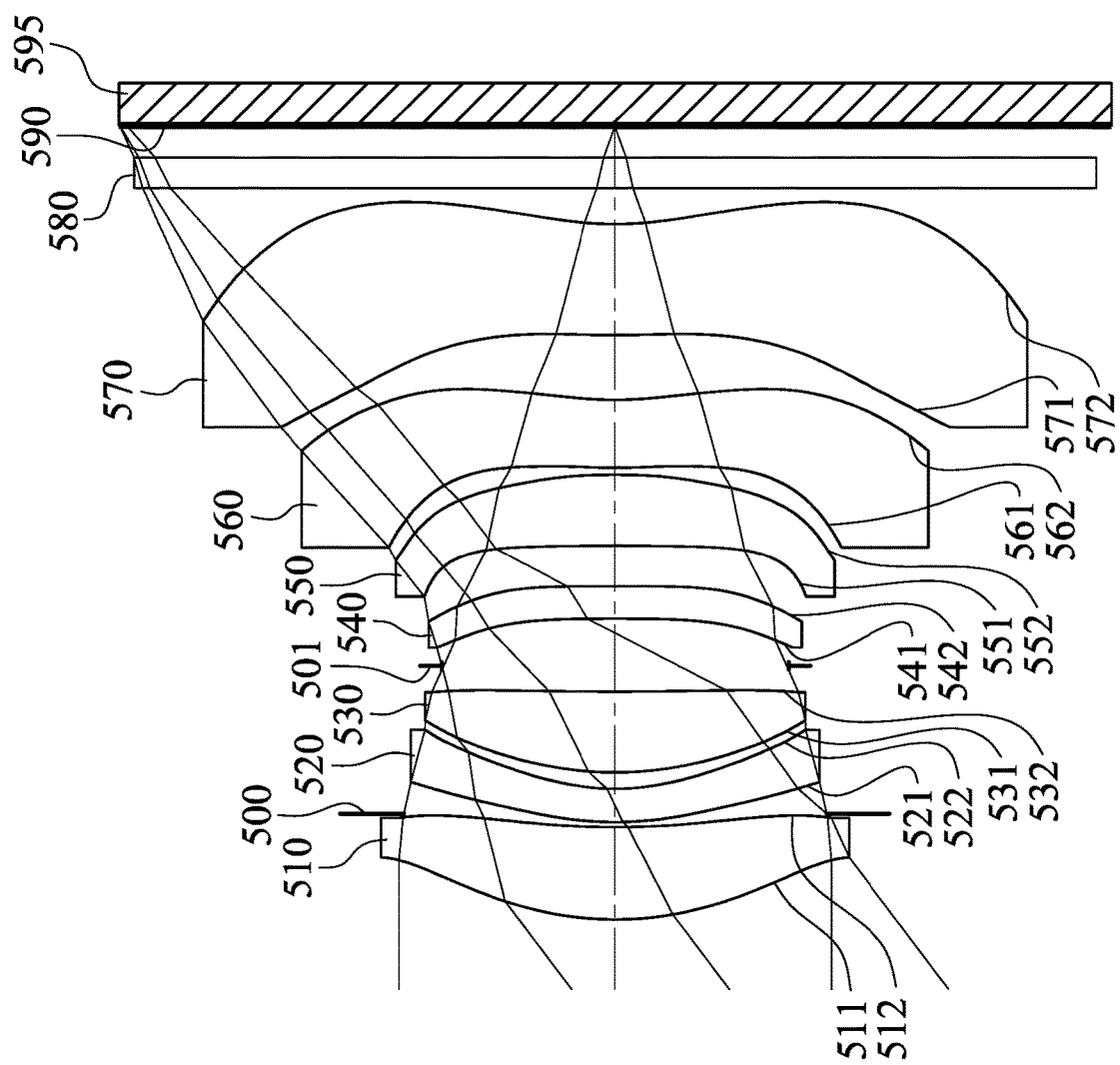
FIG. 9 is a schematic view of an imaging apparatus according to the 5th embodiment of the present disclosure.
Figure 10:
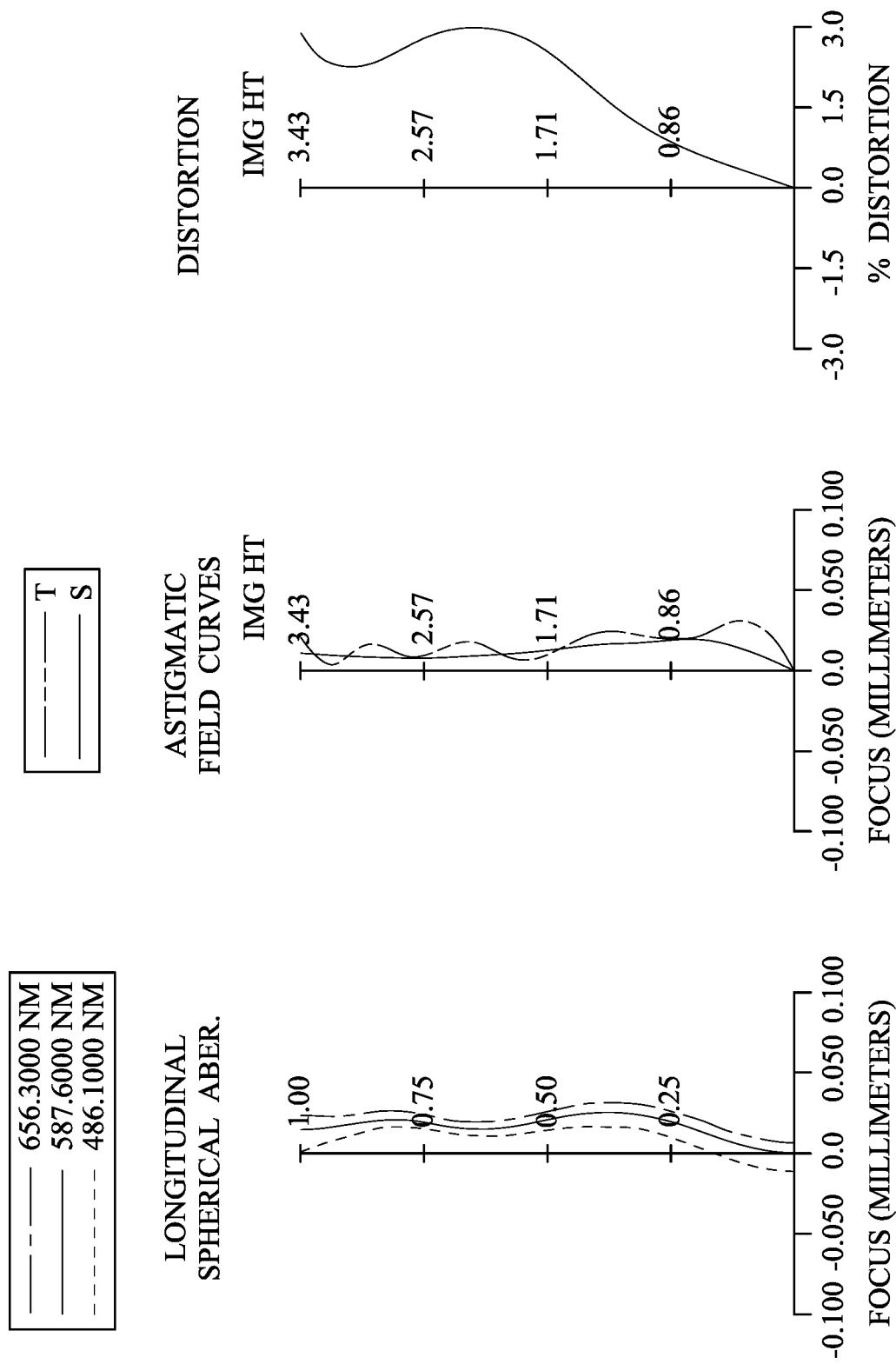
FIG. 10 shows spherical aberration curves, astigmatic field curves and a distortion curve of the imaging apparatus according to the 5th embodiment.

FIG. 9 is a schematic view of an imaging apparatus according to the 5th embodiment of the present disclosure. FIG. 10 shows spherical aberration curves, astigmatic field curves and a distortion curve of the imaging apparatus according to the 5th embodiment. In FIG. 9, the imaging apparatus includes a photographing optical lens assembly (its reference numeral is omitted) and an image sensor 595. The photographing optical lens assembly includes, in order from an object side to an image side, a first lens element 510, an aperture stop 500, a second lens element 520, a third lens element 530, a stop 501, a fourth lens element 540, a fifth lens element 550, a sixth lens element 560, a seventh lens element 570, a filter 580 and an image surface 590. The image sensor 595 is disposed on the image surface 590 of the photographing optical lens assembly. The photographing optical lens assembly includes seven lens elements (510, 520, 530, 540, 550, 560 and 570) without additional one or more lens elements inserted between the first lens element 510 and the seventh lens element 570, and there is an air gap in a paraxial region between each of adjacent lens elements of the seven lens elements.

The first lens element 510 with positive refractive power has an object-side surface 511 being convex in a paraxial region thereof and an image-side surface 512 being concave in a paraxial region thereof. The first lens element 510 is made of a plastic material, and has the object-side surface 511 and the image-side surface 512 being both aspheric.

The second lens element 520 with negative refractive power has an object-side surface 521 being convex in a paraxial region thereof and an image-side surface 522 being concave in a paraxial region thereof. The second lens element 520 is made of a plastic material, and has the object-side surface 521 and the image-side surface 522 being both aspheric.

The third lens element 530 with positive refractive power has an object-side surface 531 being convex in a paraxial region thereof and an image-side surface 532 being concave in a paraxial region thereof. The third lens element 530 is made of a plastic material, and has the object-side surface 531 and the image-side surface 532 being both aspheric.

The fourth lens element 540 with negative refractive power has an object-side surface 541 being concave in a paraxial region thereof and an image-side surface 542 being concave in a paraxial region thereof. The fourth lens element 540 is made of a plastic material, and has the object-side surface 541 and the image-side surface 542 being both aspheric.

The fifth lens element 550 with positive refractive power has an object-side surface 551 being concave in a paraxial region thereof and an image-side surface 552 being convex in a paraxial region thereof. The fifth lens element 550 is made of a plastic material, and has the object-side surface 551 and the image-side surface 552 being both aspheric.

The sixth lens element 560 with negative refractive power has an object-side surface 561 being convex in a paraxial region thereof and an image-side surface 562 being concave in a paraxial region thereof. The sixth lens element 560 is made of a plastic material, and has the object-side surface 561 and the image-side surface 562 being both aspheric. Furthermore, the image-side surface 562 of the sixth lens element 560 includes at least one inflection point in an off-axis region thereof.

The seventh lens element 570 with negative refractive power has an object-side surface 571 being convex in a paraxial region thereof and an image-side surface 572 being concave in a paraxial region thereof. The seventh lens element 570 is made of a plastic material, and has the object-side surface 571 and the image-side surface 572 being both aspheric. Furthermore, the image-side surface 572 of the seventh lens element 570 includes at least one inflection point in an off-axis region thereof.

The filter 580 is made of a glass material and located between the seventh lens element 570 and the image surface 590, and will not affect the focal length of the photographing optical lens assembly.

Five lens elements (510, 520, 530, 560 and 570) of the photographing optical lens assembly in the 5th embodiment have the object-side surfaces (511, 521, 531, 561 and 571) being convex in the paraxial regions thereof and the image-side surfaces (512, 522, 532, 562 and 572) being concave in the paraxial regions thereof.

The detailed optical data of the 5th embodiment are shown in TABLE 9 and the aspheric surface data are shown in TABLE 10 below.

TABLE 9

5th Embodiment
f = 4.40 mm, Fno = 1.47, HFOV = 37.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.340 | ASP | 0.642 | Plastic | 1.545 | 56.0 | 7.03 |
| 2 | | 5.436 | ASP | 0.094 | | | | |
| 3 | Ape. Stop | Plano | | −0.059 | | | | |
| 4 | Lens 2 | 2.259 | ASP | 0.230 | Plastic | 1.660 | 20.4 | −9.35 |
| 5 | | 1.586 | ASP | 0.113 | | | | |
| 6 | Lens 3 | 2.335 | ASP | 0.558 | Plastic | 1.544 | 55.9 | 4.74 |
| 7 | | 22.633 | ASP | 0.180 | | | | |
| 8 | Stop | Plano | | 0.326 | | | | |
| 9 | Lens 4 | −38.051 | ASP | 0.224 | Plastic | 1.669 | 19.5 | −36.44 |
| 10 | | 67.943 | ASP | 0.285 | | | | |
| 11 | Lens 5 | −25.033 | ASP | 0.489 | Plastic | 1.634 | 23.8 | 15.59 |
| 12 | | −7.141 | ASP | 0.050 | | | | |
| 13 | Lens 6 | 3.281 | ASP | 0.470 | Plastic | 1.669 | 19.5 | −22.31 |
| 14 | | 2.535 | ASP | 0.447 | | | | |
| 15 | Lens 7 | 7.510 | ASP | 0.773 | Plastic | 1.544 | 55.9 | −6.41 |
| 16 | | 2.294 | ASP | 0.250 | | | | |
| 17 | Filter | Plano | | 0.210 | Glass | 1.517 | 64.2 | — |
| 18 | | Plano | | 0.221 | | | | |
| 19 | Image | Plano | | — | | | | |

Reference wavelength is 587.6 nm (d-line).
Effective radius of Surface 8 is 1.200 mm.

TABLE 10

Aspheric Coefficients

| Surface # | 1 | 2 | 4 | 5 | 6 | 7 | 9 |
|---|---|---|---|---|---|---|---|
| k = | 1.4330E−01 | −7.1810E+01 | −7.7643E−01 | −7.0736E−01 | −1.2721E+01 | 1.0000E+01 | −9.0000E+01 |
| A4 = | −3.1919E−03 | 4.9861E−02 | −8.7658E−02 | −1.3512E−01 | 7.9993E−02 | −1.4458E−02 | −1.2665E−01 |
| A6 = | −9.4287E−03 | −8.0969E−02 | 4.7941E−02 | 1.0976E−01 | −7.7148E−02 | 2.9694E−03 | 6.8633E−02 |
| A8 = | 9.6457E−04 | 5.0211E−02 | −4.9288E−02 | −8.8313E−02 | 9.3246E−02 | −1.9140E−03 | −1.0240E−01 |
| A10 = | −1.0837E−03 | −1.6090E−02 | 4.1487E−02 | 4.5214E−02 | −8.1582E−02 | −1.7458E−04 | 1.1243E−01 |
| A12 = | 1.2546E−04 | 1.9837E−03 | −1.6662E−02 | −1.0770E−02 | 3.9663E−02 | −1.8758E−04 | −6.1232E−02 |
| A14 = | | | 2.5021E−03 | 9.9730E−04 | −7.4806E−03 | 1.0607E−04 | 1.5513E−02 |
| A16 = | | | | | | | −1.1110E−03 |

| Surface # | 10 | 11 | 12 | 13 | 14 | 15 | 16 |
|---|---|---|---|---|---|---|---|
| k = | −9.0000E+01 | 1.0000E+01 | 7.1890E−01 | −9.0000E+01 | −3.0853E+01 | −6.2280E+01 | −9.8744E+00 |
| A4 = | −1.3251E−01 | 6.0613E−04 | −5.1008E−01 | −4.8481E−01 | −9.6694E−02 | −1.7155E−01 | −6.5163E−02 |
| A6 = | 4.7961E−02 | −7.5299E−02 | 1.6079E+00 | 1.2911E+00 | 1.4274E−01 | 1.1774E−01 | 3.1288E−02 |
| A8 = | −6.1524E−02 | 2.0993E−01 | −2.8541E+00 | −2.1829E+00 | −1.6329E−01 | −5.0826E−02 | −1.1265E−02 |
| A10 = | 4.9074E−02 | −4.2937E−01 | 3.1843E+00 | 2.3207E+00 | 1.0990E−01 | 5.9229E−03 | 2.4593E−03 |
| A12 = | −3.6184E−03 | 4.3277E−01 | −2.3503E+00 | −1.6443E+00 | −4.6964E−02 | 4.3401E−03 | −3.3309E−04 |
| A14 = | −1.3267E−02 | −2.1312E−01 | 1.1353E+00 | 7.7599E−01 | 1.3048E−02 | −2.0747E−03 | 2.7299E−05 |
| A16 = | 5.9682E−03 | 2.5464E−02 | −3.4138E−01 | −2.3414E−01 | −2.2827E−03 | 3.9180E−04 | −1.2024E−06 |
| A18 = | −7.0146E−04 | 1.8143E−02 | 5.6875E−02 | 4.0744E−02 | 2.2745E−04 | −3.5281E−05 | 1.4234E−08 |
| A20 = | | −5.9355E−03 | −3.8892E−03 | −3.0997E−03 | −9.7973E−06 | 1.2469E−06 | 6.2469E−10 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from TABLE 9 and TABLE 10 as the following values and satisfy the following conditions:

| 5th Embodiment | | | |
|---|---|---|---|
| f [mm] | 4.40 | |f/fi|min | 0.121 |
| Fno | 1.47 | |f/fi|max | 0.93 |
| HFOV [deg.] | 37.1 | |f/f4| + |f/f5| + |f/f6| | 0.60 |
| V2 | 20.4 | f/EPD | 1.47 |
| V4 | 19.5 | TL/f | 1.25 |
| V6 | 19.5 | SD/TD | 0.85 |
| Vmin | 19.5 | TL/ImgH | 1.60 |
| V4 + V5 + V6 | 62.8 | BL/TD | 0.14 |
| T56/T67 | 0.11 | ImgH/f | 0.78 |
| CT7/CT1 | 1.20 | |f/R1| + |f/R2| | 2.69 |
| R5/CT3 | 4.18 | |f/R3| + |f/R4| | 4.72 |
| f/R9 | −0.18 | |f/R5| + |f/R6| | 2.08 |
| (R3 − R4)/(R3 + R4) | 0.17 | |f/R7| + |f/R8| | 0.18 |
| (R5 + R6)/(R5 − R6) | −1.23 | |f/R9| + |f/R10| | 0.79 |
| (R7 − R8)/(R7 + R8) | −3.55 | |f/R11| + |f/R12| | 3.07 |
| f/f3 | 0.93 | |f/R13| + |f/R14| | 2.50 |
| |f1/f2| | 0.75 | | |

In the 5th embodiment, Abbe numbers of three lens elements (520, 540 and 560) of the photographing optical lens assembly are greater than 10.0 and smaller than 22.0. Furthermore, the following condition is satisfied by two lens elements (540 and 550) of the photographing optical lens assembly: |f/Rf|+|f/Rr|<1.0.

6th Embodiment

Figure 11:
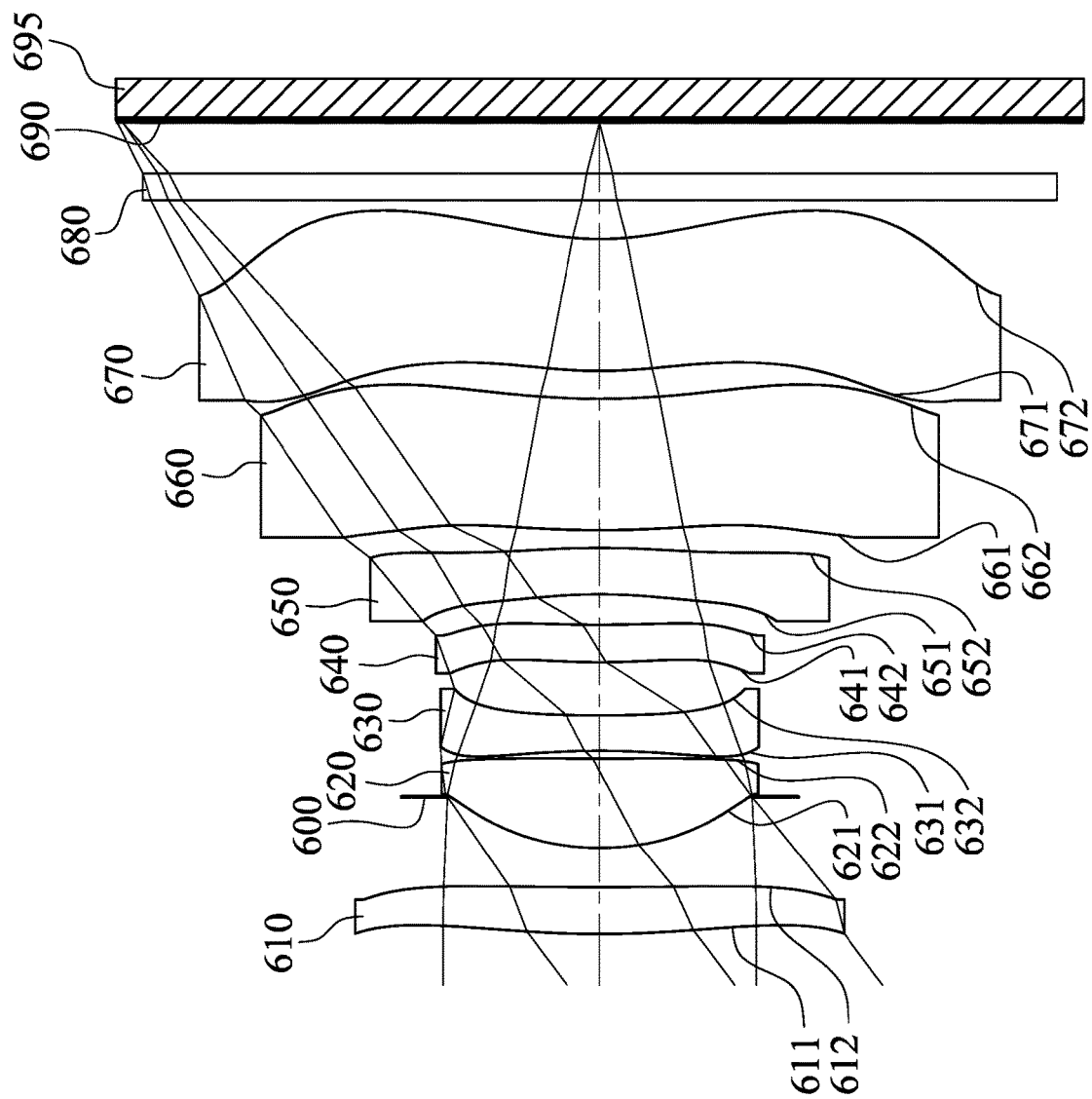
FIG. 11 is a schematic view of an imaging apparatus according to the 6th embodiment of the present disclosure.
Figure 12:
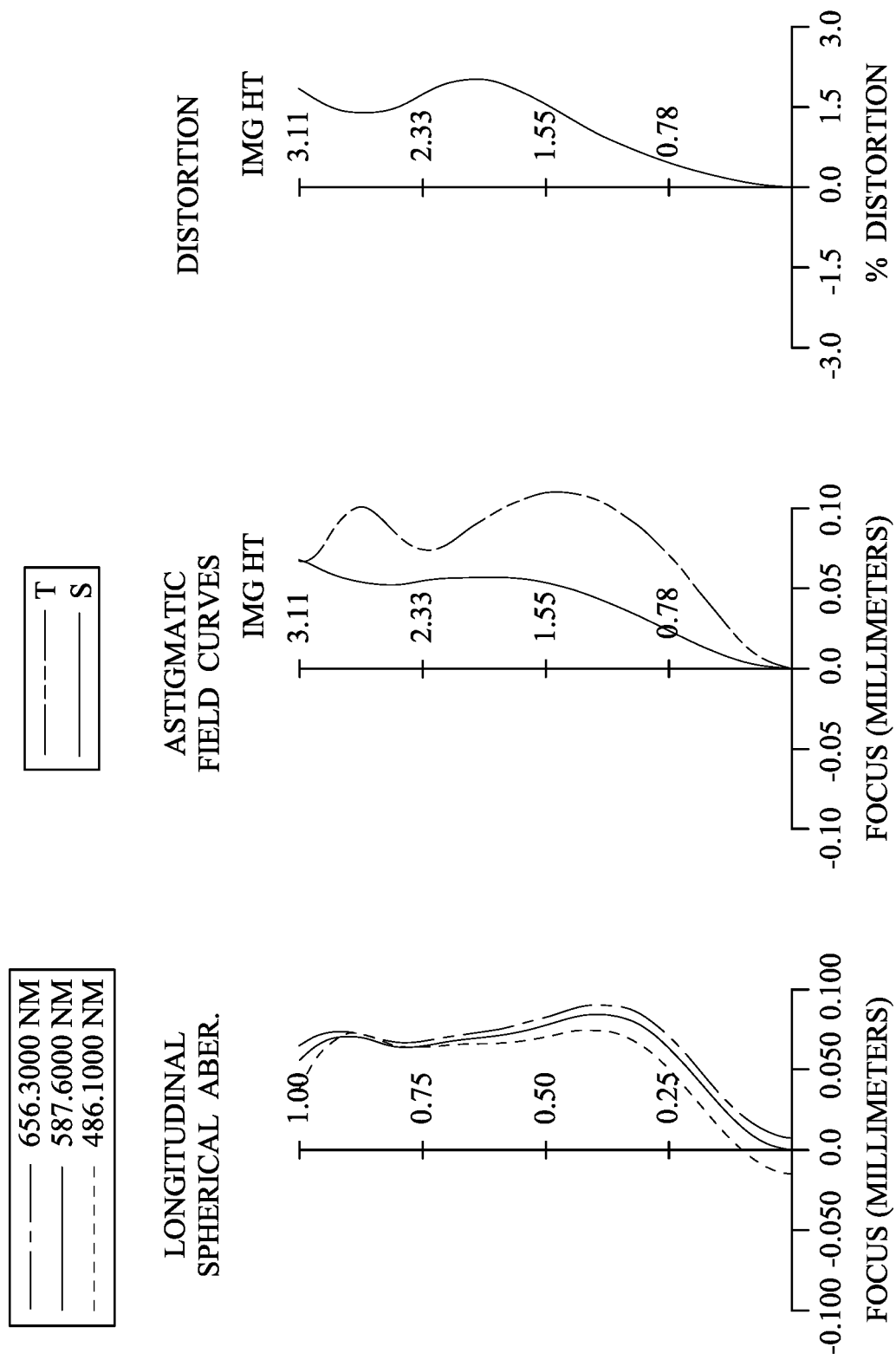
FIG. 12 shows spherical aberration curves, astigmatic field curves and a distortion curve of the imaging apparatus according to the 6th embodiment.

FIG. 11 is a schematic view of an imaging apparatus according to the 6th embodiment of the present disclosure. FIG. 12 shows spherical aberration curves, astigmatic field curves and a distortion curve of the imaging apparatus according to the 6th embodiment. In FIG. 11, the imaging apparatus includes a photographing optical lens assembly (its reference numeral is omitted) and an image sensor 695. The photographing optical lens assembly includes, in order from an object side to an image side, a first lens element 610, an aperture stop 600, a second lens element 620, a third lens element 630, a fourth lens element 640, a fifth lens element 650, a sixth lens element 660, a seventh lens element 670, a filter 680 and an image surface 690. The image sensor 695 is disposed on the image surface 690 of the photographing optical lens assembly. The photographing optical lens assembly includes seven lens elements (610, 620, 630, 640, 650, 660 and 670) without additional one or more lens elements inserted between the first lens element 610 and the seventh lens element 670, and there is an air gap in a paraxial region between each of adjacent lens elements of the seven lens elements.

The first lens element 610 with positive refractive power has an object-side surface 611 being convex in a paraxial region thereof and an image-side surface 612 being concave in a paraxial region thereof. The first lens element 610 is made of a plastic material, and has the object-side surface 611 and the image-side surface 612 being both aspheric.

The second lens element 620 with positive refractive power has an object-side surface 621 being convex in a paraxial region thereof and an image-side surface 622 being concave in a paraxial region thereof. The second lens element 620 is made of a plastic material, and has the object-side surface 621 and the image-side surface 622 being both aspheric.

The third lens element 630 with negative refractive power has an object-side surface 631 being concave in a paraxial region thereof and an image-side surface 632 being concave in a paraxial region thereof. The third lens element 630 is made of a plastic material, and has the object-side surface 631 and the image-side surface 632 being both aspheric.

The fourth lens element 640 with positive refractive power has an object-side surface 641 being convex in a paraxial region thereof and an image-side surface 642 being concave in a paraxial region thereof. The fourth lens element 640 is made of a plastic material, and has the object-side surface 641 and the image-side surface 642 being both aspheric.

The fifth lens element 650 with negative refractive power has an object-side surface 651 being concave in a paraxial region thereof and an image-side surface 652 being convex in a paraxial region thereof. The fifth lens element 650 is made of a plastic material, and has the object-side surface 651 and the image-side surface 652 being both aspheric.

The sixth lens element 660 with negative refractive power has an object-side surface 661 being convex in a paraxial region thereof and an image-side surface 662 being concave in a paraxial region thereof. The sixth lens element 660 is made of a plastic material, and has the object-side surface 661 and the image-side surface 662 being both aspheric. Furthermore, the image-side surface 662 of the sixth lens element 660 includes at least one inflection point in an off-axis region thereof.

The seventh lens element 670 with negative refractive power has an object-side surface 671 being convex in a paraxial region thereof and an image-side surface 672 being concave in a paraxial region thereof. The seventh lens element 670 is made of a plastic material, and has the object-side surface 671 and the image-side surface 672 being both aspheric. Furthermore, the image-side surface 672 of the seventh lens element 670 includes at least one inflection point in an off-axis region thereof.

The filter 680 is made of a glass material and located between the seventh lens element 670 and the image surface 690, and will not affect the focal length of the photographing optical lens assembly.

Five lens elements (610, 620, 640, 660 and 670) of the photographing optical lens assembly in the 6th embodiment have the object-side surfaces (611, 621, 641, 661 and 671) being convex in the paraxial regions thereof and the image-side surfaces (612, 622, 642, 662 and 672) being concave in the paraxial regions thereof.

The detailed optical data of the 6th embodiment are shown in TABLE 11 and the aspheric surface data are shown in TABLE 12 below.

TABLE 11

6th Embodiment
f = 4.01 mm, Fno = 1.97, HFOV = 36.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 6.337 | ASP | 0.303 | Plastic | 1.544 | 55.9 | 14.88 |
| 2 | | 28.642 | ASP | 0.590 | | | | |
| 3 | Ape. Stop | Plano | | −0.332 | | | | |
| 4 | Lens 2 | 1.657 | ASP | 0.581 | Plastic | 1.544 | 55.9 | 3.24 |
| 5 | | 24.302 | ASP | 0.050 | | | | |
| 6 | Lens 3 | −5.907 | ASP | 0.230 | Plastic | 1.584 | 28.2 | −6.21 |
| 7 | | 9.534 | ASP | 0.346 | | | | |
| 8 | Lens 4 | 4.368 | ASP | 0.243 | Plastic | 1.608 | 25.7 | 21.41 |
| 9 | | 6.435 | ASP | 0.197 | | | | |
| 10 | Lens 5 | −4.031 | ASP | 0.306 | Plastic | 1.650 | 21.5 | −16.09 |
| 11 | | −6.753 | ASP | 0.116 | | | | |
| 12 | Lens 6 | 6.816 | ASP | 0.852 | Plastic | 1.642 | 22.5 | −32.26 |
| 13 | | 4.877 | ASP | 0.181 | | | | |
| 14 | Lens 7 | 2.949 | ASP | 0.861 | Plastic | 1.534 | 55.9 | −14.88 |
| 15 | | 1.932 | ASP | 0.250 | | | | |
| 16 | Filter | Plano | | 0.175 | Glass | 1.517 | 64.2 | — |
| 17 | | Plano | | 0.345 | | | | |
| 18 | Image | Plano | | — | | | | |

Reference wavelength is 587.6 nm (d-line).

TABLE 12

Aspheric Coefficients

| Surface # | 1 | 2 | 4 | 5 | 6 | 7 | 8 |
|---|---|---|---|---|---|---|---|
| k = | −5.4940E+01 | −3.2758E+01 | 5.5659E−01 | −7.0000E+01 | −5.9727E+01 | 5.1605E+01 | 4.2936E+00 |
| A4 = | −7.5217E−03 | −9.9581E−03 | 9.3162E−03 | −5.8770E−02 | −4.6704E−02 | 4.2699E−02 | −3.4858E−01 |
| A6 = | −2.8707E−03 | −3.6579E−04 | 8.5603E−02 | −1.2460E−01 | −2.6197E−02 | 6.0331E−02 | 1.2976E+00 |
| A8 = | −7.7930E−04 | −3.3038E−03 | −2.6464E−01 | 6.7409E−01 | 7.3651E−01 | 1.8842E−01 | −5.1058E+00 |
| A10 = | | 5.8169E−04 | 3.4862E−01 | −1.1113E+00 | −1.5029E+00 | −4.6052E−01 | 1.1068E+01 |
| A12 = | | | −1.9396E−01 | 8.0466E−01 | 1.2890E+00 | 3.5787E−01 | −1.3947E+01 |
| A14 = | | | | −2.3116E−01 | −3.8164E−01 | 1.1303E−03 | 9.4470E+00 |
| A16 = | | | | | | | −2.6207E+00 |

| Surface # | 9 | 10 | 11 | 12 | 13 | 14 | 15 |
|---|---|---|---|---|---|---|---|
| k = | −1.0000E+01 | −1.0000E+00 | −1.6911E+00 | 1.0000E+00 | 7.0449E−01 | −5.3580E+00 | −5.2323E+00 |
| A4 = | −3.0729E−01 | −9.9871E−02 | −2.8668E−02 | −1.6084E−02 | −2.8126E−02 | −1.7009E−01 | −9.2831E−02 |
| A6 = | 1.1419E+00 | 8.1653E−01 | 3.0391E−01 | −5.3311E−02 | 2.0167E−03 | 1.0790E−02 | 4.5942E−02 |
| A8 = | −3.2495E+00 | −1.5865E+00 | −4.8647E−01 | 2.3652E−02 | −5.7571E−03 | −4.8104E−02 | −1.7891E−02 |
| A10 = | 4.9982E+00 | 1.4064E+00 | 3.9585E−01 | 2.6572E−03 | 3.4662E−03 | 1.2864E−02 | 4.5461E−03 |
| A12 = | −4.5651E+00 | −6.2465E−01 | −1.8174E−01 | −2.9773E−03 | −9.3400E−04 | −1.9140E−03 | −7.5893E−04 |
| A14 = | 2.3232E+00 | 1.1052E−01 | 4.4602E−02 | 4.1244E−04 | 1.2118E−04 | 1.4857E−04 | 7.3181E−05 |
| A16 = | −4.8182E−01 | | −4.6011E−03 | | −6.0008E−06 | −4.7614E−06 | −2.9375E−06 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from TABLE 11 and TABLE 12 as the following values and satisfy the following conditions:

| 6th Embodiment | | | |
|---|---|---|---|
| f [mm] | 4.01 | |f/f|min | 0.124 |
| Fno | 1.97 | |f/f|max | 1.24 |
| HFOV [deg.] | 36.8 | |f/f4| + |f/f5| + |f/f6| | 0.56 |
| V2 | 55.9 | f/EPD | 1.97 |

-continued

| 6th Embodiment | | | |
|---|---|---|---|
| V4 | 25.7 | TL/f | 1.32 |
| V6 | 22.5 | SD/TD | 0.80 |
| Vmin | 21.5 | TL/ImgH | 1.70 |
| V4 + V5 + V6 | 69.7 | BL/TD | 0.17 |
| T56/T67 | 0.64 | ImgH/f | 0.77 |
| CT7/CT1 | 2.84 | |f/R1| + |f/R2| | 0.77 |
| R5/CT3 | −25.68 | |f/R3| + |f/R4| | 2.59 |
| f/R9 | −1.00 | |f/R5| + |f/R6| | 1.10 |
| (R3 − R4)/(R3 + R4) | −0.87 | |f/R7| + |f/R8| | 1.54 |
| (R5 + R6)/(R5 − R6) | −0.23 | |f/R9| + |f/R10| | 1.59 |
| (R7 − R8)/(R7 + R8) | −0.19 | |f/R11| + |f/R12| | 1.41 |
| f/f3 | −0.65 | |f/R13| + |f/R14| | 3.44 |
| |f1/f2| | 4.59 | | |

In the 6th embodiment, the following condition is satisfied by one lens element (610) of the photographing optical lens assembly: |f/Rf|+|f/Rr|<1.0.

7th Embodiment

Figure 13:
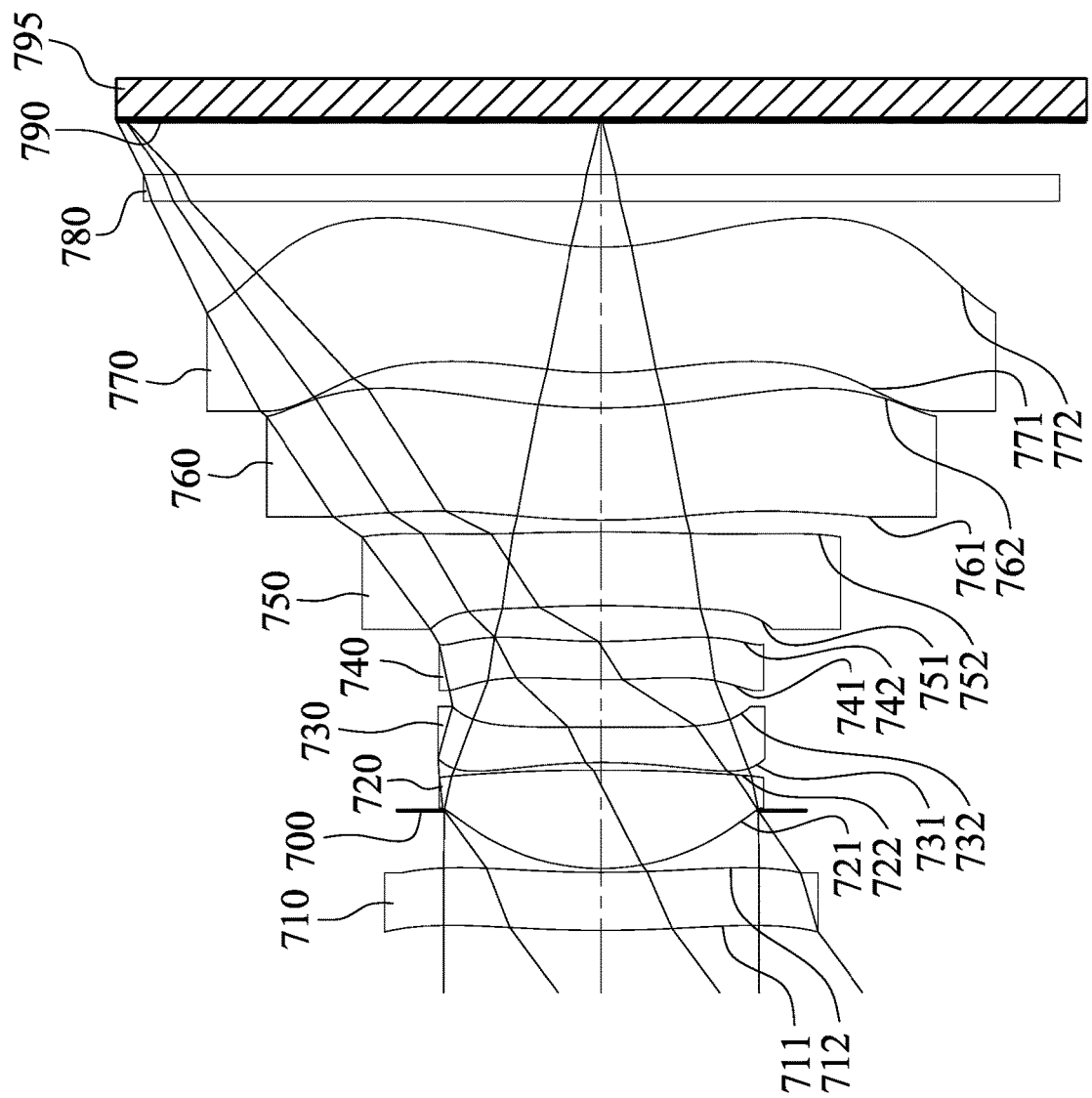
FIG. 13 is a schematic view of an imaging apparatus according to the 7th embodiment of the present disclosure.
Figure 14:
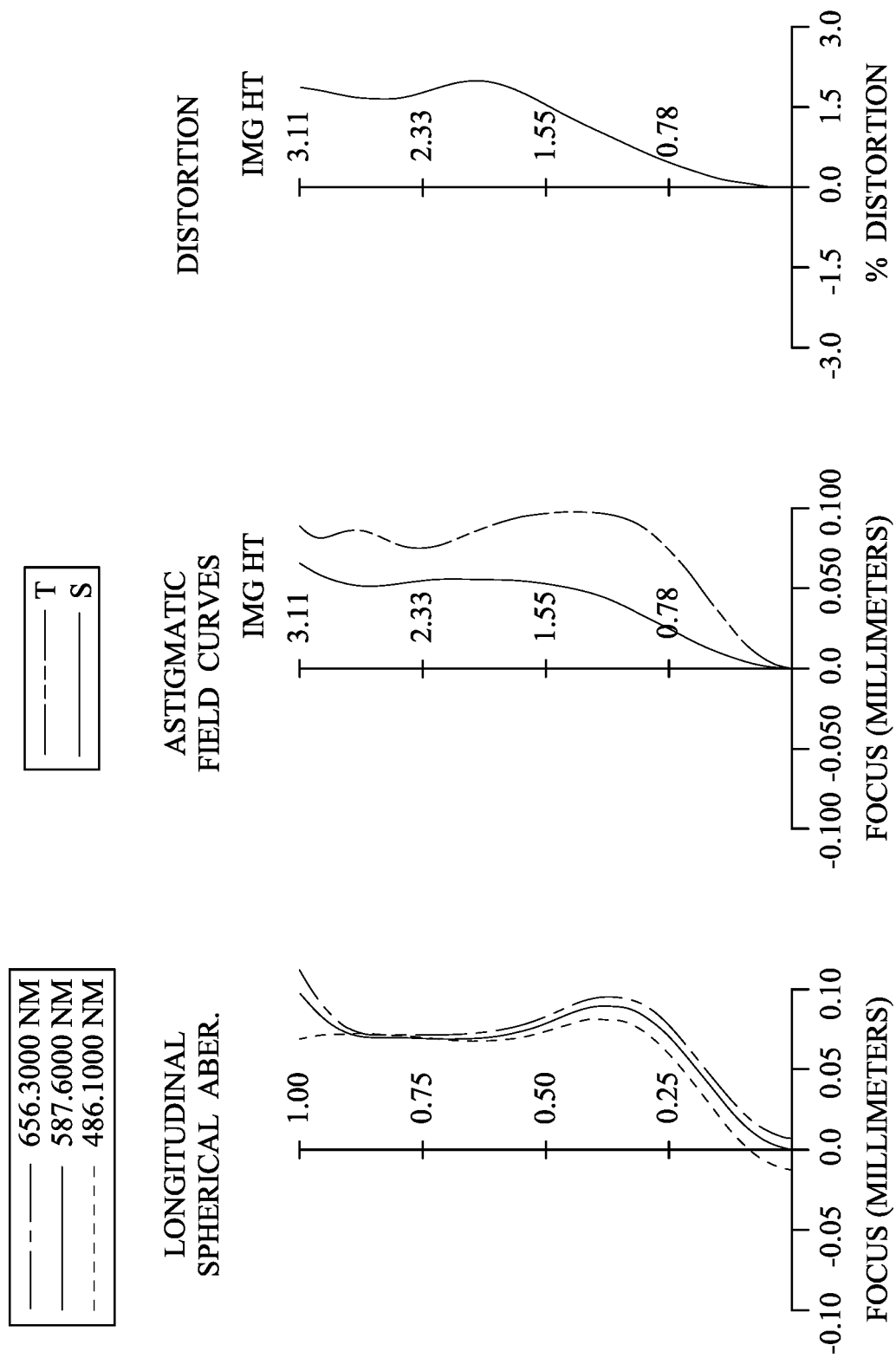
FIG. 14 shows spherical aberration curves, astigmatic field curves and a distortion curve of the imaging apparatus according to the 7th embodiment.

FIG. 13 is a schematic view of an imaging apparatus according to the 7th embodiment of the present disclosure. FIG. 14 shows spherical aberration curves, astigmatic field curves and a distortion curve of the imaging apparatus according to the 7th embodiment. In FIG. 13, the imaging apparatus includes a photographing optical lens assembly (its reference numeral is omitted) and an image sensor 795. The photographing optical lens assembly includes, in order from an object side to an image side, a first lens element 710, an aperture stop 700, a second lens element 720, a third lens element 730, a fourth lens element 740, a fifth lens element 750, a sixth lens element 760, a seventh lens element 770, a filter 780 and an image surface 790. The image sensor 795 is disposed on the image surface 790 of the photographing optical lens assembly. The photographing optical lens assembly includes seven lens elements (710, 720, 730, 740, 750, 760 and 770) without additional one or more lens elements inserted between the first lens element 710 and the seventh lens element 770, and there is an air gap in a paraxial region between each of adjacent lens elements of the seven lens elements. Furthermore, the seven lens elements drawn with the thinner lines in FIG. 13 are for showing the air gaps thereof with higher clarity.

The first lens element 710 with negative refractive power has an object-side surface 711 being convex in a paraxial region thereof and an image-side surface 712 being concave in a paraxial region thereof. The first lens element 710 is made of a plastic material, and has the object-side surface 711 and the image-side surface 712 being both aspheric.

The second lens element 720 with positive refractive power has an object-side surface 721 being convex in a paraxial region thereof and an image-side surface 722 being convex in a paraxial region thereof. The second lens element 720 is made of a plastic material, and has the object-side surface 721 and the image-side surface 722 being both aspheric.

The third lens element 730 with negative refractive power has an object-side surface 731 being concave in a paraxial region thereof and an image-side surface 732 being convex in a paraxial region thereof. The third lens element 730 is made of a plastic material, and has the object-side surface 731 and the image-side surface 732 being both aspheric.

The fourth lens element 740 with negative refractive power has an object-side surface 741 being convex in a paraxial region thereof and an image-side surface 742 being concave in a paraxial region thereof. The fourth lens element 740 is made of a plastic material, and has the object-side surface 741 and the image-side surface 742 being both aspheric.

The fifth lens element 750 with negative refractive power has an object-side surface 751 being concave in a paraxial region thereof and an image-side surface 752 being convex in a paraxial region thereof. The fifth lens element 750 is made of a plastic material, and has the object-side surface 751 and the image-side surface 752 being both aspheric.

The sixth lens element 760 with negative refractive power has an object-side surface 761 being convex in a paraxial region thereof and an image-side surface 762 being concave in a paraxial region thereof. The sixth lens element 760 is made of a plastic material, and has the object-side surface 761 and the image-side surface 762 being both aspheric. Furthermore, the image-side surface 762 of the sixth lens element 760 includes at least one inflection point in an off-axis region thereof.

The seventh lens element 770 with negative refractive power has an object-side surface 771 being convex in a paraxial region thereof and an image-side surface 772 being concave in a paraxial region thereof. The seventh lens element 770 is made of a plastic material, and has the object-side surface 771 and the image-side surface 772 being both aspheric. Furthermore, the image-side surface 772 of the seventh lens element 770 includes at least one inflection point in an off-axis region thereof.

The filter 780 is made of a glass material and located between the seventh lens element 770 and the image surface 790, and will not affect the focal length of the photographing optical lens assembly.

The detailed optical data of the 7th embodiment are shown in TABLE 13 and the aspheric surface data are shown in TABLE 14 below.

TABLE 13

7th Embodiment
f = 4.05 mm, Fno = 1.97, HFOV = 36.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 8.333 | ASP | 0.378 | Plastic | 1.544 | 55.9 | −176.38 |
| 2 | | 7.545 | ASP | 0.403 | | | | |
| 3 | Ape. Stop | Plano | | −0.378 | | | | |
| 4 | Lens 2 | 1.489 | ASP | 0.640 | Plastic | 1.544 | 55.9 | 2.60 |
| 5 | | −23.767 | ASP | 0.052 | | | | |
| 6 | Lens 3 | −3.830 | ASP | 0.230 | Plastic | 1.584 | 28.2 | −6.91 |
| 7 | | −76.798 | ASP | 0.313 | | | | |
| 8 | Lens 4 | 4.277 | ASP | 0.250 | Plastic | 1.608 | 25.7 | −48.44 |
| 9 | | 3.652 | ASP | 0.234 | | | | |
| 10 | Lens 5 | −7.815 | ASP | 0.481 | Plastic | 1.650 | 21.5 | −41.68 |
| 11 | | −11.246 | ASP | 0.075 | | | | |
| 12 | Lens 6 | 5.139 | ASP | 0.736 | Plastic | 1.642 | 22.5 | −29.29 |
| 13 | | 3.809 | ASP | 0.230 | | | | |
| 14 | Lens 7 | 2.512 | ASP | 0.817 | Plastic | 1.534 | 55.9 | −19.66 |
| 15 | | 1.797 | ASP | 0.300 | | | | |

TABLE 13-continued

7th Embodiment
f = 4.05 mm, Fno = 1.97, HFOV = 36.5 deg.

| Surface # | | Curvature Radius | Thickness | Material | Index | Abbe # | Focal Length |
|---|---|---|---|---|---|---|---|
| 16 | Filter | Plano | 0.175 | Glass | 1.517 | 64.2 | — |
| 17 | | Plano | 0.358 | | | | |
| 18 | Image | Plano | — | | | | |

Reference wavelength is 587.6 nm (d-line).

TABLE 14

Aspheric Coefficients

| Surface # | 1 | 2 | 4 | 5 | 6 | 7 | 8 |
|---|---|---|---|---|---|---|---|
| k = | −7.0000E+01 | −4.4544E+01 | 6.4500E−01 | 5.7354E+00 | −2.7087E+01 | 9.0000E+01 | 5.4068E+00 |
| A4 = | −9.9030E−03 | −2.2043E−02 | −4.0905E−02 | −3.8325E−02 | −3.8588E−02 | 4.8728E−02 | −3.7023E−01 |
| A6 = | −9.2732E−03 | −4.2753E−03 | 9.1844E−02 | −1.3585E−01 | −2.4049E−02 | 6.7292E−02 | 9.6060E−01 |
| A8 = | 9.7626E−04 | −2.9016E−03 | −2.8366E−01 | 6.7287E−01 | 7.3005E−01 | 2.1089E−01 | −3.6112E+00 |
| A10 = | | 1.1552E−03 | 3.4201E−01 | −1.0952E+00 | −1.5082E+00 | −4.9695E−01 | 7.9347E+00 |
| A12 = | | | −1.8338E−01 | 8.0876E−01 | 1.2969E+00 | 3.5382E−01 | −9.9707E+00 |
| A14 = | | | | −2.3056E−01 | −3.8182E−01 | 1.1303E−03 | 6.6441E+00 |
| A16 = | | | | | | | −1.7901E+00 |

| Surface # | 9 | 10 | 11 | 12 | 13 | 14 | 15 |
|---|---|---|---|---|---|---|---|
| k = | −5.1478E+00 | −4.0070E+00 | −2.4153E+01 | −2.8055E+00 | 3.1255E−01 | −6.5610E+00 | −6.2471E+00 |
| A4 = | −2.3773E−01 | −1.1236E−02 | 1.5614E−02 | 2.7098E−03 | −3.5275E−02 | −1.5692E−01 | −7.3201E−02 |
| A6 = | 4.9226E−01 | 3.2113E−01 | 6.8698E−02 | −7.7261E−02 | 1.7289E−03 | 8.5859E−02 | 2.6263E−02 |
| A8 = | −1.3285E+00 | −7.4999E−01 | −1.0570E−01 | 5.0948E−02 | −3.6865E−03 | −2.7287E−02 | −7.6151E−03 |
| A10 = | 1.8841E+00 | 7.2777E−01 | 7.4380E−02 | −1.3704E−02 | 2.0818E−03 | 2.6549E−03 | 1.4810E−03 |
| A12 = | −1.3985E+00 | −3.7183E−01 | −3.0640E−02 | 1.4716E−03 | −5.3623E−04 | 5.5608E−04 | −2.5734E−04 |
| A14 = | 4.4265E−01 | 7.1288E−02 | 7.0876E−03 | −2.9076E−05 | 6.4244E−05 | −1.3588E−04 | 3.1890E−05 |
| A16 = | −9.8210E−04 | | −7.1528E−04 | | −2.5334E−06 | 7.7491E−06 | −1.6222E−06 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from TABLE 13 and TABLE 14 as the following values and satisfy the following conditions:

| 7th Embodiment | | | |
|---|---|---|---|
| f [mm] | 4.05 | |f/f|min | 0.023 |
| Fno | 1.97 | |f/f|max | 1.56 |
| HFOV [deg.] | 36.5 | |f/f4| + |f/f5| + |f/f6| | 0.32 |
| V2 | 55.9 | f/EPD | 1.97 |
| V4 | 25.7 | TL/f | 1.31 |
| V6 | 22.5 | SD/TD | 0.82 |
| Vmin | 21.5 | TL/ImgH | 1.70 |
| V4 + V5 + V6 | 69.7 | BL/TD | 0.19 |
| T56/T67 | 0.33 | ImgH/f | 0.77 |
| CT7/CT1 | 2.16 | |f/R1| + |f/R2| | 1.02 |
| R5/CT3 | −16.65 | |f/R3| + |f/R4| | 2.89 |
| f/R9 | −0.52 | |f/R5| + |f/R6| | 1.11 |
| (R3 − R4)/(R3 + R4) | −1.13 | |f/R7| + |f/R8| | 2.06 |
| (R5 + R6)/(R5 − R6) | −1.10 | |f/R9| + |f/R10| | 0.88 |
| (R7 − R8)/(R7 + R8) | 0.08 | |f/R11| + |f/R12| | 1.85 |
| f/f3 | −0.59 | |f/R13| + |f/R14| | 3.87 |
| |f1/f2| | 67.89 | | |

In the 7th embodiment, the following condition is satisfied by one lens element (750) of the photographing optical lens assembly: |f/Rfl+|f/Rr|<1.0.

8th Embodiment

Figure 15:
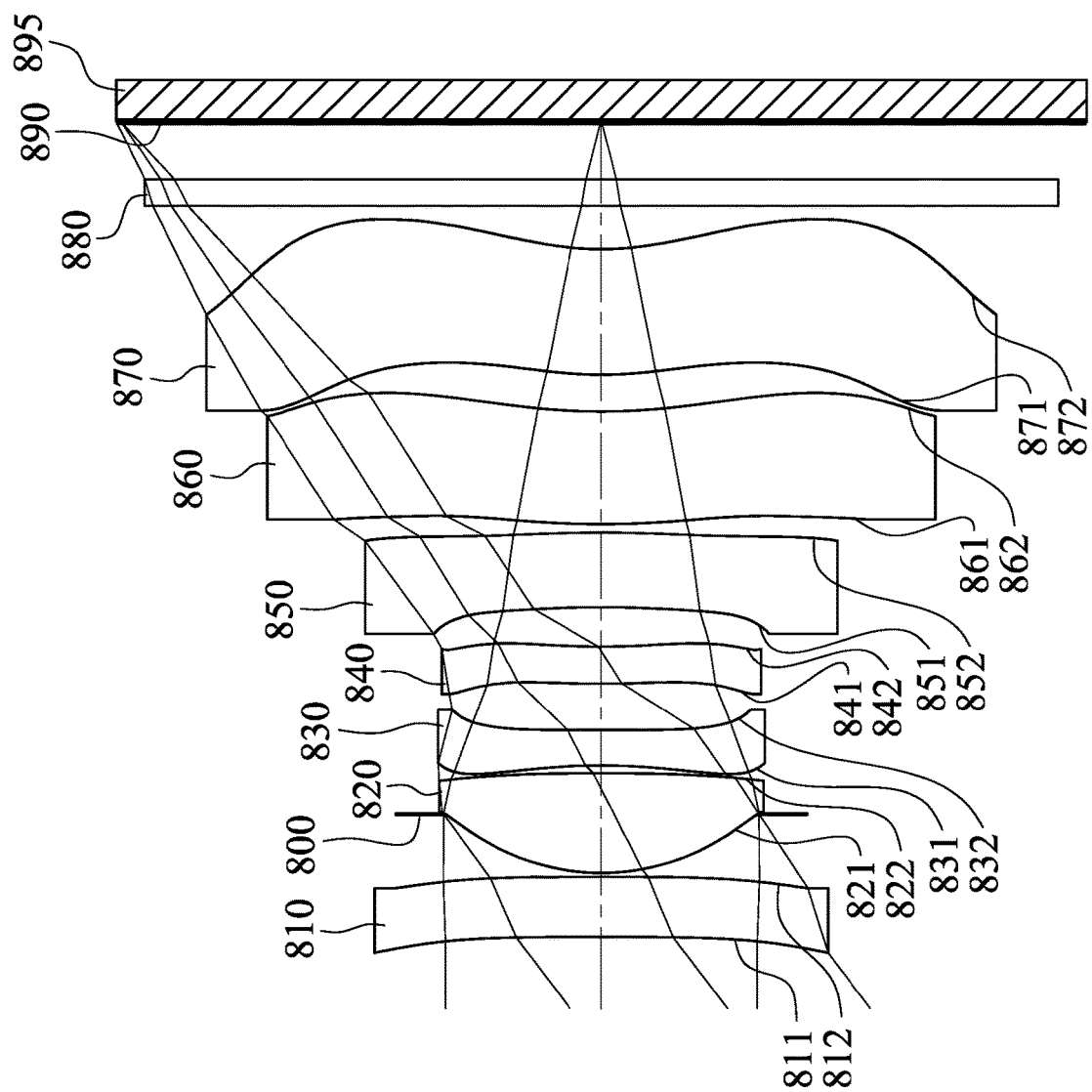
FIG. 15 is a schematic view of an imaging apparatus according to the 8th embodiment of the present disclosure.
Figure 16:
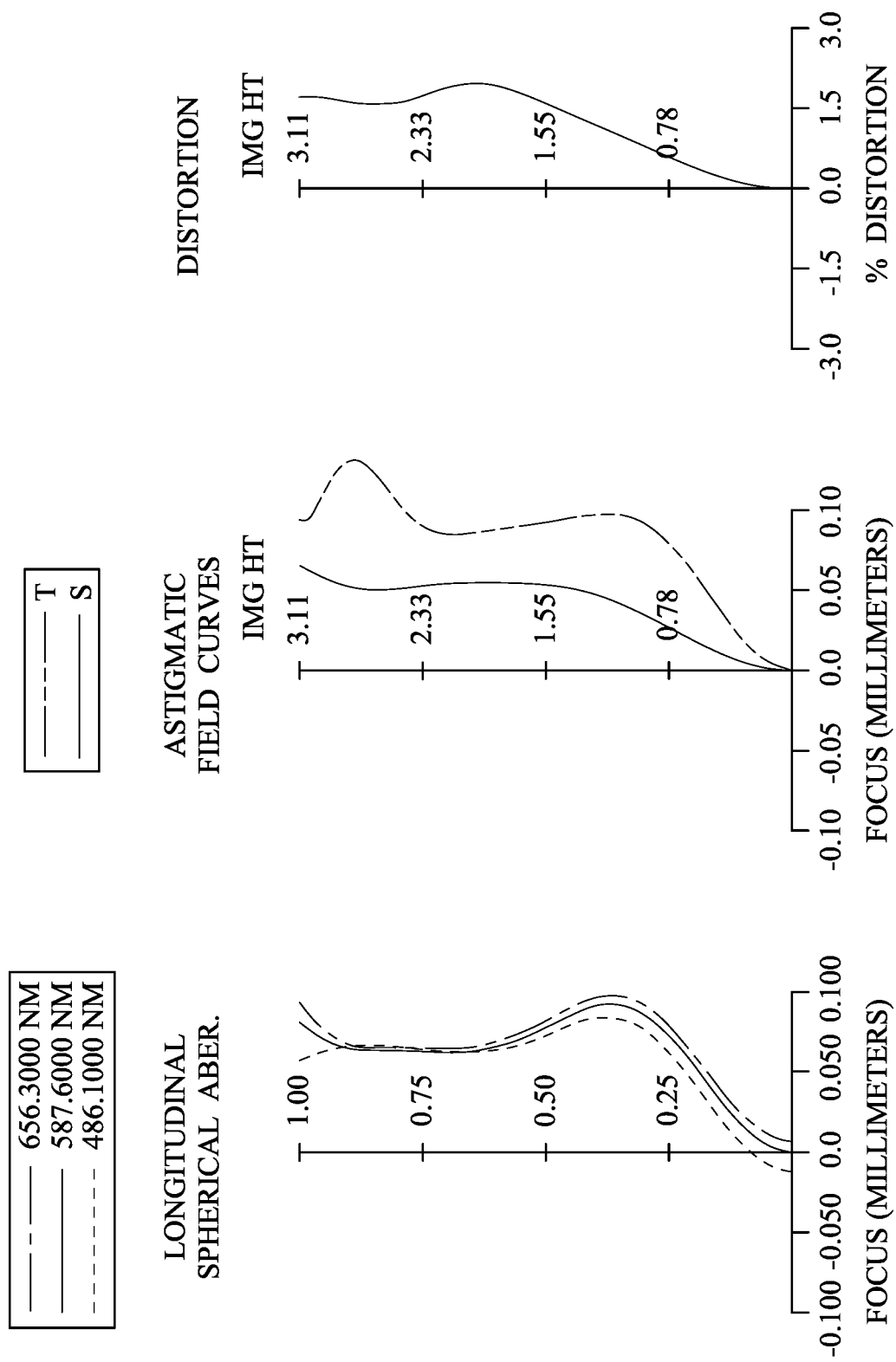
FIG. 16 shows spherical aberration curves, astigmatic field curves and a distortion curve of the imaging apparatus according to the 8th embodiment.

FIG. 15 is a schematic view of an imaging apparatus according to the 8th embodiment of the present disclosure. FIG. 16 shows spherical aberration curves, astigmatic field curves and a distortion curve of the imaging apparatus according to the 8th embodiment. In FIG. 15, the imaging apparatus includes a photographing optical lens assembly (its reference numeral is omitted) and an image sensor 895. The photographing optical lens assembly includes, in order from an object side to an image side, a first lens element 810, an aperture stop 800, a second lens element 820, a third lens element 830, a fourth lens element 840, a fifth lens element 850, a sixth lens element 860, a seventh lens element 870, a filter 880 and an image surface 890. The image sensor 895 is disposed on the image surface 890 of the photographing optical lens assembly. The photographing optical lens assembly includes seven lens elements (810, 820, 830, 840, 850, 860 and 870) without additional one or more lens elements inserted between the first lens element 810 and the seventh lens element 870, and there is an air gap in a paraxial region between each of adjacent lens elements of the seven lens elements.

The first lens element 810 with negative refractive power has an object-side surface 811 being concave in a paraxial region thereof and an image-side surface 812 being convex in a paraxial region thereof. The first lens element 810 is made of a plastic material, and has the object-side surface 811 and the image-side surface 812 being both aspheric.

The second lens element 820 with positive refractive power has an object-side surface 821 being convex in a paraxial region thereof and an image-side surface 822 being convex in a paraxial region thereof. The second lens element 820 is made of a plastic material, and has the object-side surface 821 and the image-side surface 822 being both aspheric.

The third lens element 830 with negative refractive power has an object-side surface 831 being concave in a paraxial region thereof and an image-side surface 832 being convex in a paraxial region thereof. The third lens element 830 is made of a plastic material, and has the object-side surface 831 and the image-side surface 832 being both aspheric.

The fourth lens element 840 with negative refractive power has an object-side surface 841 being convex in a paraxial region thereof and an image-side surface 842 being concave in a paraxial region thereof. The fourth lens element 840 is made of a plastic material, and has the object-side surface 841 and the image-side surface 842 being both aspheric.

The fifth lens element 850 with negative refractive power has an object-side surface 851 being concave in a paraxial region thereof and an image-side surface 852 being convex in a paraxial region thereof. The fifth lens element 850 is made of a plastic material, and has the object-side surface 851 and the image-side surface 852 being both aspheric.

The sixth lens element 860 with negative refractive power has an object-side surface 861 being convex in a paraxial region thereof and an image-side surface 862 being concave in a paraxial region thereof. The sixth lens element 860 is made of a plastic material, and has the object-side surface 861 and the image-side surface 862 being both aspheric. Furthermore, the image-side surface 862 of the sixth lens element 860 includes at least one inflection point in an off-axis region thereof.

The seventh lens element 870 with negative refractive power has an object-side surface 871 being convex in a paraxial region thereof and an image-side surface 872 being concave in a paraxial region thereof. The seventh lens element 870 is made of a plastic material, and has the object-side surface 871 and the image-side surface 872 being both aspheric. Furthermore, the image-side surface 872 of the seventh lens element 870 includes at least one inflection point in an off-axis region thereof.

The filter 880 is made of a glass material and located between the seventh lens element 870 and the image surface 890, and will not affect the focal length of the photographing optical lens assembly.

The detailed optical data of the 8th embodiment are shown in TABLE 15 and the aspheric surface data are shown in TABLE 16 below.

TABLE 15

8th Embodiment
f = 3.98 mm, Fno = 1.97, HFOV = 37.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −80.672 | ASP | 0.389 | Plastic | 1.544 | 55.9 | −517.42 |
| 2 | | −113.261 | ASP | 0.405 | | | | |
| 3 | Ape. Stop | Plano | | −0.379 | | | | |
| 4 | Lens 2 | 1.477 | ASP | 0.644 | Plastic | 1.544 | 55.9 | 2.61 |
| 5 | | −32.358 | ASP | 0.050 | | | | |
| 6 | Lens 3 | −4.052 | ASP | 0.230 | Plastic | 1.584 | 28.2 | −7.08 |
| 7 | | −201.457 | ASP | 0.303 | | | | |
| 8 | Lens 4 | 5.181 | ASP | 0.240 | Plastic | 1.608 | 25.7 | −48.92 |
| 9 | | 4.335 | ASP | 0.255 | | | | |
| 10 | Lens 5 | −6.887 | ASP | 0.483 | Plastic | 1.650 | 21.5 | −66.04 |
| 11 | | −8.429 | ASP | 0.055 | | | | |
| 12 | Lens 6 | 6.255 | ASP | 0.733 | Plastic | 1.642 | 22.5 | −19.25 |
| 13 | | 3.962 | ASP | 0.238 | | | | |
| 14 | Lens 7 | 2.476 | ASP | 0.810 | Plastic | 1.534 | 55.9 | −22.87 |
| 15 | | 1.824 | ASP | 0.280 | | | | |
| 16 | Filter | Plano | | 0.175 | Glass | 1.517 | 64.2 | — |
| 17 | | Plano | | 0.374 | | | | |
| 18 | Image | Plano | | — | | | | |

Reference wavelength is 587.6 nm (d-line).

TABLE 16

Aspheric Coefficients

| Surface # | 1 | 2 | 4 | 5 | 6 | 7 | 8 |
|---|---|---|---|---|---|---|---|
| k = | −7.0000E+01 | −5.3693E+01 | 6.4198E−01 | −5.9793E+01 | −2.9027E+01 | 8.9157E+01 | 1.2153E+01 |
| A4 = | −2.1999E−02 | −2.9823E−02 | −4.3676E−02 | −4.0084E−02 | −3.7213E−02 | 5.0597E−02 | −3.3344E−01 |
| A6 = | −1.3367E−03 | 1.3313E−03 | 9.4622E−02 | −1.4411E−01 | −2.6290E−02 | 6.4758E−02 | 8.8830E−01 |
| A8 = | 1.2222E−03 | 2.2497E−03 | −2.8935E−01 | 6.6554E−01 | 7.2943E−01 | 2.0620E−01 | −3.4988E+00 |
| A10 = | | −6.1941E−05 | 3.3663E−01 | −1.0935E+00 | −1.5135E+00 | −4.9764E−01 | 7.9819E+00 |
| A12 = | | | −1.7747E−01 | 8.1396E−01 | 1.2967E+00 | 3.5496E−01 | −1.0485E+01 |

TABLE 16-continued

| Aspheric Coefficients | | | | | | |
|---|---|---|---|---|---|---|
| A14 = | | | −2.2958E−01 | −3.7876E−01 | −2.3695E−04 | 7.3160E+00 |
| A16 = | | | | | | −2.0514E+00 |

| Surface # | 9 | 10 | 11 | 12 | 13 | 14 | 15 |
|---|---|---|---|---|---|---|---|
| k = | −1.0672E+00 | −2.1563E+00 | −1.7308E+01 | −1.2456E+01 | 4.0505E−01 | −6.3177E+00 | −5.3744E+00 |
| A4 = | −2.0557E−01 | −2.4861E−02 | 2.8815E−02 | 3.1914E−02 | −3.3850E−02 | −1.5193E−01 | −8.2001E−02 |
| A6 = | 3.1296E−01 | 3.1063E−01 | 3.6887E−02 | −1.1796E−01 | −1.4764E−03 | 7.9318E−02 | 3.3184E−02 |
| A8 = | −6.8473E−01 | −7.0499E−01 | −7.0675E−02 | 8.8489E−02 | −1.0727E−03 | −2.3784E−02 | −1.1408E−02 |
| A10 = | 5.5244E−01 | 6.7125E−01 | 5.4070E−02 | −3.0896E−02 | 1.1465E−03 | 1.9107E−03 | 2.7654E−03 |
| A12 = | 1.6666E−01 | −3.4954E−01 | −2.4405E−02 | 5.2758E−03 | −3.4705E−04 | 5.9588E−04 | −4.9720E−04 |
| A14 = | −5.5993E−01 | 6.6389E−02 | 6.2351E−03 | −3.5737E−04 | 4.4884E−05 | −1.3059E−04 | 5.4312E−05 |
| A16 = | 2.8174E−01 | | −6.9413E−04 | | −1.8608E−06 | 7.2375E−06 | −2.4441E−06 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from TABLE 15 and TABLE 16 as the following values and satisfy the following conditions:

| 8th Embodiment | | | |
|---|---|---|---|
| f [mm] | 3.98 | |f/fi|min | 0.008 |
| Fno | 1.97 | |f/fi|max | 1.52 |
| HFOV [deg.] | 37.1 | |f/f4| + [f/f5| + |f/f6| | 0.35 |
| V2 | 55.9 | f/EPD | 1.97 |
| V4 | 25.7 | TL/f | 1.33 |
| V6 | 22.5 | SD/TD | 0.82 |
| Vmin | 21.5 | TL/ImgH | 1.70 |
| V4 + V5 + V6 | 69.7 | BL/TD | 0.19 |
| T56/T67 | 0.23 | ImgH/f | 0.78 |
| CT7/CT1 | 2.08 | |f/R1| + |f/R2| | 0.08 |
| R5/CT3 | −17.62 | |f/R3| + |f/R4| | 2.82 |
| f/R9 | −0.58 | |f/R5| + |f/R6| | 1.00 |
| (R3 − R4)/(R3 + R4) | −1.10 | |f/R7| + |f/R8| | 1.68 |
| (R5 + R6)/(R5 − R6) | −1.04 | |f/R9| + |f/R10| | 1.05 |
| (R7 − R8)/(R7 + R8) | 0.09 | |f/R11| + |f/R12| | 1.64 |
| f/f3 | −0.56 | |f/R13| + |f/R14| | 3.78 |
| |f1/f2| | 198.05 | | |

In the 8th embodiment, the following condition is satisfied by one lens element (810) of the photographing optical lens assembly: |f/Rf|+|f/Rr|<1.0.

9th Embodiment

Figure 17:
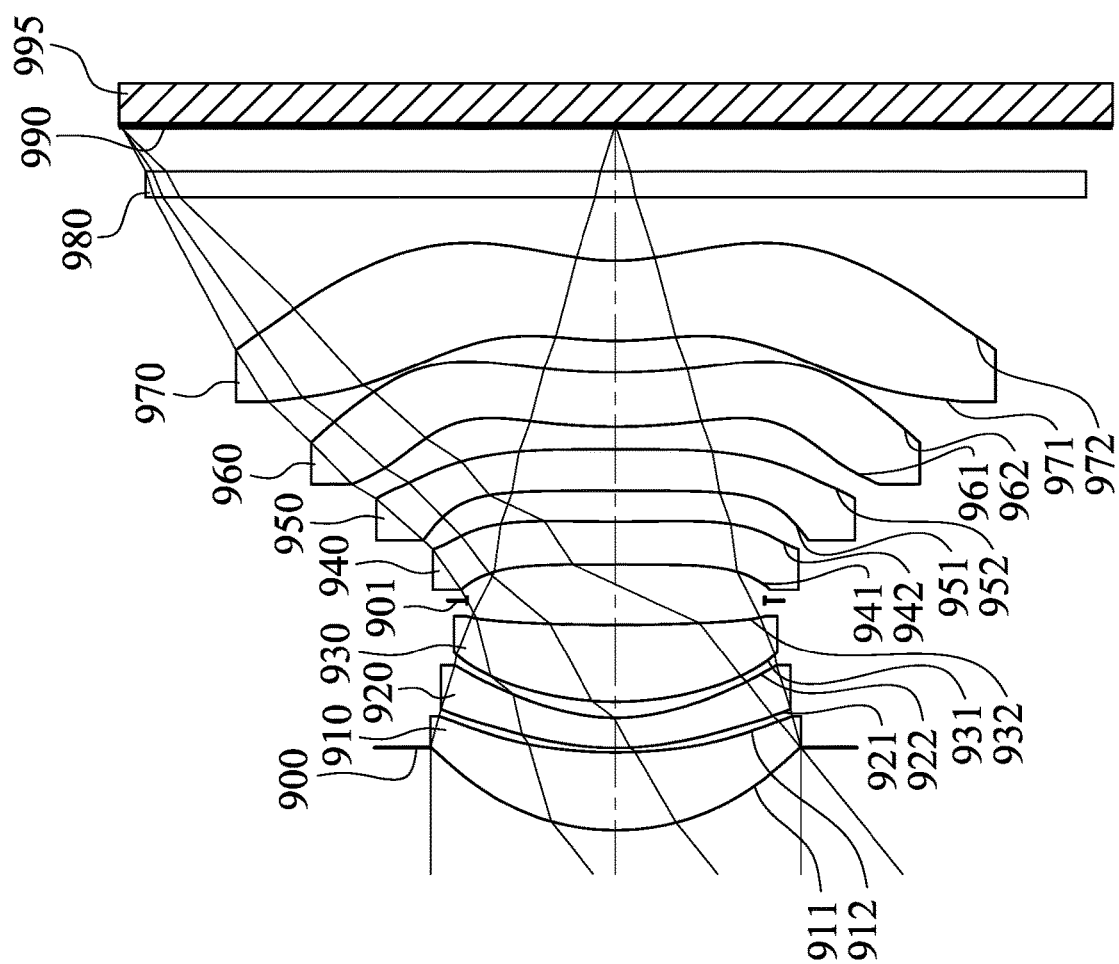
FIG. 17 is a schematic view of an imaging apparatus according to the 9th embodiment of the present disclosure.
Figure 18:
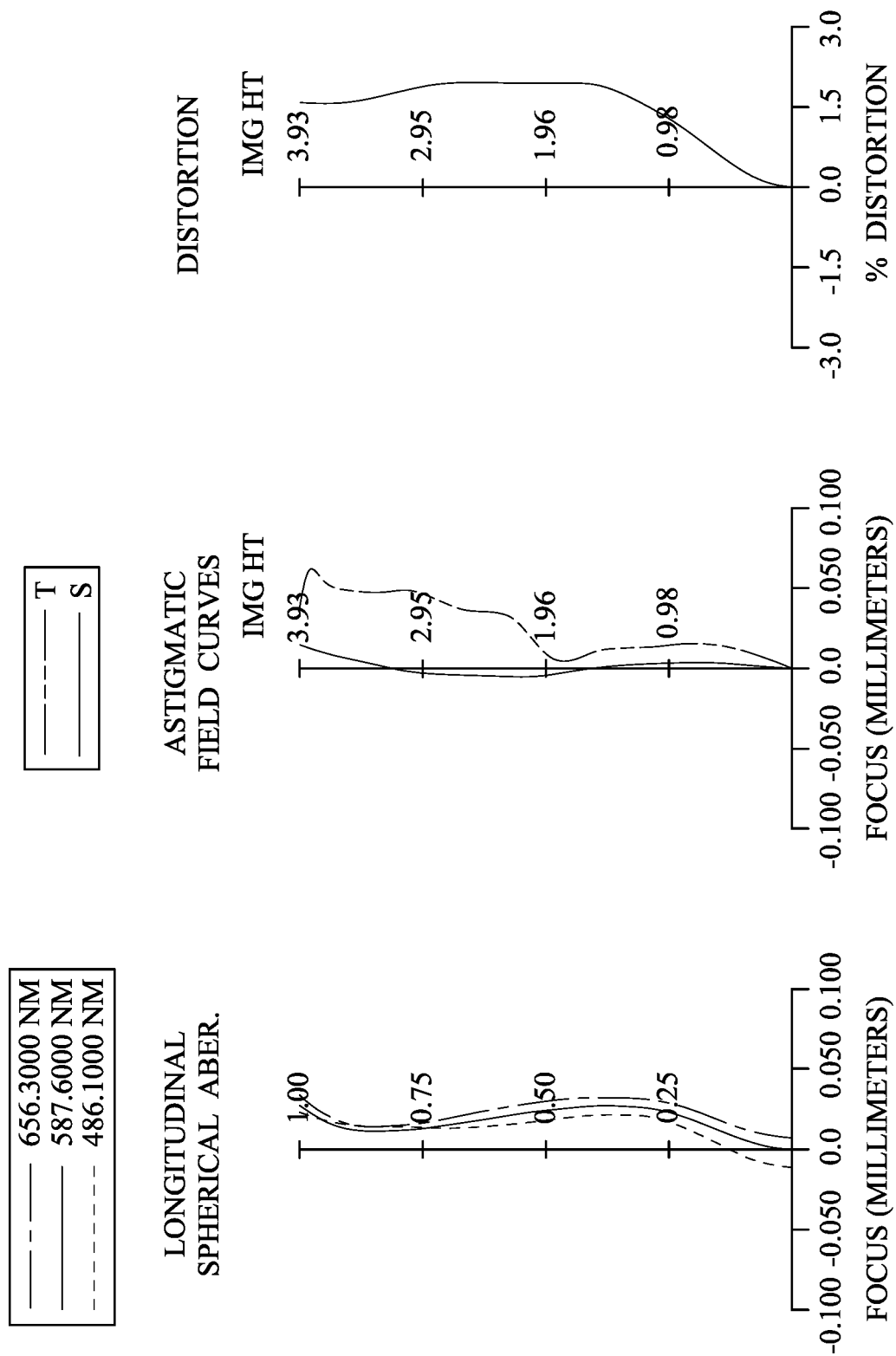
FIG. 18 shows spherical aberration curves, astigmatic field curves and a distortion curve of the imaging apparatus according to the 9th embodiment.

FIG. 17 is a schematic view of an imaging apparatus according to the 9th embodiment of the present disclosure. FIG. 18 shows spherical aberration curves, astigmatic field curves and a distortion curve of the imaging apparatus according to the 9th embodiment. In FIG. 17, the imaging apparatus includes a photographing optical lens assembly (its reference numeral is omitted) and an image sensor 995. The photographing optical lens assembly includes, in order from an object side to an image side, an aperture stop 900, a first lens element 910, a second lens element 920, a third lens element 930, a stop 901, a fourth lens element 940, a fifth lens element 950, a sixth lens element 960, a seventh lens element 970, a filter 980 and an image sensor 990. The image sensor 995 is disposed on the image surface 990 of the photographing optical lens assembly. The photographing optical lens assembly includes seven lens elements (910, 920, 930, 940, 950, 960 and 970) without additional one or more lens elements inserted between the first lens element 910 and the seventh lens element 970, and there is an air gap in a paraxial region between each of adjacent lens elements of the seven lens elements.

The first lens element 910 with positive refractive power has an object-side surface 911 being convex in a paraxial region thereof and an image-side surface 912 being concave in a paraxial region thereof. The first lens element 910 is made of a plastic material, and has the object-side surface 911 and the image-side surface 912 being both aspheric.

The second lens element 920 with negative refractive power has an object-side surface 921 being convex in a paraxial region thereof and an image-side surface 922 being concave in a paraxial region thereof. The second lens element 920 is made of a plastic material, and has the object-side surface 921 and the image-side surface 922 being both aspheric.

The third lens element 930 with positive refractive power has an object-side surface 931 being convex in a paraxial region thereof and an image-side surface 932 being concave in a paraxial region thereof. The third lens element 930 is made of a plastic material, and has the object-side surface 931 and the image-side surface 932 being both aspheric.

The fourth lens element 940 with negative refractive power has an object-side surface 941 being convex in a paraxial region thereof and an image-side surface 942 being concave in a paraxial region thereof. The fourth lens element 940 is made of a plastic material, and has the object-side surface 941 and the image-side surface 942 being both aspheric.

The fifth lens element 950 with positive refractive power has an object-side surface 951 being convex in a paraxial region thereof and an image-side surface 952 being convex in a paraxial region thereof. The fifth lens element 950 is made of a plastic material, and has the object-side surface 951 and the image-side surface 952 being both aspheric.

The sixth lens element 960 with negative refractive power has an object-side surface 961 being convex in a paraxial region thereof and an image-side surface 962 being concave in a paraxial region thereof. The sixth lens element 960 is made of a plastic material, and has the object-side surface 961 and the image-side surface 962 being both aspheric. Furthermore, the image-side surface 962 of the sixth lens element 960 includes at least one inflection point in an off-axis region thereof.

The seventh lens element 970 with negative refractive power has an object-side surface 971 being convex in a paraxial region thereof and an image-side surface 972 being concave in a paraxial region thereof. The seventh lens element 970 is made of a plastic material, and has the object-side surface 971 and the image-side surface 972 being both aspheric. Furthermore, the image-side surface 972 of the seventh lens element 970 includes at least one inflection point in an off-axis region thereof.

The filter 980 is made of a glass material and located between the seventh lens element 970 and the image surface 990, and will not affect the focal length of the photographing optical lens assembly.

Six lens elements (910, 920, 930, 940, 960 and 970) of the photographing optical lens assembly in the 9th embodiment have the object-side surfaces (911, 921, 931, 941, 961 and 971) being convex in the paraxial regions thereof and the image-side surfaces (912, 922, 932, 942, 962 and 972) being concave in the paraxial regions thereof.

The detailed optical data of the 9th embodiment are shown in TABLE 17 and the aspheric surface data are shown in TABLE 18 below.

TABLE 17

9th Embodiment
f = 4.76 mm, Fno = 1.62, HFOV = 39.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.653 | | | | |
| 2 | Lens 1 | 1.917 | ASP | 0.617 | Plastic | 1.545 | 56.1 | 6.40 |
| 3 | | 3.769 | ASP | 0.035 | | | | |
| 4 | Lens 2 | 2.200 | ASP | 0.240 | Plastic | 1.669 | 19.5 | −9.60 |
| 5 | | 1.567 | ASP | 0.128 | | | | |
| 6 | Lens 3 | 2.610 | ASP | 0.613 | Plastic | 1.544 | 56.0 | 5.77 |
| 7 | | 14.248 | ASP | 0.193 | | | | |
| 8 | Stop | Plano | | 0.286 | | | | |
| 9 | Lens 4 | 49.295 | ASP | 0.340 | Plastic | 1.669 | 19.5 | −29.65 |
| 10 | | 14.102 | ASP | 0.242 | | | | |
| 11 | Lens 5 | 108.909 | ASP | 0.330 | Plastic | 1.639 | 23.5 | 46.16 |
| 12 | | −40.370 | ASP | 0.180 | | | | |
| 13 | Lens 6 | 5.666 | ASP | 0.431 | Plastic | 1.614 | 26.0 | −190.87 |
| 14 | | 5.249 | ASP | 0.254 | | | | |
| 15 | Lens 7 | 2.869 | ASP | 0.635 | Plastic | 1.534 | 55.9 | −11.49 |
| 16 | | 1.804 | ASP | 0.500 | | | | |
| 17 | Filter | Plano | | 0.210 | Glass | 1.517 | 64.2 | — |
| 18 | | Plano | | 0.359 | | | | |
| 19 | Image | Plano | | — | | | | |

Reference wavelength is 587.6 nm (d-line).
Effective radius of Surface 8 is 1.180 mm.

TABLE 18

Aspheric Coefficients

| Surface # | 2 | 3 | 4 | 5 | 6 | 7 | 9 |
|---|---|---|---|---|---|---|---|
| k = | 6.3273E−02 | 3.8324E+00 | 1.8223E−01 | −1.6364E−01 | 5.0349E−01 | 1.0960E+01 | 0.0000E+00 |
| A4 = | 2.2875E−03 | −6.1223E−02 | −1.6416E−01 | −1.4514E−01 | −1.6194E−02 | −1.1435E−02 | −9.4486E−02 |
| A6 = | −3.2715E−03 | 2.0898E−01 | 3.0095E−01 | 1.5886E−01 | 3.6136E−02 | 5.6130E−02 | 1.4678E−01 |
| A8 = | 8.3099E−03 | −2.8649E−01 | −4.0017E−01 | −1.6704E−01 | −1.9676E−02 | −1.6435E−01 | −4.3962E−01 |
| A10 = | −1.0134E−02 | 1.9990E−01 | 2.9631E−01 | 8.8008E−02 | 1.3009E−03 | 2.7122E−01 | 6.9866E−01 |
| A12 = | 5.1818E−03 | −7.7540E−02 | −1.2490E−01 | −1.8869E−02 | 2.3232E−03 | −2.3605E−01 | −6.3862E−01 |
| A14 = | −1.1249E−03 | 1.6173E−02 | 2.9104E−02 | 3.2879E−04 | 2.9265E−04 | 1.0376E−01 | 3.0636E−01 |
| A16 = | | −1.5483E−03 | −3.0214E−03 | | | −1.7470E−02 | −6.0061E−02 |

| Surface # | 10 | 11 | 12 | 13 | 14 | 15 | 16 |
|---|---|---|---|---|---|---|---|
| k = | −1.5038E+00 | 0.0000E+00 | 0.0000E+00 | −6.2610E−01 | −3.7242E−01 | −1.0000E+00 | −1.0000E+00 |
| A4 = | −9.0183E−02 | −5.6893E−02 | 3.9588E−03 | 1.0229E−01 | 2.6007E−02 | −2.4422E−01 | −2.0920E−01 |
| A6 = | 1.1393E−01 | 8.6151E−02 | −1.1128E−01 | −2.5248E−01 | −7.0933E−02 | 9.4570E−02 | 9.5829E−02 |
| A8 = | −2.3752E−01 | −1.3821E−01 | 1.3659E−01 | 2.2130E−01 | 4.1449E−02 | −2.0575E−02 | −3.6625E−02 |
| A10 = | 2.6715E−01 | 1.2255E−01 | −8.8101E−02 | −1.2876E−01 | −1.6529E−02 | 2.8087E−03 | 9.7764E−03 |
| A12 = | −1.7727E−01 | −6.8417E−02 | 3.0645E−02 | 4.5953E−02 | 4.3068E−03 | −2.4037E−04 | −1.6615E−03 |
| A14 = | 6.2390E−02 | 1.9178E−02 | −5.3498E−03 | −9.3433E−03 | −6.6656E−04 | 1.2535E−05 | 1.6926E−04 |
| A16 = | −8.6624E−03 | −1.9865E−03 | 3.6643E−04 | 9.9131E−04 | 5.4931E−05 | −4.0906E−07 | −9.3714E−06 |
| A18 = | | | | −4.2599E−05 | −1.8450E−06 | 8.5237E−09 | 2.1616E−07 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from TABLE 17 and TABLE 18 as the following values and satisfy the following conditions:

| 9th Embodiment | | | |
|---|---|---|---|
| f [mm] | 4.76 | |f/fi|min | 0.025 |
| Fno | 1.62 | |f/fi|max | 0.83 |
| HFOV [deg.] | 39.0 | |f/f4| + |f/f5| + |f/f6| | 0.29 |
| V2 | 19.5 | f/EPD | 1.62 |
| V4 | 19.5 | TL/f | 1.18 |
| V6 | 26.0 | SD/TD | 0.86 |
| Vmin | 19.5 | TL/ImgH | 1.42 |
| V4 + V5 + V6 | 69.0 | BL/TD | 0.24 |
| T56/T67 | 0.71 | ImgH/f | 0.83 |
| CT7/CT1 | 1.03 | |f/R1| + |f/R2| | 3.75 |
| R5/CT3 | 4.26 | |f/R3| + |f/R4| | 5.20 |
| f/R9 | 0.04 | |f/R5| + [f/R6| | 2.16 |
| (R3 − R4)/(R3 + R4) | 0.17 | |f/R7| + |f/R8| | 0.43 |
| (R5 + R6)/(R5 − R6) | −1.45 | |f/R9| + |f/R10| | 0.16 |
| (R7 − R8)/(R7 + R8) | 0.56 | |f/R11| + |f/R12| | 1.75 |
| f/f3 | 0.83 | |f/R13| + |f/R14| | 4.30 |
| |f1/f2| | 0.67 | | |

In the 9th embodiment, Abbe numbers of two lens elements (920 and 940) of the photographing optical lens assembly are greater than 10.0 and smaller than 22.0. Furthermore, the following condition is satisfied by two lens elements (940 and 950) of the photographing optical lens assembly: |f/Rf|+|f/Rr|<1.0.

10th Embodiment

Figure 19:
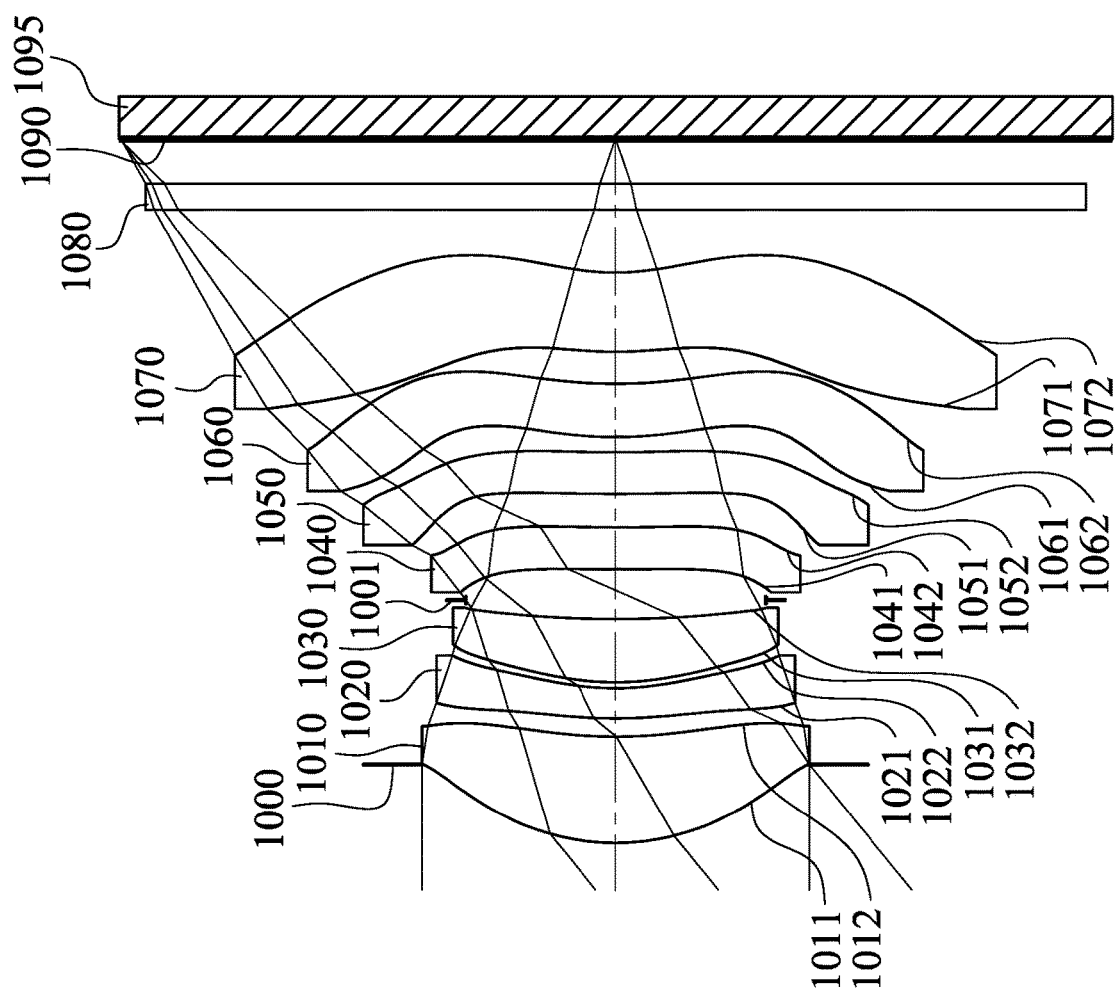
FIG. 19 is a schematic view of an image capturing apparatus according to the 10th embodiment of the present disclosure.
Figure 20:
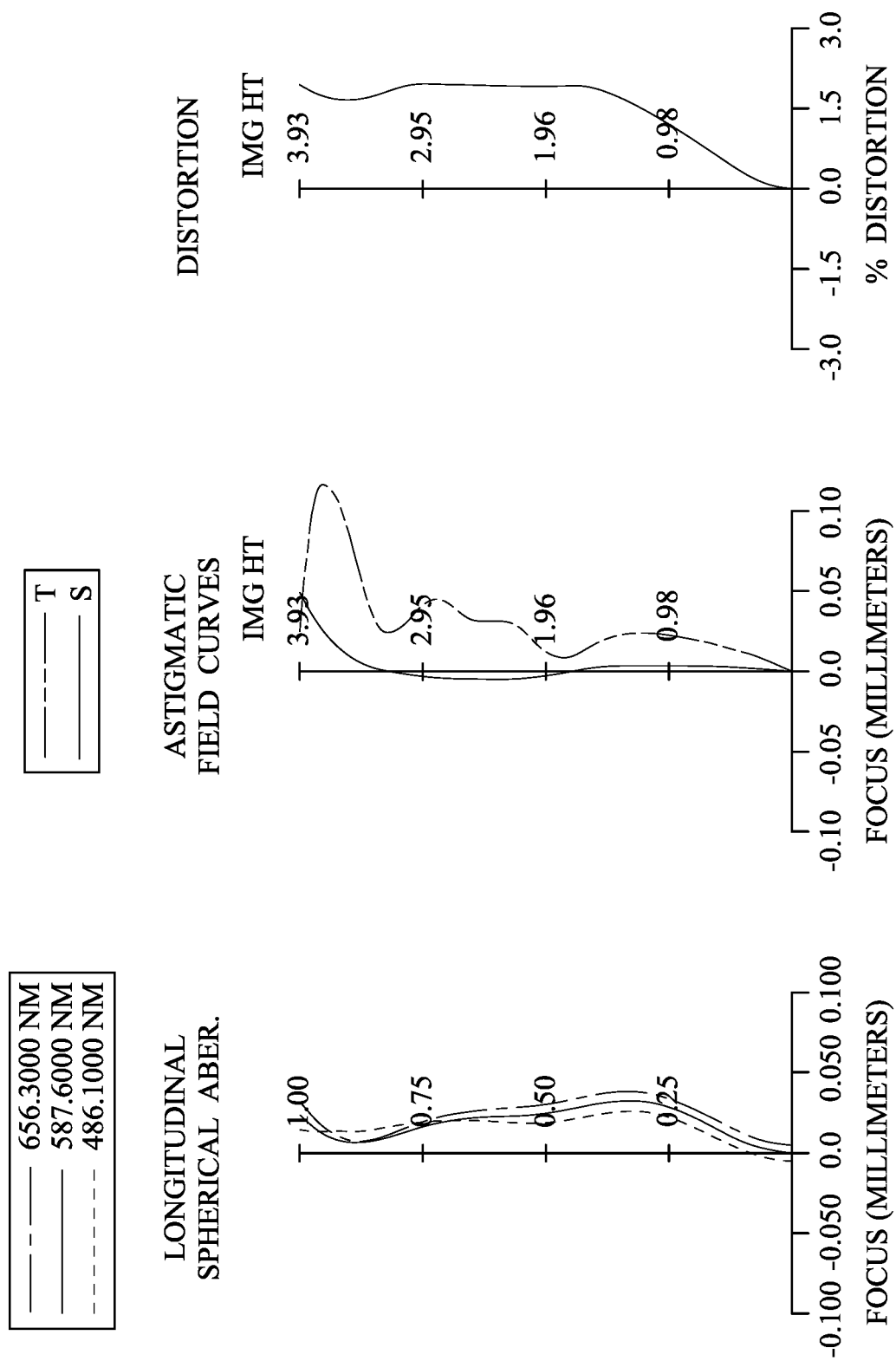
FIG. 20 shows spherical aberration curves, astigmatic field curves and a distortion curve of the image capturing apparatus according to the 10th embodiment.

FIG. 19 is a schematic view of an imaging apparatus according to the 10th embodiment of the present disclosure. FIG. 20 shows spherical aberration curves, astigmatic field curves and a distortion curve of the imaging apparatus according to the 10th embodiment. In FIG. 19, the imaging apparatus includes a photographing optical lens assembly (its reference numeral is omitted) and an image sensor 1095. The photographing optical lens assembly includes, in order from an object side to an image side, an aperture stop 1000, a first lens element 1010, a second lens element 1020, a third lens element 1030, a stop 1001, a fourth lens element 1040, a fifth lens element 1050, a sixth lens element 1060, a seventh lens element 1070, a filter 1080 and an image surface 1090. The image sensor 1095 is disposed on the image surface 1090 of the photographing optical lens assembly. The photographing optical lens assembly includes seven lens elements (1010, 1020, 1030, 1040, 1050, 1060 and 1070) without additional one or more lens elements inserted between the first lens element 1010 and the seventh lens element 1070, and there is an air gap in a paraxial region between each of adjacent lens elements of the seven lens elements.

The first lens element 1010 with positive refractive power has an object-side surface 1011 being convex in a paraxial region thereof and an image-side surface 1012 being concave in a paraxial region thereof. The first lens element 1010 is made of a plastic material, and has the object-side surface 1011 and the image-side surface 1012 being both aspheric.

The second lens element 1020 with negative refractive power has an object-side surface 1021 being convex in a paraxial region thereof and an image-side surface 1022 being concave in a paraxial region thereof. The second lens element 1020 is made of a plastic material, and has the object-side surface 1021 and the image-side surface 1022 being both aspheric.

The third lens element 1030 with positive refractive power has an object-side surface 1031 being convex in a paraxial region thereof and an image-side surface 1032 being concave in a paraxial region thereof. The third lens element 1030 is made of a plastic material, and has the object-side surface 1031 and the image-side surface 1032 being both aspheric.

The fourth lens element 1040 with negative refractive power has an object-side surface 1041 being convex in a paraxial region thereof and an image-side surface 1042 being concave in a paraxial region thereof. The fourth lens element 1040 is made of a plastic material, and has the object-side surface 1041 and the image-side surface 1042 being both aspheric.

The fifth lens element 1050 with negative refractive power has an object-side surface 1051 being convex in a paraxial region thereof and an image-side surface 1052 being concave in a paraxial region thereof. The fifth lens element 1050 is made of a plastic material, and has the object-side surface 1051 and the image-side surface 1052 being both aspheric.

The sixth lens element 1060 with positive refractive power has an object-side surface 1061 being convex in a paraxial region thereof and an image-side surface 1062 being concave in a paraxial region thereof. The sixth lens element 1060 is made of a plastic material, and has the object-side surface 1061 and the image-side surface 1062 being both aspheric. Furthermore, the image-side surface 1062 of the sixth lens element 1060 includes at least one inflection point in an off-axis region thereof.

The seventh lens element 1070 with negative refractive power has an object-side surface 1071 being convex in a paraxial region thereof and an image-side surface 1072 being concave in a paraxial region thereof. The seventh lens element 1070 is made of a plastic material, and has the object-side surface 1071 and the image-side surface 1072 being both aspheric. Furthermore, the image-side surface 1072 of the seventh lens element 1070 includes at least one inflection point in an off-axis region thereof.

The filter 1080 is made of a glass material and located between the seventh lens element 1070 and the image surface 1090, and will not affect the focal length of the photographing optical lens assembly.

Seven lens elements (1010, 1020, 1030, 1040, 1050, 1060 and 1070) of the photographing optical lens assembly in the 10th embodiment have the object-side surfaces (1011, 1021, 1031, 1041, 1051, 1061 and 1071) being convex in the paraxial regions thereof and the image-side surfaces (1012, 1022, 1032, 1042, 1052, 1062 and 1072) being concave in the paraxial regions thereof.

The detailed optical data of the 10th embodiment are shown in TABLE 19 and the aspheric surface data are shown in TABLE 20 below.

TABLE 19

10th Embodiment
f = 4.70 mm, Fno = 1.53, HFOV = 39.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.625 | | | | |
| 2 | Lens 1 | 1.899 | ASP | 0.845 | Plastic | 1.545 | 56.1 | 5.94 |
| 3 | | 3.872 | ASP | 0.145 | | | | |
| 4 | Lens 2 | 3.950 | ASP | 0.240 | Plastic | 1.669 | 19.5 | −7.74 |
| 5 | | 2.186 | ASP | 0.047 | | | | |
| 6 | Lens 3 | 2.324 | ASP | 0.500 | Plastic | 1.544 | 56.0 | 5.70 |
| 7 | | 8.551 | ASP | 0.150 | | | | |
| 8 | Stop | Plano | | 0.246 | | | | |
| 9 | Lens 4 | 17.241 | ASP | 0.332 | Plastic | 1.669 | 19.5 | −43.02 |
| 10 | | 10.697 | ASP | 0.269 | | | | |
| 11 | Lens 5 | 13.827 | ASP | 0.330 | Plastic | 1.639 | 23.5 | −51.92 |
| 12 | | 9.667 | ASP | 0.121 | | | | |
| 13 | Lens 6 | 3.323 | ASP | 0.423 | Plastic | 1.614 | 26.0 | 23.06 |
| 14 | | 4.132 | ASP | 0.253 | | | | |
| 15 | Lens 7 | 2.902 | ASP | 0.628 | Plastic | 1.534 | 55.9 | −11.76 |
| 16 | | 1.835 | ASP | 0.500 | | | | |
| 17 | Filter | Plano | | 0.210 | Glass | 1.517 | 64.2 | — |
| 18 | | Plano | | 0.353 | | | | |
| 19 | Image | Plano | | — | | | | |

Reference wavelength is 587.6 nm (d-line).
Effective radius of Surface 8 is 1.190 mm.

TABLE 20

Aspheric Coefficients

| Surface # | 2 | 3 | 4 | 5 | 6 | 7 | 9 |
|---|---|---|---|---|---|---|---|
| k = | −1.8856E−01 | −1.1225E+01 | 3.2784E−01 | 1.3952E−02 | −6.9658E−01 | −2.5557E+01 | 0.0000E+00 |
| A4 = | −2.9353E−03 | 1.5565E−02 | −6.4309E−02 | −1.2243E−01 | −6.2983E−02 | −1.4629E−03 | −9.4814E−02 |
| A6 = | 8.7274E−03 | −6.9529E−02 | −4.6000E−02 | 2.2408E−02 | 2.781 0E−02 | 3.4091E−02 | 1.4702E−01 |
| A8 = | −1.3288E−02 | 8.4481E−02 | 1.2765E−01 | 8.0702E−02 | 2.0308E−02 | −7.2899E−02 | −4.4593E−02 |
| A10 = | 6.0846E−03 | −8.1254E−02 | −1.4324E−01 | −1.3420E−01 | −6.4494E−02 | 8.5668E−02 | 7.1076E−01 |
| A12 = | 3.7410E−04 | 4.6515E−02 | 9.1312E−02 | 9.5306E−02 | 4.2288E−02 | −6.0069E−02 | −6.4460E−01 |
| A14 = | −1.4325E−03 | −1.3670E−02 | −2.9646E−02 | −2.9536E−02 | −7.0825E−03 | 1.8381E−02 | 3.0092E−01 |
| A16 = | 2.9174E−04 | 1.5954E−03 | 3.8039E−03 | 3.0850E−03 | | | −5.6243E−02 |

| Surface # | 10 | 11 | 12 | 13 | 14 | 15 | 16 |
|---|---|---|---|---|---|---|---|
| k = | 8.8952E+00 | 0.0000E+00 | −3.2199E+01 | −4.3991E+00 | 0.0000E+00 | −7.5541E+00 | −1.0000E+00 |
| A4 = | −8.3875E−02 | −5.4422E−02 | −4.7048E−02 | 5.0566E−02 | 6.5308E−03 | −2.1659E−01 | −2.0762E−01 |
| A6 = | 7.4605E−02 | 8.1841E−02 | −6.6807E−02 | −2.3157E−01 | −7.3807E−02 | 8.4016E−02 | 9.4388E−02 |
| A8 = | −1.8420E−01 | −1.4534E−01 | 1.1483E−01 | 2.3165E−01 | 5.1260E−02 | −1.3544E−02 | −3.5034E−02 |
| A10 = | 2.2657E−01 | 1.3981E−01 | −8.3522E−02 | −1.4539E−01 | −2.2618E−02 | 2.1088E−04 | 9.0780E−03 |
| A12 = | −1.6126E−01 | −8.3606E−02 | 3.0212E−02 | 5.4560E−02 | 6.3248E−03 | 2.6747E−04 | −1.5006E−03 |
| A14 = | 5.9239E−02 | 2.4973E−02 | −5.2709E−03 | −1.1563E−02 | −1.0460E−03 | −4.2237E−05 | 1.4886E−04 |
| A16 = | −8.3454E−03 | −2.7638E−03 | 3.5382E−04 | 1.2772E−03 | 9.2433E−05 | 2.7027E−06 | −8.0377E−06 |
| A18 = | | | | −5.7269E−05 | −3.3443E−06 | −6.4669E−08 | 1.8113E−07 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from TABLE 19 and TABLE 20 as the following values and satisfy the following conditions:

| 10th Embodiment | | | |
|---|---|---|---|
| f [mm] | 4.70 | |f/f|min | 0.091 |
| Fno | 1.53 | |f/f|max | 0.82 |

-continued

| 10th Embodiment | | | |
|---|---|---|---|
| HFOV [deg.] | 39.2 | |f/f4| + |f/f5| + |f/f6| | 0.40 |
| V2 | 19.5 | f/EPD | 1.53 |
| V4 | 19.5 | TL/f | 1.19 |
| V6 | 26.0 | SD/TD | 0.86 |
| Vmin | 19.5 | TL/ImgH | 1.42 |
| V4 + V5 + V6 | 69.0 | BL/TD | 0.23 |
| T56/T67 | 0.48 | ImgH/f | 0.84 |
| CT7/CT1 | 0.74 | |f/R1| + |f/R2| | 3.69 |
| R5/CT3 | 4.65 | |f/R3| + |f/R4| | 3.34 |
| f/R9 | 0.34 | |f/R5| + |f/R6| | 2.57 |
| (R3 − R4)/(R3 + R4) | 0.29 | |f/R7| + |f/R8| | 0.71 |
| (R5 + R6)/(R5 − R6) | −1.75 | |f/R9| + |f/R10| | 0.83 |

-continued

| 10th Embodiment | | | |
|---|---|---|---|
| (R7 − R8)/(R7 + R8) | 0.23 | \|f/R11\| + \|f/R12\| | 2.55 |
| f/f3 | 0.82 | \|f/R13\| + \|f/R14\| | 4.18 |
| \|f1/f2\| | 0.77 | | |

In the 10th embodiment, Abbe numbers of two lens elements (1020 and 1040) of the photographing optical lens assembly are greater than 10.0 and smaller than 22.0. Furthermore, the following condition is satisfied by two lens elements (1040 and 1050) of the photographing optical lens assembly: |f/Rf|+|f/Rr|<1.0.

11th Embodiment

Figure 21:
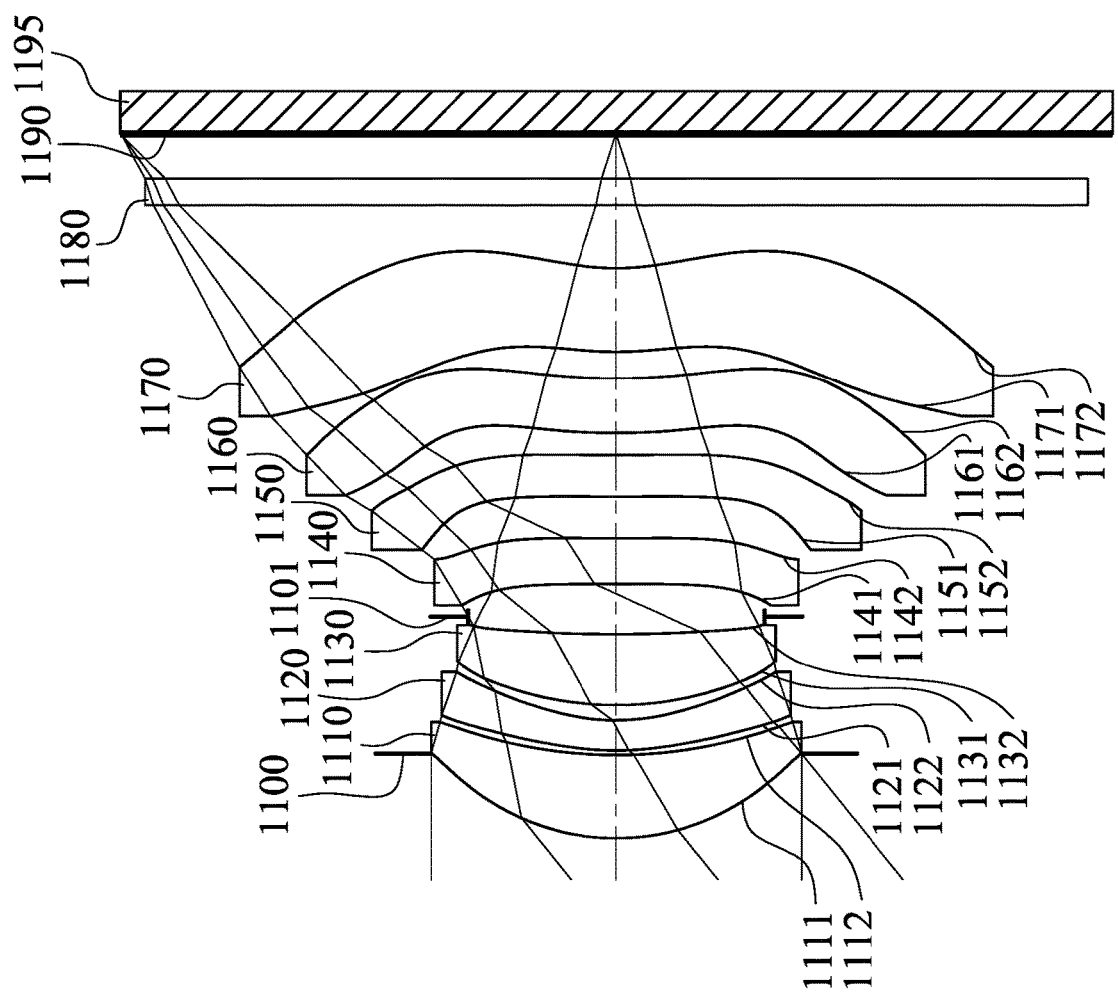
FIG. 21 is a schematic view of an image capturing apparatus according to the 11th embodiment of the present disclosure.
Figure 22:
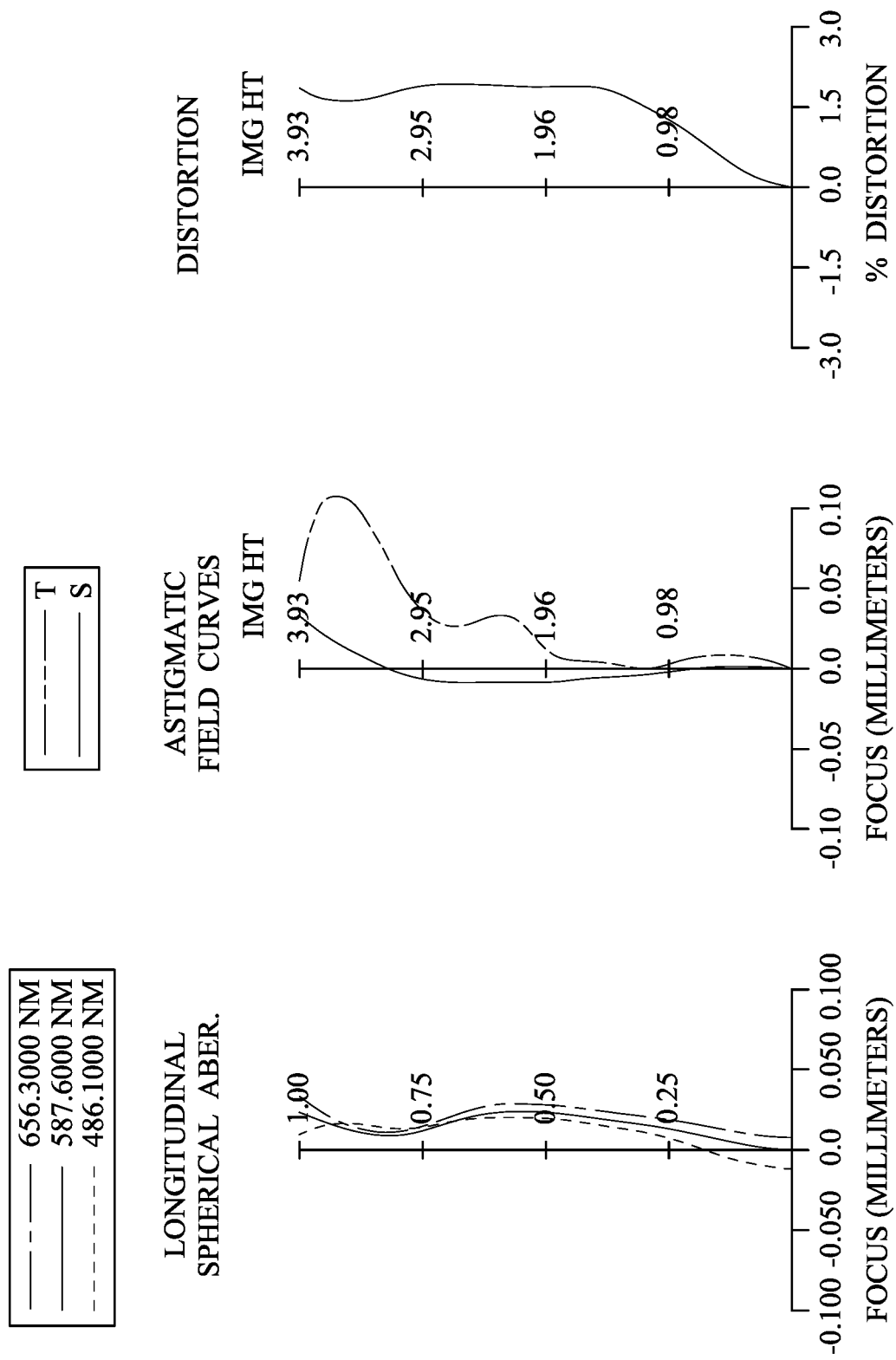
FIG. 22 shows spherical aberration curves, astigmatic field curves and a distortion curve of the image capturing apparatus according to the 11th embodiment.

FIG. 21 is a schematic view of an imaging apparatus according to the 11th embodiment of the present disclosure. FIG. 22 shows spherical aberration curves, astigmatic field curves and a distortion curve of the imaging apparatus according to the 11th embodiment. In FIG. 21, the imaging apparatus includes a photographing optical lens assembly (its reference numeral is omitted) and an image sensor 1195. The photographing optical lens assembly includes, in order from an object side to an image side, an aperture stop 1100, a first lens element 1110, a second lens element 1120, a third lens element 1130, a stop 1101, a fourth lens element 1140, a fifth lens element 1150, a sixth lens element 1160, a seventh lens element 1170, a filter 1180 and an image surface 1190. The image sensor 1195 is disposed on the image surface 1190 of the photographing optical lens assembly. The photographing optical lens assembly includes seven lens elements (1110, 1120, 1130, 1140, 1150, 1160 and 1170) without additional one or more lens elements inserted between the first lens element 1110 and the seventh lens element 1170, and there is an air gap in a paraxial region between each of adjacent lens elements of the seven lens elements.

The first lens element 1110 with positive refractive power has an object-side surface 1111 being convex in a paraxial region thereof and an image-side surface 1112 being concave in a paraxial region thereof. The first lens element 1110 is made of a plastic material, and has the object-side surface 1111 and the image-side surface 1112 being both aspheric.

The second lens element 1120 with negative refractive power has an object-side surface 1121 being convex in a paraxial region thereof and an image-side surface 1122 being concave in a paraxial region thereof. The second lens element 1120 is made of a plastic material, and has the object-side surface 1121 and the image-side surface 1122 being both aspheric.

The third lens element 1130 with positive refractive power has an object-side surface 1131 being convex in a paraxial region thereof and an image-side surface 1132 being concave in a paraxial region thereof. The third lens element 1130 is made of a plastic material, and has the object-side surface 1131 and the image-side surface 1132 being both aspheric.

The fourth lens element 1140 with negative refractive power has an object-side surface 1141 being convex in a paraxial region thereof and an image-side surface 1142 being concave in a paraxial region thereof. The fourth lens element 1140 is made of a plastic material, and has the object-side surface 1141 and the image-side surface 1142 being both aspheric.

The fifth lens element 1150 with negative refractive power has an object-side surface 1151 being convex in a paraxial region thereof and an image-side surface 1152 being concave in a paraxial region thereof. The fifth lens element 1150 is made of a plastic material, and has the object-side surface 1151 and the image-side surface 1152 being both aspheric.

The sixth lens element 1160 with negative refractive power has an object-side surface 1161 being convex in a paraxial region thereof and an image-side surface 1162 being concave in a paraxial region thereof. The sixth lens element 1160 is made of a plastic material, and has the object-side surface 1161 and the image-side surface 1162 being both aspheric. Furthermore, the image-side surface 1162 of the sixth lens element 1160 includes at least one inflection point in an off-axis region thereof.

The seventh lens element 1170 with negative refractive power has an object-side surface 1171 being convex in a paraxial region thereof and an image-side surface 1172 being concave in a paraxial region thereof. The seventh lens element 1170 is made of a plastic material, and has the object-side surface 1171 and the image-side surface 1172 being both aspheric. Furthermore, the image-side surface 1172 of the seventh lens element 1170 includes at least one inflection point in an off-axis region thereof.

The filter 1180 is made of a glass material and located between the seventh lens element 1170 and the image surface 1190, and will not affect the focal length of the photographing optical lens assembly.

Seven lens elements (1110, 1120, 1130, 1140, 1150, 1160 and 1170) of the photographing optical lens assembly in the 11th embodiment have the object-side surfaces (1111, 1121, 1131, 1141, 1151, 1161 and 1171) being convex in the paraxial regions thereof and the image-side surfaces (1112, 1122, 1132, 1142, 1052, 1162 and 1172) being concave in the paraxial regions thereof.

The detailed optical data of the 11th embodiment are shown in TABLE 21 and the aspheric surface data are shown in TABLE 22 below.

TABLE 21

11th Embodiment
f = 4.76 mm, Fno = 1.62, HFOV = 38.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.671 | | | | |
| 2 | Lens 1 | 1.872 | ASP | 0.660 | Plastic | 1.545 | 56.1 | 6.36 |
| 3 | | 3.559 | ASP | 0.035 | | | | |
| 4 | Lens 2 | 2.276 | ASP | 0.240 | Plastic | 1.669 | 19.5 | −9.92 |

TABLE 21-continued

11th Embodiment
f = 4.76 mm, Fno = 1.62, HFOV = 38.9 deg.

| Surface # | | Curvature Radius | | Thickness | Material | Index | Abbe # | Focal Length |
|---|---|---|---|---|---|---|---|---|
| 5 | | 1.623 | ASP | 0.120 | | | | |
| 6 | Lens 3 | 2.555 | ASP | 0.566 | Plastic | 1.544 | 56.0 | 6.00 |
| 7 | | 10.845 | ASP | 0.140 | | | | |
| 8 | Stop | Plano | | 0.259 | | | | |
| 9 | Lens 4 | 100.000 | ASP | 0.362 | Plastic | 1.669 | 19.5 | −74.47 |
| 10 | | 33.199 | ASP | 0.329 | | | | |
| 11 | Lens 5 | 26.006 | ASP | 0.330 | Plastic | 1.669 | 19.5 | −87.07 |
| 12 | | 17.886 | ASP | 0.177 | | | | |
| 13 | Lens 6 | 5.623 | ASP | 0.435 | Plastic | 1.669 | 19.5 | −190.93 |
| 14 | | 5.218 | ASP | 0.212 | | | | |
| 15 | Lens 7 | 2.764 | ASP | 0.662 | Plastic | 1.534 | 55.9 | −14.92 |
| 16 | | 1.881 | ASP | 0.500 | | | | |
| 17 | Filter | Plano | | 0.210 | Glass | 1.517 | 64.2 | — |
| 18 | | Plano | | 0.356 | | | | |
| 19 | Image | Plano | | — | | | | |

Reference wavelength is 587.6 nm (d-line).
Effective radius of Surface 8 is 1.175 mm.

TABLE 22

Aspheric Coefficients

| Surface # | 2 | 3 | 4 | 5 | 6 | 7 | 9 |
|---|---|---|---|---|---|---|---|
| k = | 4.9799E−02 | 2.0541E+00 | 1.2122E−01 | −1.4576E−01 | 8.7261E−01 | 3.4046E+01 | 0.0000E+00 |
| A4 = | 6.1793E−04 | −8.5288E−02 | −1.9204E−01 | −1.6667E−01 | −4.1824E−02 | −2.2541E−02 | −4.7162E−02 |
| A6 = | 6.0717E−04 | 2.1129E−01 | 3.0927E−01 | 1.7755E−01 | 5.1487E−02 | 7.4384E−02 | −8.0235E−02 |
| A8 = | 1.4612E−03 | −2.5100E−01 | −3.4976E−01 | −1.6716E−01 | −5.2223E−02 | −2.0108E−01 | 1.7990E−01 |
| A10 = | −4.9309E−03 | 1.4655E−01 | 2.1433E−01 | 8.1085E−02 | 3.6101E−02 | 2.7942E−01 | −2.3675E−01 |
| A12 = | 3.3059E−03 | −4.1369E−02 | −6.5454E−02 | −1.4402E−02 | −1.7631E−02 | −1.8900E−01 | 1.4612E−01 |
| A14 = | −8.6910E−04 | 4.3993E−03 | 7.9177E−03 | −4.9698E−04 | 5.5898E−03 | 5.1629E−02 | −3.3725E−02 |

| Surface # | 10 | 11 | 12 | 13 | 14 | 15 | 16 |
|---|---|---|---|---|---|---|---|
| k = | 0.0000E+00 | 7.9117E+00 | 1.1612E+01 | 1.5286E−01 | −1.7014E−02 | −9.2873E−01 | −1.0000E+00 |
| A4 = | −5.6555E−02 | −7.3869E−02 | −3.3645E−02 | 7.4078E−02 | 1.4068E−02 | −2.4874E−01 | −2.0004E−01 |
| A6 = | 7.7894E−03 | 9.1019E−02 | −6.9595E−02 | −2.2374E−01 | −6.8571E−02 | 1.1130E−01 | 9.2440E−02 |
| A8 = | −3.5261E−02 | −1.3096E−01 | 1.0710E−01 | 2.0057E−01 | 4.4804E−02 | −3.4330E−02 | −3.5845E−02 |
| A10 = | 5.0648E−02 | 1.0845E−01 | −7.7731E−02 | −1.1622E−01 | −1.9066E−02 | 7.9892E−03 | 9.6685E−03 |
| A12 = | −4.6693E−02 | −6.0865E−02 | 2.8718E−02 | 4.1271E−02 | 5.1290E−03 | −1.3146E−03 | −1.6568E−03 |
| A14 = | 2.3196E−02 | 1.7949E−02 | −5.1523E−03 | −8.4085E−03 | −8.0550E−04 | 1.3923E−04 | 1.7004E−04 |
| A16 = | −4.1735E−03 | −1.9989E−03 | 3.5623E−04 | 9.0112E−04 | 6.6671E−05 | −8.4076E−06 | −9.4952E−06 |
| A18 = | | | | −3.9413E−05 | −2.2343E−06 | 2.1922E−07 | 2.2159E−07 |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

Moreover, these parameters can be calculated from TABLE 21 and TABLE 22 as the following values and satisfy the following conditions:

11th Embodiment

| | | | |
|---|---|---|---|
| f [mm] | 4.76 | \|f/fi\|min | 0.025 |
| Fno | 1.62 | \|f/fi\|max | 0.79 |
| HFOV [deg.] | 38.9 | \|f/f4\| + \|f/f5\| + \|f/f6\| | 0.14 |
| V2 | 19.5 | f/EPD | 1.62 |
| V4 | 19.5 | TL/f | 1.18 |
| V6 | 19.5 | SD/TD | 0.85 |
| Vmin | 19.5 | TL/ImgH | 1.42 |
| V4 + V5 + V6 | 58.5 | BL/TD | 0.24 |
| T56/T67 | 0.83 | ImgH/f | 0.83 |
| CT7/CT1 | 1.00 | \|f/R1\| + \|f/R2\| | 3.88 |
| R5/CT3 | 4.51 | \|f/R3\| + \|f/R4\| | 5.02 |
| f/R9 | 0.18 | \|f/R5\| + \|f/R6\| | 2.30 |
| (R3 − R4)/(R3 + R4) | 0.17 | \|f/R7\| + \|f/R8\| | 0.19 |
| (R5 + R6)/(R5 − R6) | −1.62 | \|f/R9\| + \|f/R10\| | 0.45 |

-continued

| 11th Embodiment | | | |
|---|---|---|---|
| (R7 − R8)/(R7 + R8) | 0.50 | \|f/R11\| + \|f/R12\| | 1.76 |
| f/f3 | 0.79 | \|f/R13\| + \|f/R14\| | 4.25 |
| \|f1/f2\| | 0.64 | | |

In the 11th embodiment, Abbe numbers of four lens elements (1120, 1140, 1150 and 1160) of the photographing optical lens assembly are greater than 10.0 and smaller than 22.0. Furthermore, the following condition is satisfied by two lens elements (1140 and 1150) of the photographing optical lens assembly: |f/Rf|+|f/Rr|<1.0.

12th Embodiment

Figure 23:
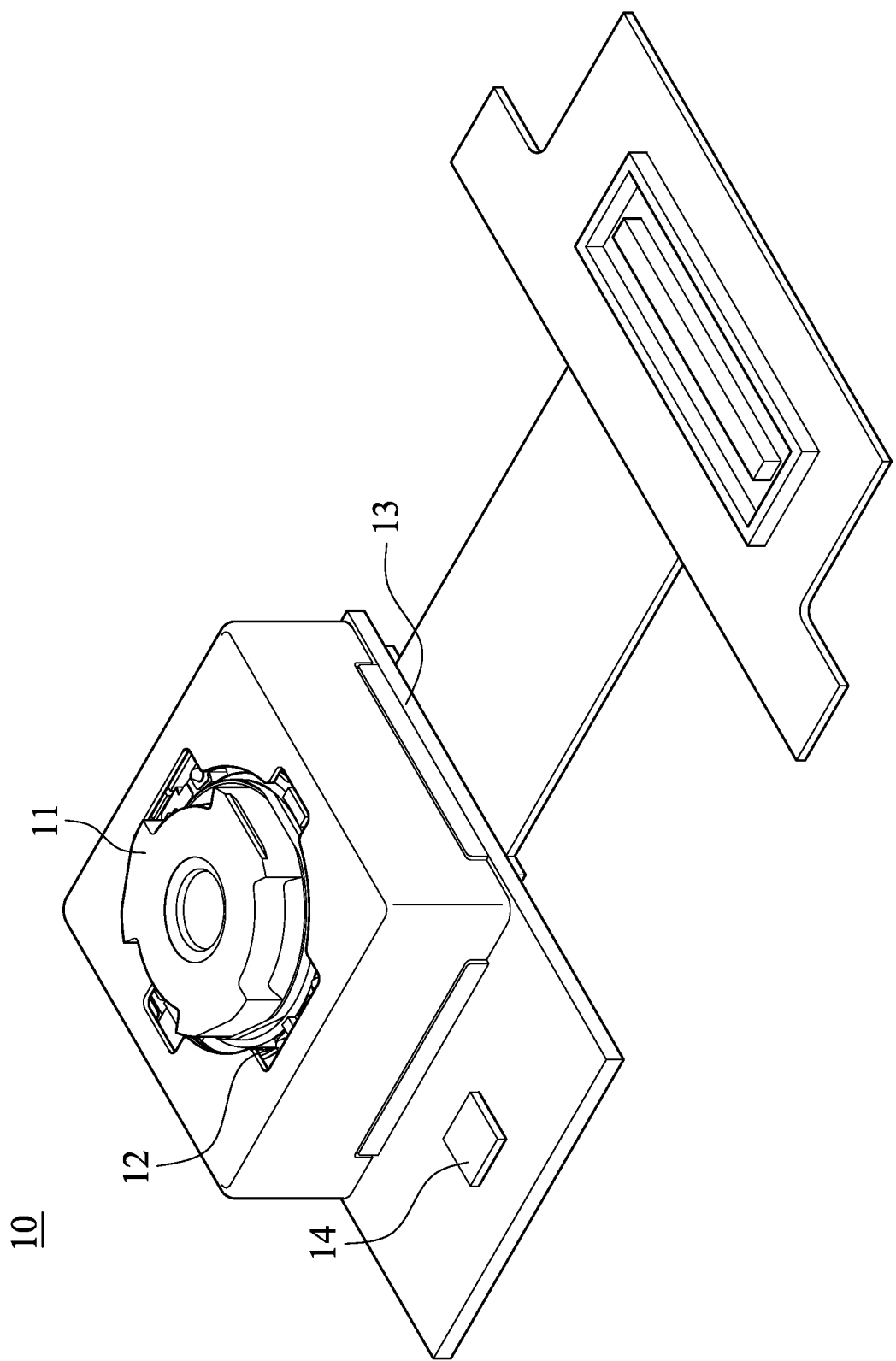
FIG. 23 is a three-dimensional schematic view of an imaging apparatus according to the 12th embodiment of the present disclosure.

FIG. 23 is a three-dimensional schematic view of an imaging apparatus 10 according to the 12th embodiment of the present disclosure. In FIG. 23, the imaging apparatus 10 of the 12th embodiment is a camera module, the imaging apparatus 10 includes an imaging lens assembly 11, a driving apparatus 12 and an image sensor 13, wherein the imaging lens assembly 11 includes the photographing optical lens assembly according to the present disclosure and a lens barrel (its reference numeral is omitted) for carrying the photographing optical lens assembly. The imaging apparatus 10 can focus light from an imaged object via the imaging lens assembly 11, perform image focusing by the driving apparatus 12, and generate an image on the image sensor 13, and the imaging information can be transmitted.

The driving apparatus 12 can be an auto-focus module, which can be driven by driving systems, such as voice coil motors (VCM), micro electro-mechanical systems (MEMS), piezoelectric systems, and shape memory alloys etc. The photographing optical lens assembly can obtain a favorable imaging position by the driving apparatus 12 so as to capture clear images when the imaged object is disposed at different object distances.

The imaging apparatus 10 can include the image sensor 13 located on the image surface of the photographing optical lens assembly, such as CMOS and CCD, with superior photosensitivity and low noise. Thus, it is favorable for providing realistic images with high definition image quality thereof.

Moreover, the imaging apparatus 10 can further include an image stabilization module 14, which can be a kinetic energy sensor, such as an accelerometer, a gyro sensor, and a Hall Effect sensor. In the 12th embodiment, the image stabilization module 14 is a gyro sensor, but is not limited thereto. Therefore, the variation of different axial directions of the photographing optical lens assembly can adjusted so as to compensate the image blur generated by motion at the moment of exposure, and it is further favorable for enhancing the image quality while photographing in motion and low light situation. Furthermore, advanced image compensation functions, such as optical image stabilizations (OIS) and electronic image stabilizations (EIS) etc., can be provided.

13th Embodiment

Figure 24A:
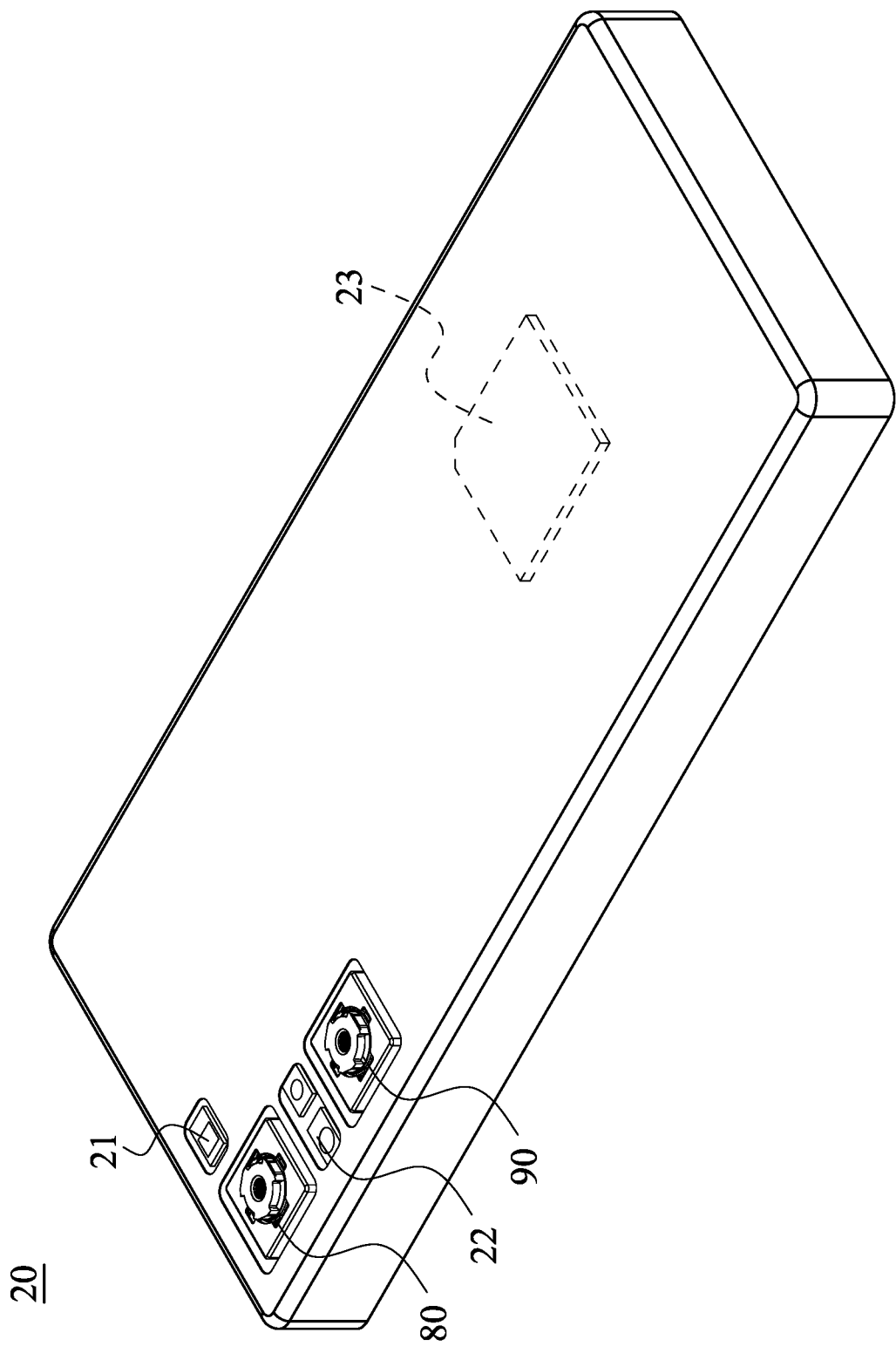
FIG. 24A is a schematic view of one side of an electronic device according to the 13th embodiment of the present disclosure.
Figure 24B:
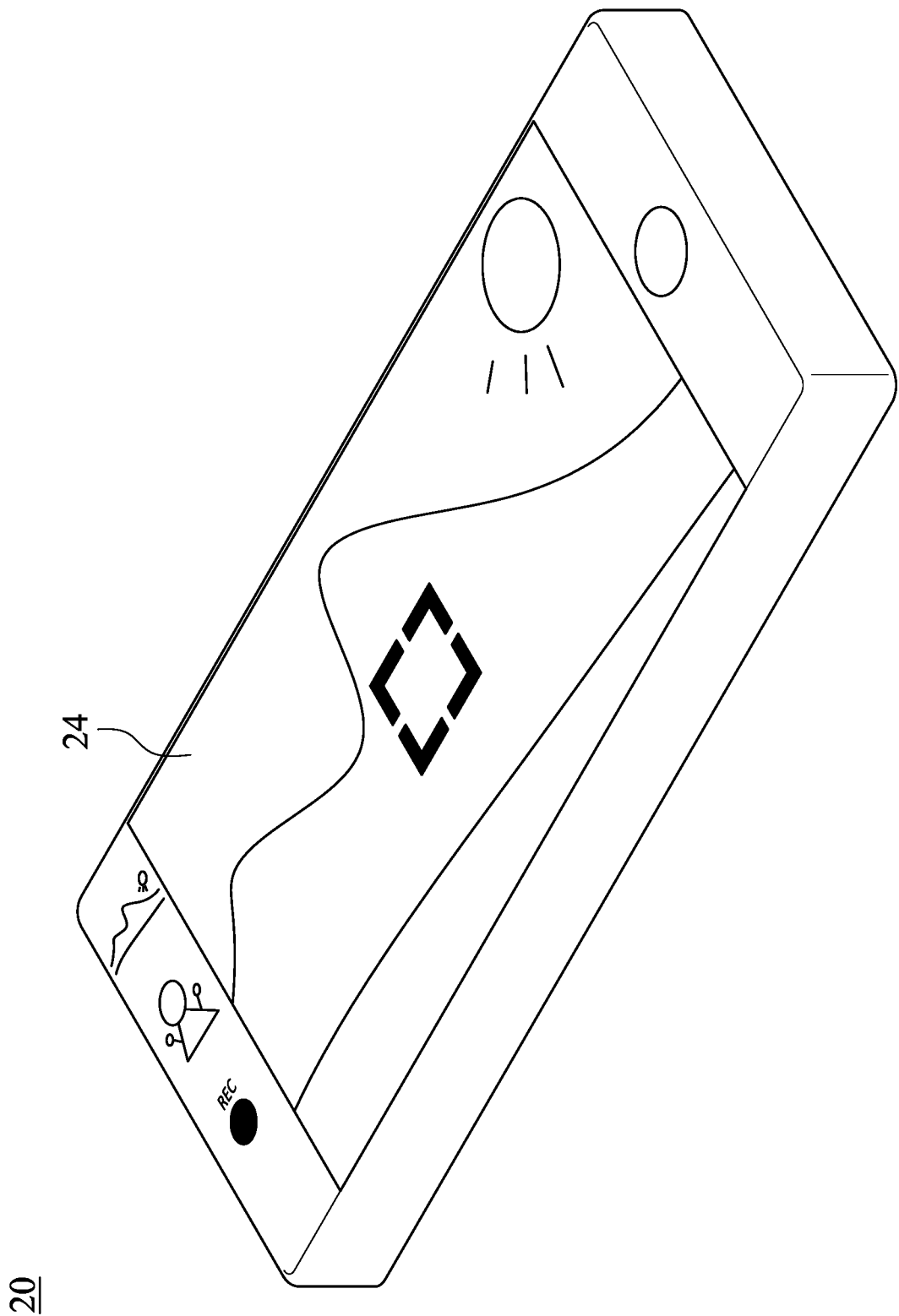
FIG. 24B is a schematic view of another side of the electronic device of FIG. 24A.
Figure 24C:
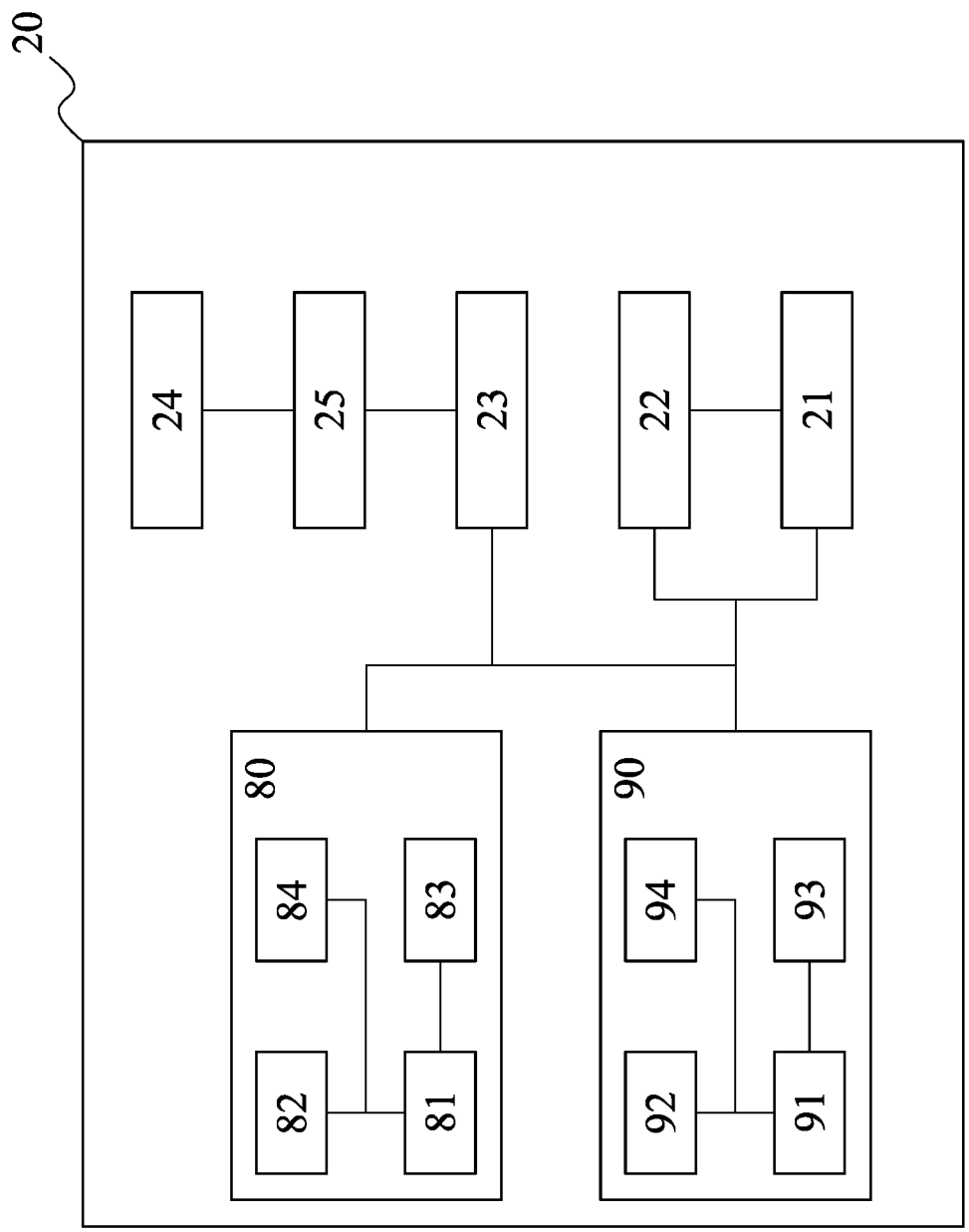
FIG. 24C is a system schematic view of the electronic device of FIG. 24A.
Figure 24C:
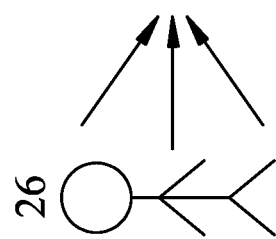

FIG. 24A is a schematic view of one side of an electronic device 20 according to the 13th embodiment of the present disclosure. FIG. 24B is a schematic view of another side of the electronic device 20 of FIG. 24A. FIG. 24C is a system schematic view of the electronic device 20 of FIG. 24A. In FIGS. 24A, 24B and 24C, the electronic device 20 according to the 13th embodiment is a smartphone, wherein the electronic device 20 includes two imaging apparatuses, a flash module 21, a focusing assisting module 22, an image signal processor (ISP) 23, a user interface 24 and an image software processor 25. When the user captures images of an imaged object 26 via the user interface 24, the electronic device 20 focuses and generates an image via the imaging apparatus while compensating for low illumination via the flash module 21 when necessary. Then, the electronic device 20 quickly focuses on the imaged object according to its object distance information provided by the focusing assisting module 22, and optimizes the image via the image signal processor 23 (ISP) and the image software processor 25. Thus, the image quality can be further enhanced. The focusing assisting module 22 can adopt conventional infrared or laser for obtaining quick focusing, and the user interface 24 can utilize a touch screen or a physical button for capturing and processing the image with various functions of the image processing software.

According to the 13th embodiment, the two imaging apparatuses are a first imaging apparatus 80 and a second imaging apparatus 90, but not limited by the configurations in FIG. 24A. The first imaging apparatus 80 is the same as the imaging apparatus 10 stated in the 12th embodiment and includes an imaging lens assembly 81, a driving apparatus 82, an image sensor 83 and an image stabilization module 84, wherein the imaging lens assembly 81 includes the photographing optical lens assembly according to the present disclosure. The second imaging apparatus 90 includes an imaging lens assembly 91, a driving apparatus 92, an image sensor 93 and an image stabilization module 94, wherein the imaging lens assembly 91 includes an optical lens unit, which may be or may not be the same as the photographing optical lens assembly according to the present disclosure. Furthermore, the first imaging apparatus 80 and the second imaging apparatus 90 are facing the same side of the electronic device 20, and there is a difference of at least 20 degrees between a maximum field of view of the first imaging apparatus 80 and a maximum field of view of the second imaging apparatus 90. Therefore, it is favorable for enhancing the image quality and expanding the applications.

14th Embodiment

Figure 25:
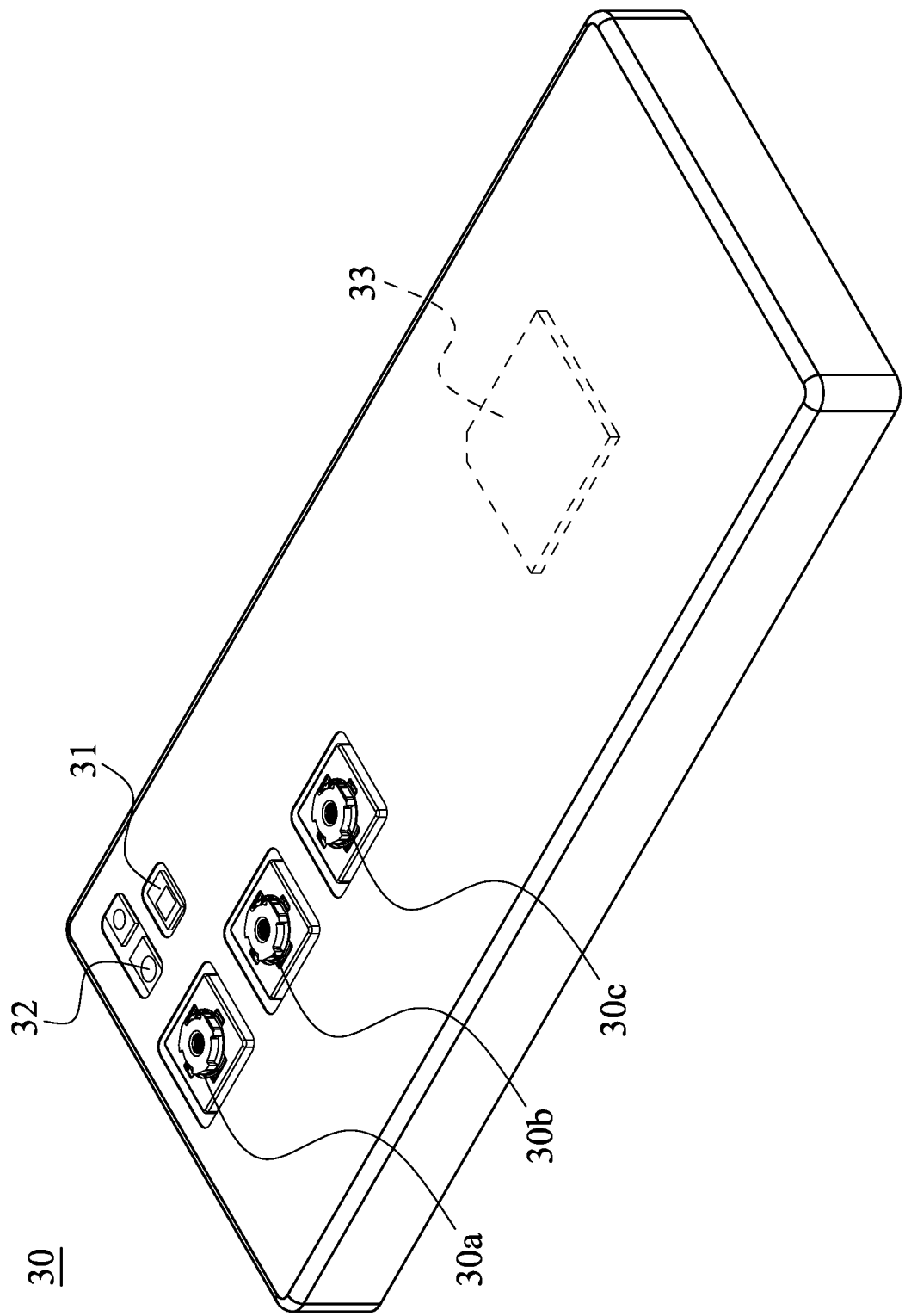
FIG. 25 is a schematic view of one side of an electronic device according to the 14th embodiment of the present disclosure.

FIG. 25 is a schematic view of one side of an electronic device 30 according to the 14th embodiment of the present disclosure. In FIG. 25, the electronic device 30 according to the 14th embodiment is a smartphone, wherein the electronic device 30 includes three imaging apparatuses 30a, 30b, 30c, a flash module 31, a focusing assisting module 32, an image signal processor 33, a user interface (not shown in drawings) and an image software processor (not shown in drawings). When the user captures images of an imaged object (not shown in drawings) via the user interface, the electronic device 30 focuses and generates an image via the imaging apparatuses 30a, 30b, 30c while compensating for low illumination via the flash module 31 when necessary. Then, the electronic device 30 quickly focuses on the imaged object according to its object distance information provided by the focusing assisting module 32, and optimizes the image via the image signal processor 33 and the image software processor. Thus, the image quality can be further enhanced. The focusing assisting module 32 can adopt conventional infrared or laser for obtaining quick focusing, and the user interface can utilize a touch screen or a physical button for capturing and processing the image with various functions of the image processing software.

At least one of the imaging apparatuses 30a, 30b, 30c according to the 14th embodiment is the same as the imaging apparatus 10 according to the 12th embodiment, and will not describe again herein. In detail, in the 14th embodiment, the imaging apparatuses 30a, 30b, 30c can be a wide-angle imaging apparatus, a telephoto imaging apparatus and an imaging apparatus with general field of view (between the wide-angle and the telephoto), respectively, or can be others kind of imaging apparatus, and will not be limited thereto.

15th Embodiment

Figure 26:
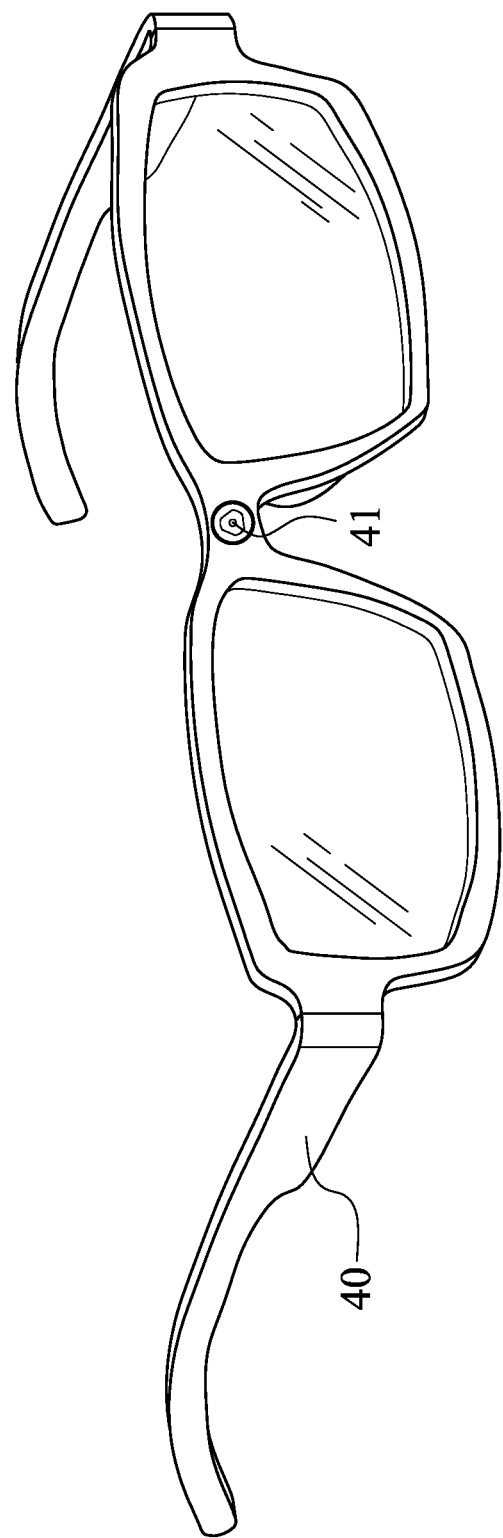
FIG. 26 is a schematic view of an electronic device according to the 15th embodiment of the present disclosure.

FIG. 26 is a schematic view of an electronic device 40 according to the 15th embodiment of the present disclosure. The electronic device 40 of the 15th embodiment is a wearable device, wherein the electronic device 40 includes an imaging apparatus 41, and the imaging apparatus 41 is the same as stated in the 12th embodiment, and will not describe again herein.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing optical lens assembly comprising seven lens elements, the seven lens elements being, in order from an object side to an image side:
   a first lens element, a second lens element, a third lens element, a fourth lens element, a fifth lens element, a sixth lens element and a seventh lens element;
   wherein each of the seven lens elements comprises an object-side surface facing towards the object side and an image-side surface facing towards the image side;
   wherein the image-side surface of the seventh lens element is concave in a paraxial region thereof, and the image-side surface of the seventh lens element comprises at least one inflection point in an off-axis region thereof;
   wherein a total number of the lens elements in the photographing optical lens assembly is seven, a focal length of the photographing optical lens assembly is f, a focal length of the fourth lens element is f4, a focal length of the fifth lens element is f5, a focal length of the sixth lens element is f6, an Abbe number of the fourth lens element is V4, an Abbe number of the fifth lens element is V5, an Abbe number of the sixth lens element is V6, a minimum among Abbe numbers of all lens elements of the photographing optical lens assembly is Vmin, a curvature radius of the object-side surface of the second lens element is R3, a curvature radius of the image-side surface of the second lens element is R4, a curvature radius of the object-side surface of the fifth lens element is R9, an axial distance between the image-side surface of the seventh lens element and an image surface is BL, an axial distance between the object-side surface of the first lens element and the image-side surface of the seventh lens element is TD, and the following conditions are satisfied:

$|f/f4|+|f/f5|+|f/f6|<0.80;$ $30.0<V4+V5+V6<90.0;$ $10.0<V\min<22.0;$ $-3.50<(R3-R4)/(R3+R4);$ $-1.50<f/R9<1.20;$ and $0.05<BL/TD<0.30.$ 2. The photographing optical lens assembly of claim 1, wherein the second lens element has negative refractive power.

3. The photographing optical lens assembly of claim 1, wherein the third lens element has positive refractive power.

4. The photographing optical lens assembly of claim 1, wherein the seventh lens element has negative refractive power.

5. The photographing optical lens assembly of claim 1, wherein the object-side surface of the first lens element is convex in a paraxial region thereof, the image-side surface of the first lens element is concave in a paraxial region thereof, and the object-side surface of the second lens element is convex in a paraxial region thereof.

6. The photographing optical lens assembly of claim 1, wherein the focal length of the photographing optical lens assembly is f, the focal length of the fourth lens element is f4, the focal length of the fifth lens element is f5, the focal length of the sixth lens element is f6, and the following condition is satisfied:

$|f/f4|+|f/f5|+|f/f6|<0.70.$

7. The photographing optical lens assembly of claim 1, wherein the Abbe number of the fourth lens element is V4, the Abbe number of the fifth lens element is V5, the Abbe number of the sixth lens element is V6, and the following condition is satisfied:

$35.0<V4+V5+V6<80.0.$

8. The photographing optical lens assembly of claim 1, wherein the focal length of the photographing optical lens assembly is f, a focal length of the first lens element is f1, a focal length of the second lens element is f2, a focal length of the third lens element is f3, the focal length of the fourth lens element is f4, the focal length of the fifth lens element is f5, the focal length of the sixth lens element is f6, a focal length of the seventh lens element is f7, a minimum value among $|f/f1|,$ $|f/f2|,$ $|f/f3|,$ $|f/f4|,$ $|f/f5|,$ $|f/f6|$ and $|f/f7|$ is $|f/fi|\min$, and the following condition is satisfied:

$|f/fi|\min<0.10.$

9. The photographing optical lens assembly of claim 1, wherein a central thickness of the first lens element is CT1, a central thickness of the seventh lens element is CT7, and the following condition is satisfied:

$0.50<CT7/CT1<2.50.$

10. The photographing optical lens assembly of claim 1, wherein the focal length of the photographing optical lens assembly is f, a focal length of the third lens element is f3, a curvature radius of the object-side surface of the fourth lens element is R7, a curvature radius of the image-side surface of the fourth lens element is R8, and the following conditions are satisfied:

$$-1.0 < f/f3 < 1.50; \text{ and}$$

$$-0.20 < (R7-R8)/(R7+R8) < 2.50.$$

11. The photographing optical lens assembly of claim 1, wherein the focal length of the photographing optical lens assembly is f, a curvature radius of an object-side surface of a lens element of the photographing optical lens assembly is Rf, a curvature radius of an image-side surface of the lens element of the photographing optical lens assembly is Rr, and the following condition is satisfied by at least one lens element of the photographing optical lens assembly:

$$|f/Rf| + |f/Rr| < 1.0.$$

12. The photographing optical lens assembly of claim 1, wherein the focal length of the photographing optical lens assembly is f, an entrance pupil diameter of the photographing optical lens assembly is EPD, an axial distance between the object-side surface of the first lens element and the image surface is TL, a maximum image height of the photographing optical lens assembly is ImgH, and the following conditions are satisfied:

$$1.0 < f/EPD < 1.90; \text{ and}$$

$$1.20 < TL/\text{ImgH} < 1.75.$$

13. An imaging apparatus, comprising:
the photographing optical lens assembly of claim 1; and
an image sensor, wherein the image sensor is disposed on the image surface of the photographing optical lens assembly.

14. An electronic device, comprising at least two imaging apparatuses, which are:
a first imaging apparatus being the imaging apparatus of claim 13; and
a second imaging apparatus comprising an optical lens unit and an image sensor;
wherein the first imaging apparatus and the second imaging apparatus are facing the same side of the electronic device, and there is a difference of at least 20 degrees between a maximum field of view of the first imaging apparatus and a maximum field of view of the second imaging apparatus.

15. A photographing optical lens assembly comprising seven lens elements, the seven lens elements being, in order from an object side to an image side:
a first lens element, a second lens element, a third lens element, a fourth lens element, a fifth lens element, a sixth lens element and a seventh lens element;
wherein each of the seven lens elements comprises an object-side surface facing towards the object side and an image-side surface facing towards the image side;
wherein the image-side surface of the seventh lens element is concave in a paraxial region thereof, and the image-side surface of the seventh lens element comprises at least one inflection point in an off-axis region thereof;
wherein a total number of the lens elements in the photographing optical lens assembly is seven, a focal length of the photographing optical lens assembly is f, a focal length of the fourth lens element is f4, a focal length of the fifth lens element is f5, a focal length of the sixth lens element is f6, an Abbe number of the fourth lens element is V4, an Abbe number of the fifth lens element is V5, an Abbe number of the sixth lens element is V6, a curvature radius of the object-side surface of the third lens element is R5, a curvature radius of the image-side surface of the third lens element is R6, a curvature radius of the object-side surface of the fifth lens element is R9, and the following conditions are satisfied:

$$|f/f4| + |f/f5| + |f/f6| < 1.0;$$

$$30.0 < V4+V5+V6 < 85.0;$$

$$(R5+R6)/(R5-R6) < 0.80; \text{ and}$$

$$-1.50 < f/R9 < 1.20.$$

16. The photographing optical lens assembly of claim 15, wherein the third lens element has positive refractive power.

17. The photographing optical lens assembly of claim 15, wherein the image-side surface of the sixth lens element is concave in a paraxial region thereof, and the image-side surface of the sixth lens element comprises at least one inflection point in an off-axis region thereof.

18. The photographing optical lens assembly of claim 15, wherein an Abbe number of the second lens element is V2, the Abbe number of the fourth lens element is V4, the Abbe number of the sixth lens element is V6, and the following conditions are satisfied:

$$10.0 < V2 < 40.0;$$

$$10.0 < V4 < 30.0; \text{ and}$$

$$10.0 < V6 < 40.0.$$

19. The photographing optical lens assembly of claim 15, wherein the curvature radius of the object-side surface of the third lens element is R5, the curvature radius of the image-side surface of the third lens element is R6, an axial distance between the object-side surface of the first lens element and an image surface is TL, the focal length of the photographing optical lens assembly is f, and the following conditions are satisfied:

$$-2.50 < (R5+R6)/(R5-R6) < 0.50; \text{ and}$$

$$0.90 < TL/f < 1.35.$$

20. The photographing optical lens assembly of claim 15, wherein the focal length of the photographing optical lens assembly is f, the curvature radius of the object-side surface of the fifth lens element is R9, and the following condition is satisfied:

$$1.20 < f/R9 < 0.55.$$

21. The photographing optical lens assembly of claim 15, wherein the curvature radius of the object-side surface of the third lens element is R5, a central thickness of the third lens element is CT3, and the following condition is satisfied:

$$50.0 < R5/CT3 < 5.0.$$

22. The photographing optical lens assembly of claim 15, wherein the focal length of the photographing optical lens assembly is f, a focal length of the first lens element is f1, a focal length of the second lens element is f2, a focal length of the third lens element is f3, the focal length of the fourth lens element is f4, the focal length of the fifth lens element is f5, the focal length of the sixth lens element is f6, a focal length of the seventh lens element is f7, a maximum value among |f/f1|, |f/f2|, |f/f3|, |f/f4|, |f/f5|, |f/f6| and |f/f7| is |f/fi|max, and the following condition is satisfied:

$$0.50 < |f/fi|\text{max} < 1.25.$$

23. A photographing optical lens assembly comprising seven lens elements, the seven lens elements being, in order from an object side to an image side:
- a first lens element, a second lens element, a third lens element, a fourth lens element, a fifth lens element, a sixth lens element and a seventh lens element;
- wherein each of the seven lens elements comprises an object-side surface facing towards the object side and an image-side surface facing towards the image side;
- wherein the object-side surface of the seventh lens element is convex in a paraxial region thereof, the image-side surface of the seventh lens element is concave in a paraxial region thereof, and the image-side surface of the seventh lens element comprises at least one inflection point in an off-axis region thereof;
- wherein a total number of the lens elements in the photographing optical lens assembly is seven, a focal length of the photographing optical lens assembly is f, a focal length of the third lens element is f3, a focal length of the fourth lens element is f4, a focal length of the fifth lens element is f5, a focal length of the sixth lens element is f6, an Abbe number of the fourth lens element is V4, an Abbe number of the fifth lens element is V5, an Abbe number of the sixth lens element is V6, a curvature radius of the object-side surface of the fifth lens element is R9, an axial distance between the image-side surface of the seventh lens element and an image surface is BL, an axial distance between the object-side surface of the first lens element and the image-side surface of the seventh lens element is TD, and the following conditions are satisfied:

$|f/f4|+|f/f5|+|f/f6|<0.80;$ $30.0<V4+V5+V6<90.0;$ $-0.60<f/f3<2.50,$ $-1.50<f/R9<1.20;$ and $0.05<BL/TD<0.30.$ 24. The photographing optical lens assembly of claim 23, wherein each of at least five lens elements of the photographing optical lens assembly has the object-side surface being convex in a paraxial region thereof and the image-side surface being concave in a paraxial region thereof.

25. The photographing optical lens assembly of claim 23, wherein an axial distance between the fifth lens element and the sixth lens element is T56, an axial distance between the sixth lens element and the seventh lens element is T67, and the following condition is satisfied:

$0.10<T56/T67<1.50.$

26. The photographing optical lens assembly of claim 23, wherein a focal length of the first lens element is f1, a focal length of the second lens element is f2, and the following condition is satisfied:

$|f1/f2|<1.50.$

27. The photographing optical lens assembly of claim 23, wherein a curvature radius of the object-side surface of the third lens element is R5, a curvature radius of the image-side surface of the third lens element is R6, and the following condition is satisfied:

$-2.50<(R5+R6)/(R5-R6)<-1.0.$

28. The photographing optical lens assembly of claim 23, wherein Abbe numbers of at least two of the seven lens elements are greater than 10.0 and smaller than 22.0.

29. The photographing optical lens assembly of claim 23, further comprising:
- an aperture stop, wherein an axial distance between the aperture stop and the image-side surface of the seventh lens element is SD, the axial distance between the object-side surface of the first lens element and the image-side surface of the seventh lens element is TD, a maximum image height of the photographing optical lens assembly is ImgH, the focal length of the photographing optical lens assembly is f, and the following conditions are satisfied:

$0.77<SD/TD<0.95;$ and $0.70<ImgH/f<1.0.$

* * * * *

UNITED STATES PATENT AND TRADEMARK OFFICE
CERTIFICATE OF CORRECTION

PATENT NO. : 10,948,695 B2
APPLICATION NO. : 16/214283
DATED : March 16, 2021
INVENTOR(S) : Yeh et al.

Page 1 of 1

It is certified that error appears in the above-identified patent and that said Letters Patent is hereby corrected as shown below:

In the Claims (1) In Column 58, Line 49 (in Claim 20), please delete "$1.20<f/R9<0.55$", and insert therefor: -- $-1.20<f/R9<0.55$ --.

(2) In Column 58, Line 55 (in Claim 21), please delete "$50.0<R5/CT3<5.0$", and insert therefor: -- $-50.0<R5/CT3<5.0$ --.

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*